(12) United States Patent
Nortrup et al.

(10) Patent No.: US 10,534,180 B2
(45) Date of Patent: *Jan. 14, 2020

(54) OPTICAL SYSTEMS FOR HEAD-WORN COMPUTERS

(71) Applicant: Mentor Acquisition One, LLC, Plantation, FL (US)

(72) Inventors: Edward H. Nortrup, Stoneham, MA (US); John N. Border, Campbell, CA (US); John D. Haddick, Corte Madera, CA (US)

(73) Assignee: Mentor Acquisition One, LLC, Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/865,368

(22) Filed: Jan. 9, 2018

(65) Prior Publication Data

US 2018/0129056 A1    May 10, 2018

Related U.S. Application Data

(63) Continuation of application No. 15/259,465, filed on Sep. 8, 2016, now Pat. No. 9,910,284.

(51) Int. Cl.
*G02B 27/01* (2006.01)
*G02B 5/04* (2006.01)
*G02B 27/00* (2006.01)

(52) U.S. Cl.
CPC ........... *G02B 27/0172* (2013.01); *G02B 5/04* (2013.01); *G02B 27/0093* (2013.01);
(Continued)

(58) Field of Classification Search
CPC .. G02B 27/0172; G02B 7/08; G02B 27/0149; G02B 13/22; G02B 27/0176; G02B 5/28;
(Continued)

(56) References Cited

U.S. PATENT DOCUMENTS 1,897,833 A    2/1933    Benway
3,305,294 A    2/1967    Alvarez
(Continued)

FOREIGN PATENT DOCUMENTS

CN    104977785 A    10/2015
EP    368898 A1    5/1990
(Continued)

OTHER PUBLICATIONS

US 8,743,465 B2, 06/2014, Totani et al. (withdrawn)
(Continued)

*Primary Examiner* — Joseph P Martinez
(74) *Attorney, Agent, or Firm* — Morrison & Foerster LLP

(57) ABSTRACT

Aspects of the present disclosure relate a head-worn computer with a see-through display wherein computer content is presented to a user wearing the head-worn computer and through which the user sees a surrounding environment, wherein the see-through display generates image light comprised of narrow bandwidths of red, green and blue light and wherein the see-through display further includes a tristimulus notch mirror positioned to reflect the image light towards the user's eye, and wherein the tristimulus notch mirror reflects less than a full width half max of the red image light.

20 Claims, 67 Drawing Sheets

(52) U.S. Cl.
CPC .............. *G02B 2027/0112* (2013.01); *G02B 2027/0138* (2013.01); *G02B 2027/0178* (2013.01)

(58) Field of Classification Search
CPC .... G02B 5/30; G02B 27/0093; G02B 27/017; G02B 27/2228; G02B 2027/0152; G02B 2027/015; G02B 2027/0134; G02B 2027/0138; G02B 2027/0159; G02B 2027/014; G02B 2027/0123; G02B 2027/0187; G02B 2027/0147; G02B 2027/0178; G02B 2027/013; G02B 2027/0112; G02B 2027/0118
See application file for complete search history.

(56) References Cited

U.S. PATENT DOCUMENTS

| | | |
|---|---|---|
| 4,859,031 A | 8/1989 | Berman et al. |
| 5,257,094 A | 10/1993 | LaRussa et al. |
| 5,305,124 A | 4/1994 | Chern et al. |
| 5,596,451 A | 1/1997 | Handschy et al. |
| 5,699,194 A | 12/1997 | Takahashi |
| 5,717,422 A | 2/1998 | Fergason et al. |
| 5,741,446 A | 4/1998 | Tahara et al. |
| 5,808,589 A | 9/1998 | Fergason |
| 5,808,800 A | 9/1998 | Handschy et al. |
| 5,889,567 A | 3/1999 | Swanson et al. |
| 5,914,818 A | 6/1999 | Tejada et al. |
| 5,949,583 A | 9/1999 | Rallison et al. |
| 6,147,805 A | 11/2000 | Fergason |
| 6,195,136 B1 | 2/2001 | Handschy et al. |
| 6,204,974 B1 | 3/2001 | Spitzer |
| 6,359,723 B1 | 3/2002 | Handschy et al. |
| 6,369,952 B1 | 4/2002 | Rallison et al. |
| 6,379,009 B1 | 4/2002 | Fergason |
| 6,384,982 B1 | 5/2002 | Spitzer |
| 6,433,760 B1 | 8/2002 | Vaissie et al. |
| 6,456,438 B1 | 9/2002 | Lee et al. |
| 6,461,000 B1 | 10/2002 | Magarill |
| 6,478,429 B1 | 11/2002 | Aritake et al. |
| 6,683,584 B2 | 1/2004 | Ronzani et al. |
| 6,747,611 B1 | 6/2004 | Budd et al. |
| 6,816,141 B1 | 11/2004 | Fergason |
| 6,847,336 B1 | 1/2005 | Lemelson et al. |
| 6,847,496 B1 | 1/2005 | Presby |
| 6,906,836 B2 | 6/2005 | Parker et al. |
| 6,943,754 B2 | 9/2005 | Aughey et al. |
| 6,987,787 B1 | 1/2006 | Mick |
| 7,088,234 B2 | 8/2006 | Naito et al. |
| 7,119,971 B2 | 10/2006 | Kobayashi et al. |
| 7,199,934 B2 | 4/2007 | Yamasaki |
| 7,206,134 B2 | 4/2007 | Weissman et al. |
| 7,401,920 B1 | 7/2008 | Kranz et al. |
| 7,417,617 B2 | 8/2008 | Eichenlaub |
| 7,543,943 B1 | 6/2009 | Hubby et al. |
| 7,656,585 B1 | 2/2010 | Powell et al. |
| 7,690,799 B2 | 4/2010 | Nestorovic et al. |
| 7,733,571 B1 | 6/2010 | Li |
| 7,777,690 B2 | 8/2010 | Winsor et al. |
| 7,777,960 B2 | 8/2010 | Freeman |
| 7,830,370 B2 | 11/2010 | Yamazaki et al. |
| 7,855,743 B2 | 12/2010 | Sako et al. |
| 7,928,926 B2 | 4/2011 | Yamamoto et al. |
| 8,004,765 B2 | 8/2011 | Amitai |
| 8,018,579 B1 | 9/2011 | Krah et al. |
| 8,079,713 B2 | 12/2011 | Ashkenazi et al. |
| 8,125,716 B2 | 2/2012 | Bryant et al. |
| 8,166,421 B2 | 4/2012 | Magal et al. |
| 8,184,067 B1 | 5/2012 | Braun et al. |
| 8,187,481 B1 | 5/2012 | Hobbs et al. |
| 8,376,548 B2 | 2/2013 | Schultz |
| 8,378,924 B2 | 2/2013 | Jacobsen et al. |
| 8,384,999 B1 | 2/2013 | Crosby et al. |
| 8,427,396 B1 | 4/2013 | Kim |
| 8,467,133 B2 | 6/2013 | Miller et al. |
| 8,472,120 B2 | 6/2013 | Border et al. |
| 8,477,425 B2 | 7/2013 | Border et al. |
| 8,482,859 B2 | 7/2013 | Border et al. |
| 8,488,246 B2 | 7/2013 | Border et al. |
| 8,494,215 B2 | 7/2013 | Kimchi et al. |
| 8,520,310 B2 | 8/2013 | Shimizu et al. |
| 8,564,883 B2 | 10/2013 | Totani et al. |
| 8,570,656 B1 | 10/2013 | Weissman |
| 8,576,276 B2 | 11/2013 | Bar-Zeev et al. |
| 8,576,491 B2 | 11/2013 | Takagi et al. |
| 8,587,869 B2 | 11/2013 | Totani et al. |
| 8,594,467 B2 | 11/2013 | Lu et al. |
| 8,662,686 B2 | 3/2014 | Takagi et al. |
| 8,670,183 B2 | 3/2014 | Clavin et al. |
| 8,698,157 B2 | 4/2014 | Hanamura |
| 8,711,487 B2 | 4/2014 | Takeda et al. |
| 8,745,058 B1 | 6/2014 | Garcia-Barrio |
| 8,750,541 B1 | 6/2014 | Dong et al. |
| 8,752,963 B2 | 6/2014 | McCulloch et al. |
| 8,786,675 B2 | 7/2014 | Deering et al. |
| 8,786,686 B1 | 7/2014 | Amirparviz |
| 8,803,867 B2 | 8/2014 | Oikawa |
| 8,823,071 B2 | 9/2014 | Oyamada |
| 8,832,557 B2 | 9/2014 | Tang et al. |
| 8,837,880 B2 | 9/2014 | Takeda et al. |
| 8,854,735 B2 | 10/2014 | Totani et al. |
| 8,963,068 B2 | 2/2015 | Hagopian et al. |
| 9,076,368 B2 | 7/2015 | Evans et al. |
| 9,298,001 B2 | 3/2016 | Border et al. |
| 9,298,002 B2 | 3/2016 | Border et al. |
| 9,310,610 B2 | 4/2016 | Border |
| 9,316,833 B2 | 4/2016 | Border et al. |
| 9,329,387 B2 | 5/2016 | Border et al. |
| 9,366,867 B2 | 6/2016 | Border et al. |
| 9,366,868 B2 | 6/2016 | Border et al. |
| 9,370,302 B2 | 6/2016 | Krueger |
| 9,377,625 B2 | 6/2016 | Border et al. |
| 9,436,006 B2 | 9/2016 | Border |
| 9,448,409 B2 | 9/2016 | Border et al. |
| 9,494,800 B2 | 11/2016 | Border et al. |
| 9,532,714 B2 | 1/2017 | Border et al. |
| 9,538,915 B2 | 1/2017 | Border et al. |
| 9,594,246 B2 | 3/2017 | Border et al. |
| 9,651,783 B2 | 5/2017 | Border et al. |
| 9,651,789 B2 | 5/2017 | Osterhout et al. |
| 9,671,613 B2 | 6/2017 | Border et al. |
| 9,684,171 B2 | 6/2017 | Border et al. |
| 9,720,227 B2 | 8/2017 | Border et al. |
| 9,720,234 B2 | 8/2017 | Border et al. |
| 9,720,235 B2 | 8/2017 | Border |
| 9,740,012 B2 | 8/2017 | Border et al. |
| 9,798,148 B2 | 10/2017 | Border et al. |
| 9,829,707 B2 | 11/2017 | Border |
| 9,841,599 B2 | 12/2017 | Border |
| 9,910,284 B1 * | 3/2018 | Nortrup ............ G02B 27/0172 |
| 9,927,612 B2 | 3/2018 | Border et al. |
| 9,933,622 B2 | 4/2018 | Border et al. |
| 2001/0019240 A1 | 9/2001 | Takahashi et al. |
| 2002/0021498 A1 | 2/2002 | Ohtaka et al. |
| 2002/0101568 A1 | 8/2002 | Eberl et al. |
| 2002/0109903 A1 | 8/2002 | Kaeriyama et al. |
| 2002/0181115 A1 | 12/2002 | Massof et al. |
| 2002/0191297 A1 | 12/2002 | Gleckman et al. |
| 2003/0002166 A1 | 1/2003 | Wilmington |
| 2003/0030597 A1 | 2/2003 | Geist |
| 2003/0030912 A1 | 2/2003 | Gleckman et al. |
| 2003/0048531 A1 | 3/2003 | Luecke et al. |
| 2003/0151834 A1 | 8/2003 | Penn et al. |
| 2004/0066547 A1 | 4/2004 | Parker et al. |
| 2004/0162211 A1 | 8/2004 | Domey et al. |
| 2004/0174497 A1 | 9/2004 | Sharma et al. |
| 2004/0194880 A1 | 10/2004 | Jiang et al. |
| 2004/0227994 A1 | 11/2004 | Ma et al. |
| 2005/0041289 A1 | 2/2005 | Berman et al. |
| 2005/0099592 A1 | 5/2005 | Lee et al. |
| 2005/0157949 A1 | 7/2005 | Aiso et al. |
| 2005/0212980 A1 | 9/2005 | Miyazaki et al. |
| 2006/0098293 A1 | 5/2006 | Garoutte et al. |

(56) References Cited

U.S. PATENT DOCUMENTS

| | | |
|---|---|---|
| 2006/0119794 A1 | 6/2006 | Hillis et al. |
| 2006/0215111 A1 | 9/2006 | Mihashi et al. |
| 2006/0221266 A1 | 10/2006 | Kato et al. |
| 2006/0250322 A1 | 11/2006 | Hall et al. |
| 2006/0250696 A1 | 11/2006 | McGuire |
| 2006/0285223 A1 | 12/2006 | Watanabe et al. |
| 2007/0024750 A1 | 2/2007 | Wing Chung et al. |
| 2007/0024763 A1 | 2/2007 | Chung et al. |
| 2007/0024764 A1 | 2/2007 | Chung et al. |
| 2007/0024820 A1 | 2/2007 | Chung et al. |
| 2007/0024823 A1 | 2/2007 | Chung et al. |
| 2007/0025273 A1 | 2/2007 | Chung et al. |
| 2007/0030379 A1 | 2/2007 | Agranov |
| 2007/0030456 A1 | 2/2007 | Duncan et al. |
| 2007/0070859 A1 | 3/2007 | Hirayama |
| 2007/0091431 A1 | 4/2007 | Mezouari et al. |
| 2007/0120806 A1 | 5/2007 | Schmidt et al. |
| 2007/0263174 A1 | 11/2007 | Shyu et al. |
| 2007/0274080 A1 | 11/2007 | Negley et al. |
| 2008/0088793 A1 | 4/2008 | Sverdrup et al. |
| 2008/0169998 A1 | 7/2008 | Jacobsen et al. |
| 2008/0266645 A1 | 10/2008 | Dharmatilleke et al. |
| 2008/0298639 A1 | 12/2008 | Tsunekawa et al. |
| 2009/0015735 A1 | 1/2009 | Simmonds et al. |
| 2009/0015736 A1 | 1/2009 | Weller et al. |
| 2009/0147331 A1 | 6/2009 | Ashkenazi et al. |
| 2009/0180194 A1 | 7/2009 | Yamaguchi et al. |
| 2009/0195875 A1 | 8/2009 | Pasca et al. |
| 2009/0279180 A1 | 11/2009 | Amitai et al. |
| 2009/0324121 A1 | 12/2009 | Bhagavathy et al. |
| 2010/0007852 A1 | 1/2010 | Bietry et al. |
| 2010/0073376 A1 | 3/2010 | Schmale |
| 2010/0079733 A1 | 4/2010 | Lu et al. |
| 2010/0097580 A1 | 4/2010 | Yamamoto et al. |
| 2010/0103075 A1 | 4/2010 | Kalaboukis et al. |
| 2010/0130140 A1 | 5/2010 | Waku et al. |
| 2010/0149073 A1 | 6/2010 | Chaum et al. |
| 2010/0149510 A1 | 6/2010 | Zaczek et al. |
| 2010/0254017 A1 | 10/2010 | Martins et al. |
| 2010/0283774 A1 | 11/2010 | Bovet et al. |
| 2010/0290124 A1 | 11/2010 | Tohara et al. |
| 2010/0290127 A1 | 11/2010 | Kessler et al. |
| 2011/0012874 A1 | 1/2011 | Kurozuka et al. |
| 2011/0043644 A1 | 2/2011 | Munger et al. |
| 2011/0096100 A1 | 4/2011 | Sprague et al. |
| 2011/0130958 A1 | 6/2011 | Stahl et al. |
| 2011/0131495 A1 | 6/2011 | Bull et al. |
| 2011/0164047 A1 | 7/2011 | Pence et al. |
| 2011/0164163 A1 | 7/2011 | Bilbrey et al. |
| 2011/0164221 A1 | 7/2011 | Tilleman et al. |
| 2011/0196610 A1 | 8/2011 | Waldman et al. |
| 2011/0199171 A1 | 8/2011 | Prest et al. |
| 2011/0201213 A1 | 8/2011 | Dabov et al. |
| 2011/0202823 A1 | 8/2011 | Berger et al. |
| 2011/0205209 A1 | 8/2011 | Kurokawa et al. |
| 2011/0248963 A1 | 10/2011 | Lawrence et al. |
| 2011/0316413 A1 | 12/2011 | Ghosh et al. |
| 2012/0050140 A1 | 3/2012 | Border et al. |
| 2012/0050493 A1 | 3/2012 | Ernst et al. |
| 2012/0062444 A1 | 3/2012 | Cok et al. |
| 2012/0062850 A1 | 3/2012 | Travis |
| 2012/0062998 A1 | 3/2012 | Schultz et al. |
| 2012/0068913 A1 | 3/2012 | Bar-Zeev et al. |
| 2012/0069413 A1 | 3/2012 | Schultz et al. |
| 2012/0075168 A1 | 3/2012 | Osterhout et al. |
| 2012/0081800 A1 | 4/2012 | Cheng et al. |
| 2012/0119978 A1 | 5/2012 | Bietry et al. |
| 2012/0120103 A1 | 5/2012 | Border et al. |
| 2012/0120498 A1 | 5/2012 | Harrison et al. |
| 2012/0163013 A1 | 6/2012 | Buelow, II et al. |
| 2012/0176682 A1 | 7/2012 | DeJong et al. |
| 2012/0188245 A1 | 7/2012 | Hyatt et al. |
| 2012/0194553 A1 | 8/2012 | Osterhout et al. |
| 2012/0200935 A1 | 8/2012 | Miyao et al. |
| 2012/0206817 A1 | 8/2012 | Totani et al. |
| 2012/0212398 A1 | 8/2012 | Border et al. |
| 2012/0212484 A1 | 8/2012 | Haddick et al. |
| 2012/0212593 A1 | 8/2012 | Na'aman et al. |
| 2012/0218301 A1 | 8/2012 | Miller |
| 2012/0223885 A1 | 9/2012 | Perez |
| 2012/0235885 A1 | 9/2012 | Miller et al. |
| 2012/0242678 A1 | 9/2012 | Border et al. |
| 2012/0242697 A1* | 9/2012 | Border ............... G02B 27/0093 345/633 |
| 2012/0250152 A1 | 10/2012 | Larson et al. |
| 2012/0264510 A1 | 10/2012 | Wigdor et al. |
| 2012/0287398 A1 | 11/2012 | Baker et al. |
| 2012/0306850 A1 | 12/2012 | Balan et al. |
| 2012/0327116 A1 | 12/2012 | Liu et al. |
| 2013/0009366 A1 | 1/2013 | Hannegan et al. |
| 2013/0021658 A1 | 1/2013 | Miao et al. |
| 2013/0027437 A1 | 1/2013 | Gu |
| 2013/0044042 A1 | 2/2013 | Olsson et al. |
| 2013/0070344 A1 | 3/2013 | Takeda et al. |
| 2013/0077049 A1 | 3/2013 | Bohn et al. |
| 2013/0083055 A1 | 4/2013 | Piemonte et al. |
| 2013/0088413 A1 | 4/2013 | Raffle et al. |
| 2013/0088415 A1 | 4/2013 | Totani et al. |
| 2013/0100259 A1 | 4/2013 | Ramaswamy |
| 2013/0101253 A1 | 4/2013 | Popovich et al. |
| 2013/0106674 A1 | 5/2013 | Wheeler et al. |
| 2013/0120841 A1 | 5/2013 | Shpunt et al. |
| 2013/0127980 A1 | 5/2013 | Haddick |
| 2013/0135198 A1 | 5/2013 | Hodge et al. |
| 2013/0147685 A1 | 6/2013 | Gupta et al. |
| 2013/0154913 A1 | 6/2013 | Genc et al. |
| 2013/0162673 A1 | 6/2013 | Bohn |
| 2013/0169530 A1 | 7/2013 | Bhaskar et al. |
| 2013/0176626 A1 | 7/2013 | Heinrich et al. |
| 2013/0196757 A1 | 8/2013 | Latta et al. |
| 2013/0201080 A1 | 8/2013 | Evans et al. |
| 2013/0201081 A1 | 8/2013 | Evans et al. |
| 2013/0207887 A1 | 8/2013 | Raffle et al. |
| 2013/0207970 A1 | 8/2013 | Shpunt et al. |
| 2013/0222919 A1 | 8/2013 | Komatsu et al. |
| 2013/0230215 A1 | 9/2013 | Gurman et al. |
| 2013/0242405 A1 | 9/2013 | Gupta et al. |
| 2013/0248691 A1 | 9/2013 | Mirov et al. |
| 2013/0250207 A1 | 9/2013 | Bohn et al. |
| 2013/0250430 A1 | 9/2013 | Robbins et al. |
| 2013/0257622 A1 | 10/2013 | Davalos et al. |
| 2013/0265227 A1 | 10/2013 | Julian et al. |
| 2013/0278631 A1 | 10/2013 | Border et al. |
| 2013/0321265 A1 | 12/2013 | Bychkov et al. |
| 2013/0321271 A1 | 12/2013 | Bychkov et al. |
| 2013/0321932 A1 | 12/2013 | Hsu et al. |
| 2013/0342571 A1 | 12/2013 | Kinnebrew et al. |
| 2014/0028704 A1 | 1/2014 | Wu et al. |
| 2014/0043682 A1 | 2/2014 | Hussey et al. |
| 2014/0062854 A1 | 3/2014 | Cho |
| 2014/0063055 A1 | 3/2014 | Osterhout et al. |
| 2014/0111838 A1 | 4/2014 | Han et al. |
| 2014/0125785 A1 | 5/2014 | Na et al. |
| 2014/0129328 A1 | 5/2014 | Mathew |
| 2014/0146394 A1 | 5/2014 | Tout et al. |
| 2014/0147829 A1 | 5/2014 | Jerauld |
| 2014/0152530 A1 | 6/2014 | Venkatesha et al. |
| 2014/0152558 A1 | 6/2014 | Salter et al. |
| 2014/0152676 A1 | 6/2014 | Rohn et al. |
| 2014/0159995 A1 | 6/2014 | Adams et al. |
| 2014/0160055 A1 | 6/2014 | Margolis et al. |
| 2014/0160157 A1 | 6/2014 | Poulos et al. |
| 2014/0160170 A1 | 6/2014 | Lyons |
| 2014/0160576 A1 | 6/2014 | Robbins et al. |
| 2014/0168735 A1 | 6/2014 | Yuan et al. |
| 2014/0176603 A1 | 6/2014 | Kumar et al. |
| 2014/0177023 A1 | 6/2014 | Gao et al. |
| 2014/0204759 A1 | 7/2014 | Orlik et al. |
| 2014/0232651 A1 | 8/2014 | Kress et al. |
| 2014/0253605 A1 | 9/2014 | Border et al. |
| 2014/0361957 A1 | 12/2014 | Hua et al. |
| 2015/0002528 A1 | 1/2015 | Bohn et al. |
| 2015/0015977 A1 | 1/2015 | Karasawa |
| 2015/0035744 A1 | 2/2015 | Robbins et al. |

(56) References Cited

U.S. PATENT DOCUMENTS

| | | |
|---|---|---|
| 2015/0147000 A1 | 5/2015 | Salvador et al. |
| 2015/0185480 A1 | 7/2015 | Ouderkirk et al. |
| 2015/0205035 A1 | 7/2015 | Border et al. |
| 2015/0205107 A1 | 7/2015 | Border |
| 2015/0205108 A1 | 7/2015 | Border et al. |
| 2015/0205111 A1 | 7/2015 | Border et al. |
| 2015/0205113 A1 | 7/2015 | Border et al. |
| 2015/0205114 A1 | 7/2015 | Border et al. |
| 2015/0205115 A1 | 7/2015 | Border et al. |
| 2015/0205116 A1 | 7/2015 | Border et al. |
| 2015/0205117 A1 | 7/2015 | Border et al. |
| 2015/0205118 A1 | 7/2015 | Border et al. |
| 2015/0205119 A1 | 7/2015 | Osterhout et al. |
| 2015/0205120 A1 | 7/2015 | Border et al. |
| 2015/0205121 A1 | 7/2015 | Border et al. |
| 2015/0205122 A1 | 7/2015 | Border et al. |
| 2015/0205125 A1 | 7/2015 | Border et al. |
| 2015/0205127 A1 | 7/2015 | Border et al. |
| 2015/0205128 A1 | 7/2015 | Border |
| 2015/0205129 A1 | 7/2015 | Border et al. |
| 2015/0205130 A1 | 7/2015 | Border |
| 2015/0205131 A1 | 7/2015 | Border et al. |
| 2015/0205135 A1 | 7/2015 | Border et al. |
| 2015/0213754 A1 | 7/2015 | Amjad |
| 2015/0260887 A1 | 9/2015 | Salisbury et al. |
| 2015/0277120 A1 | 10/2015 | Border |
| 2015/0296150 A1 | 10/2015 | Benmokhtar Benabdellah et al. |
| 2015/0309313 A1 | 10/2015 | Border et al. |
| 2015/0309314 A1 | 10/2015 | Border et al. |
| 2015/0316769 A1 | 11/2015 | Border et al. |
| 2015/0316770 A1 | 11/2015 | Border et al. |
| 2015/0316771 A1 | 11/2015 | Border et al. |
| 2015/0316772 A1 | 11/2015 | Border et al. |
| 2015/0355466 A1 | 12/2015 | Border |
| 2015/0365628 A1 | 12/2015 | Ben-Bassat |
| 2015/0378074 A1 | 12/2015 | Kollin et al. |
| 2016/0007849 A1 | 1/2016 | Krueger et al. |
| 2016/0011417 A1 | 1/2016 | Border et al. |
| 2016/0018644 A1 | 1/2016 | Border et al. |
| 2016/0018645 A1 | 1/2016 | Haddick et al. |
| 2016/0018650 A1 | 1/2016 | Haddick et al. |
| 2016/0018651 A1 | 1/2016 | Haddick et al. |
| 2016/0018652 A1 | 1/2016 | Haddick et al. |
| 2016/0018653 A1 | 1/2016 | Haddick et al. |
| 2016/0018654 A1 | 1/2016 | Haddick et al. |
| 2016/0035139 A1 | 2/2016 | Fuchs et al. |
| 2016/0048018 A1 | 2/2016 | De Matos |
| 2016/0048021 A1 | 2/2016 | Border |
| 2016/0055675 A1 | 2/2016 | Kasahara et al. |
| 2016/0062121 A1 | 3/2016 | Border et al. |
| 2016/0062122 A1 | 3/2016 | Border |
| 2016/0085071 A1 | 3/2016 | Border |
| 2016/0085072 A1 | 3/2016 | Haddick et al. |
| 2016/0091718 A1 | 3/2016 | Border et al. |
| 2016/0091719 A1 | 3/2016 | Border |
| 2016/0103320 A1 | 4/2016 | Kovaluk et al. |
| 2016/0109711 A1 | 4/2016 | Border |
| 2016/0147070 A1 | 5/2016 | Border et al. |
| 2016/0154242 A1 | 6/2016 | Border |
| 2016/0154244 A1 | 6/2016 | Border et al. |
| 2016/0161743 A1 | 6/2016 | Osterhout et al. |
| 2016/0170207 A1 | 6/2016 | Haddick et al. |
| 2016/0170208 A1 | 6/2016 | Border et al. |
| 2016/0170209 A1 | 6/2016 | Border et al. |
| 2016/0171769 A1 | 6/2016 | Haddick et al. |
| 2016/0216516 A1 | 7/2016 | Border |
| 2016/0216517 A1 | 7/2016 | Border |
| 2016/0231571 A1 | 8/2016 | Border et al. |
| 2016/0252731 A1 | 9/2016 | Border et al. |
| 2016/0259166 A1 | 9/2016 | Border et al. |
| 2016/0274361 A1 | 9/2016 | Border et al. |
| 2016/0274365 A1 | 9/2016 | Bailey et al. |
| 2016/0282626 A1 | 9/2016 | Border et al. |
| 2016/0286177 A1 | 9/2016 | Border et al. |
| 2016/0286203 A1 | 9/2016 | Border et al. |
| 2016/0286210 A1 | 9/2016 | Border et al. |
| 2016/0357019 A1 | 12/2016 | Border et al. |
| 2017/0023790 A1 | 1/2017 | Border et al. |
| 2017/0115486 A1 | 4/2017 | Border et al. |
| 2017/0153455 A1 | 6/2017 | Takahashi |
| 2017/0235152 A1 | 8/2017 | Border |
| 2017/0242250 A1 | 8/2017 | Border et al. |
| 2017/0242251 A1 | 8/2017 | Border et al. |
| 2017/0242255 A1 | 8/2017 | Border et al. |
| 2017/0242256 A1 | 8/2017 | Border et al. |
| 2017/0243561 A1 | 8/2017 | Border et al. |
| 2017/0329138 A1 | 11/2017 | Haddick |
| 2017/0343810 A1 | 11/2017 | Bietry et al. |
| 2017/0343812 A1 | 11/2017 | Border et al. |
| 2017/0343813 A1 | 11/2017 | Bietry et al. |
| 2017/0343814 A1 | 11/2017 | Bietry et al. |
| 2017/0343815 A1 | 11/2017 | Border et al. |
| 2017/0343816 A1 | 11/2017 | Bietry et al. |
| 2017/0343817 A1 | 11/2017 | Bietry et al. |
| 2017/0343822 A1 | 11/2017 | Border et al. |
| 2017/0363872 A1 | 12/2017 | Border et al. |
| 2018/0067314 A1 | 3/2018 | Nortrup et al. |
| 2018/0067319 A1 | 3/2018 | Border et al. |

FOREIGN PATENT DOCUMENTS

| | | |
|---|---|---|
| EP | 777867 A1 | 6/1997 |
| EP | 2486450 A1 | 8/2012 |
| EP | 2502410 A1 | 9/2012 |
| WO | 2011143655 A1 | 11/2011 |
| WO | 2012058175 A1 | 5/2012 |
| WO | 2012064546 A1 | 5/2012 |
| WO | 2012082807 A2 | 6/2012 |
| WO | 2012118573 A1 | 9/2012 |
| WO | 2012118575 A2 | 9/2012 |
| WO | 2013043288 A2 | 3/2013 |
| WO | 2013049248 A2 | 4/2013 |
| WO | 2013050650 A1 | 4/2013 |
| WO | 2013103825 A1 | 7/2013 |
| WO | 2013103846 A1 | 8/2013 |
| WO | 2013170073 A1 | 11/2013 |
| WO | 2017070417 A1 | 4/2017 |

OTHER PUBLICATIONS

US 8,792,178 B2, 07/2014, Totani et al. (withdrawn)
US 9,195,056 B2, 11/2015, Border et al. (withdrawn)
"Norland Optical Adhesive 61", https://www.norlandprod.com/adhesives/noa%2061.html, p. 1-2.
Allison, Robert S. et al., ""Tolerance of Temporal Delay in Virtual Environments"", VR '01 Proceedings of the Virtual Reality 2001 Conference (VR'01), Centre for Vision Research and Departments of Computer Science and Psychology, Mar. 2001, 2-8.
Cheng, Dewen et al., "Design of an optical see-through head-mounted display with a low f-number and large field of view using a freeform prism", Applied Optics, vol. 48, No. 14, May 10, 2009, pp. 2655-2668.
Lang, Manuel et al., Nonlinear Disparity Mapping for Stereoscopic 3D, Jul. 2010, pp. 1-10.
PCT/US2016/058023 "Application Serial No. PCT/US2016/058023 , International Search Report and Written Opinion dated Dec. 30, 2016", Osterhout Group, Inc., 13 pages.
PCT/US2016/058023, , "International Application Serial No. PCT/US2016/058023, International Preliminary Report on Patentability and Written Opinion dated May 3, 2018", Osterhout Group, Inc., 8 pges.
Perl, Emmett E. et al., "Ultrabroadband and Wide-Angle Hybrid Antireflection Coatings With Nanostructures", IEEE Journal of Photovoltaics, vol. 4, No. 3, May 2014, pp. 962-967.
Schedwill, , "Bidirectional OLED Microdisplay", Fraunhofer Research Institution for Organics, Materials and Electronic Device Comedd, Apr. 11, 2014, 2 pages.
Schott, , "Optical Components", http://www.schott.com/d/advanced_optics/12e2a122-be4d-4e84-9e3d-46185f7e01e0/1.0/schott-optical-components-product-overview-may-2013-eng.pdf, Product information, May 2013, May 2013, 2 Pages.

(56) References Cited

OTHER PUBLICATIONS

Vogel, et al., "Data glasses controlled by eye movements", Information and communication, Fraunhofer-Gesellschaft, Sep. 22, 2013, 2 pages.

* cited by examiner

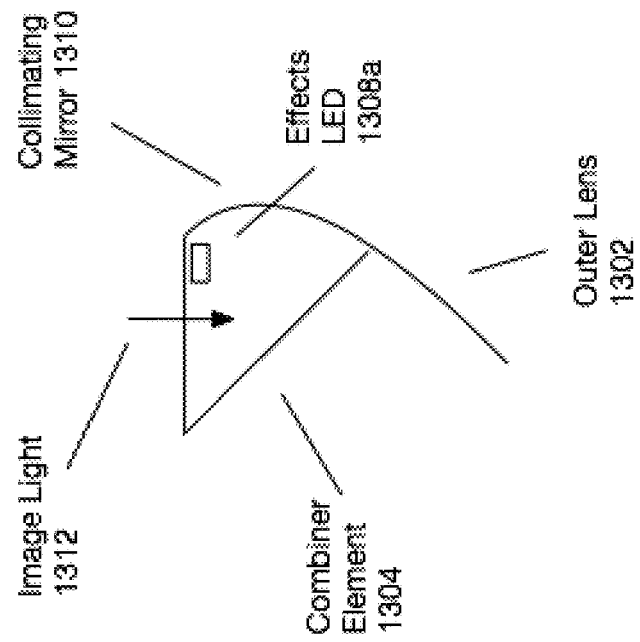

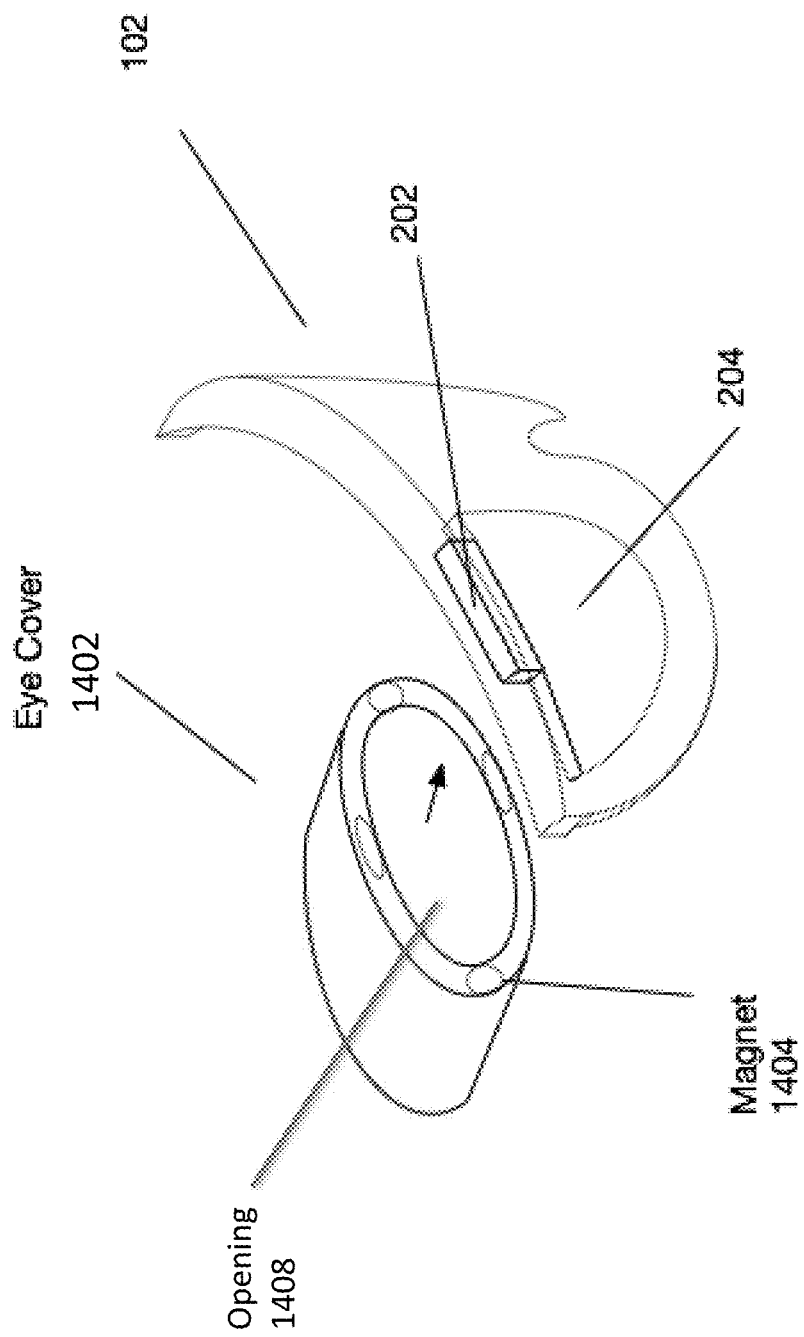

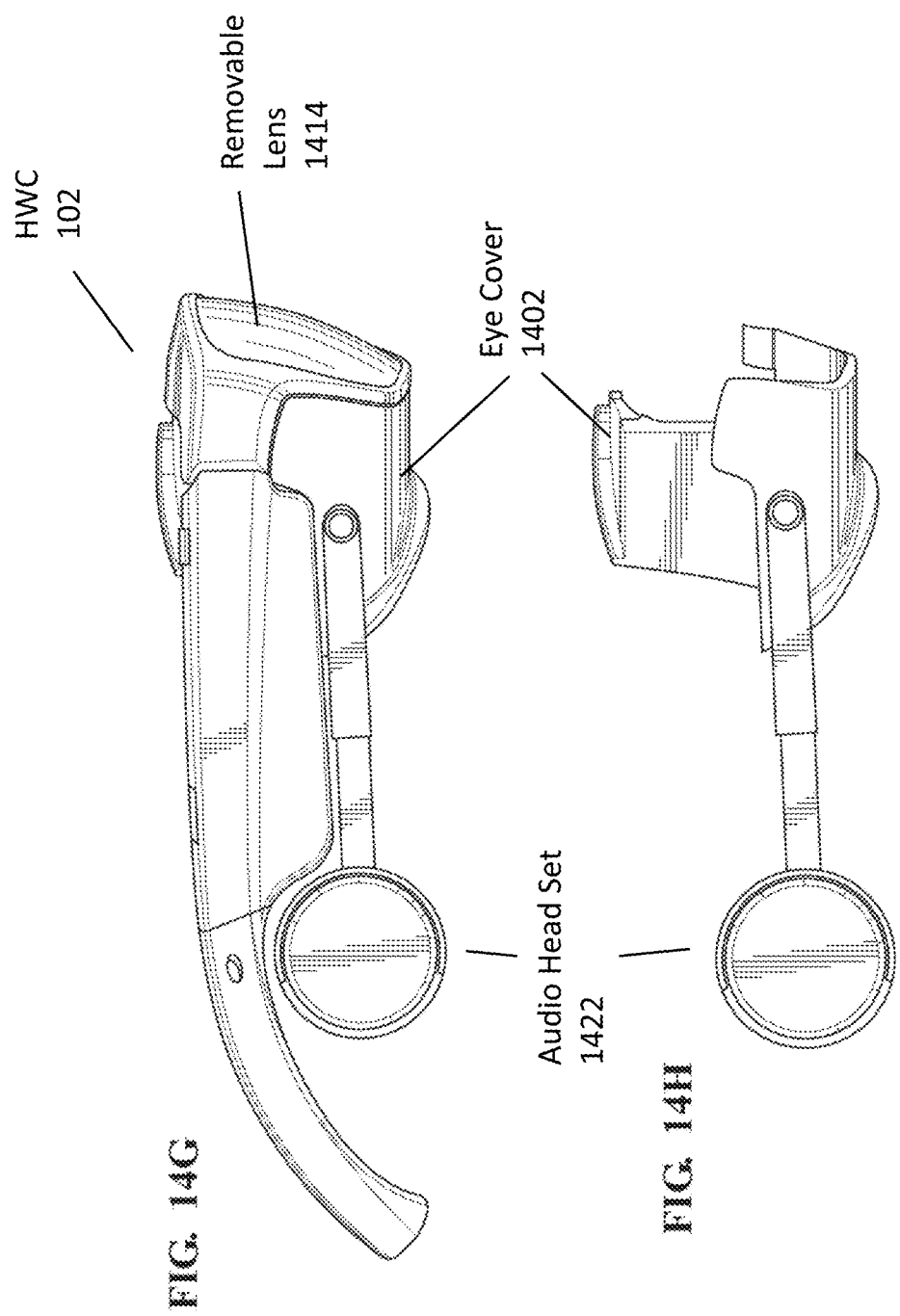

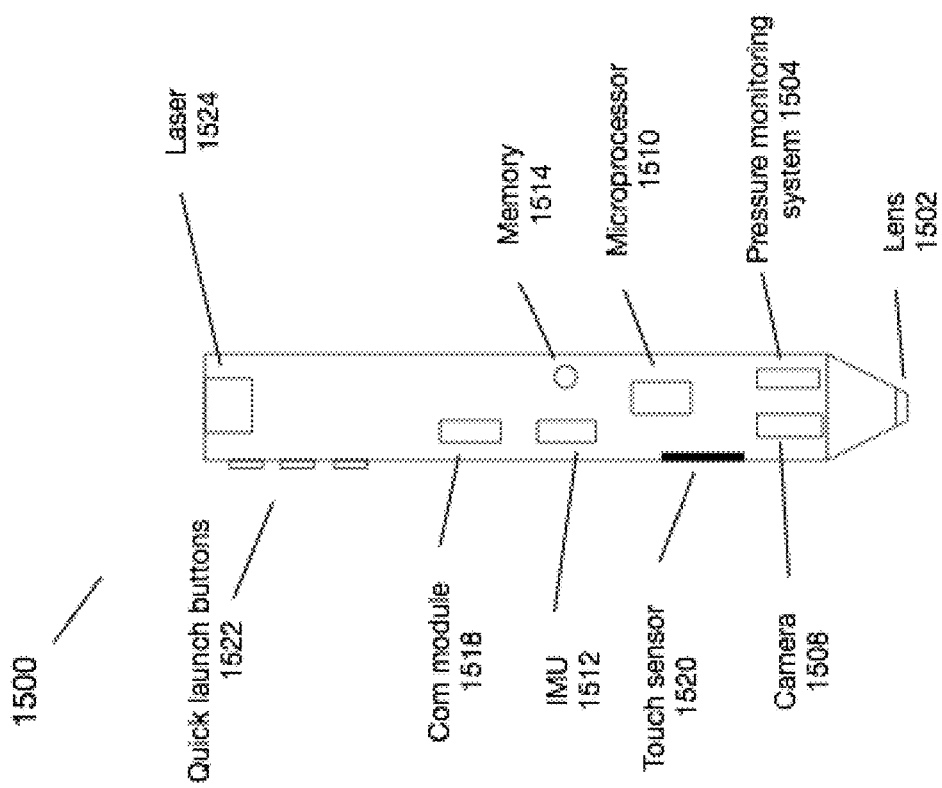

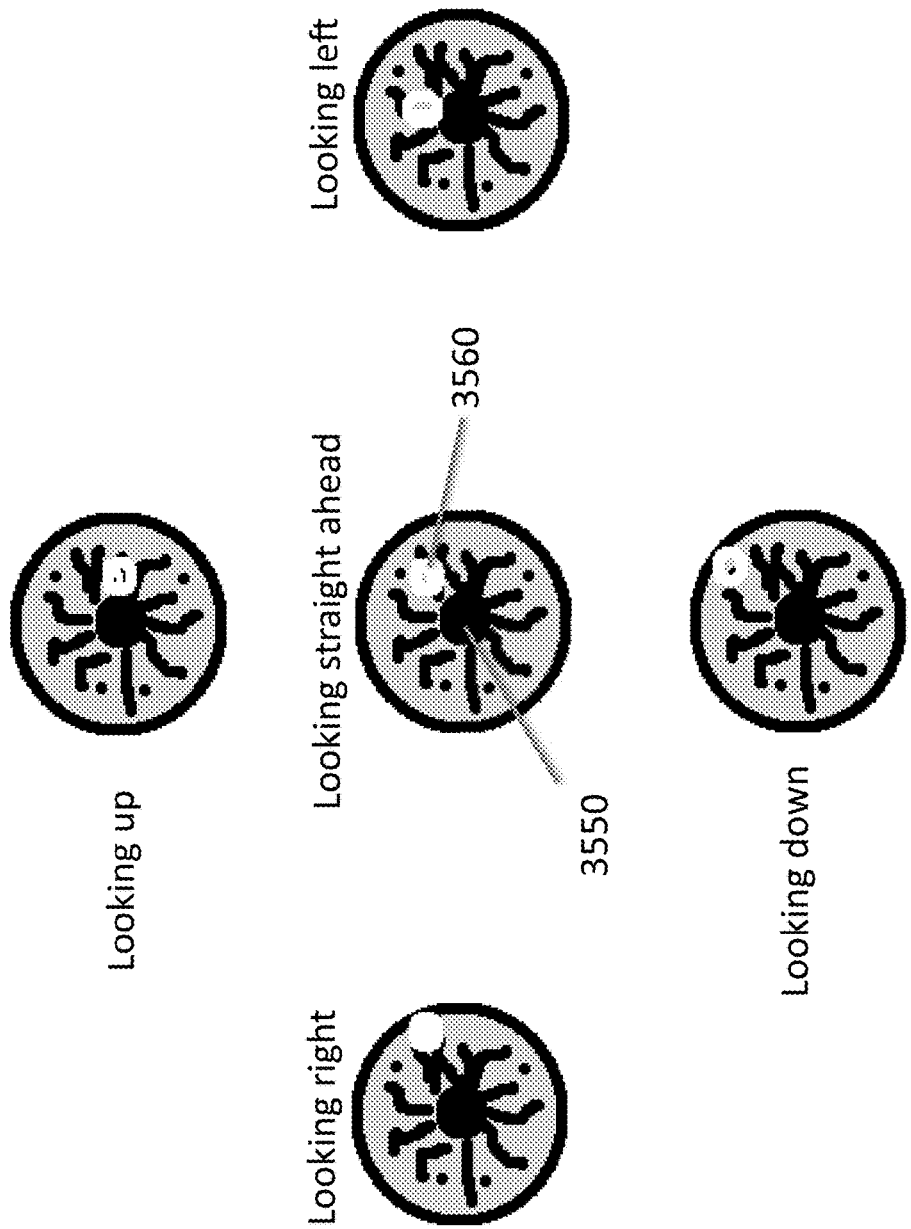

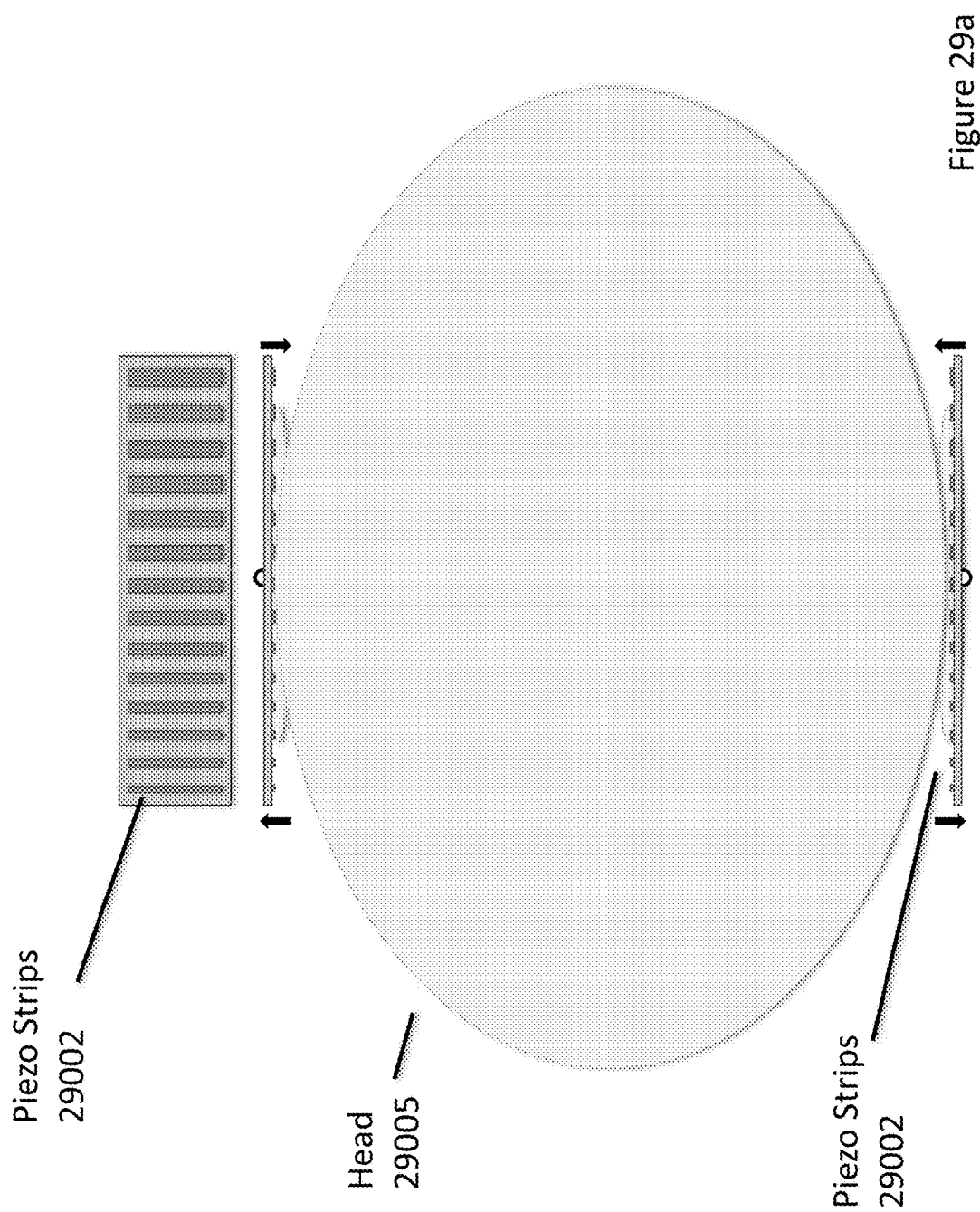

OPTICAL SYSTEMS FOR HEAD-WORN COMPUTERS

CROSS-REFERENCE TO RELATED APPLICATIONS

This application is a continuation of U.S. Ser. No. 15/259,465, filed Sep. 8, 2016.

Each of above applications is hereby incorporated by reference in its entirety.

BACKGROUND

Field of the Invention

This disclosure relates to head-worn computer systems with see-through optical systems.

Description of Related Art

Head mounted displays (HMDs) and particularly HMDs that provide a see-through view of the environment are valuable instruments. The presentation of content in the see-through display can be a complicated operation when attempting to ensure that the user experience is optimized. Improved systems and methods for presenting content in the see-through display are required to improve the user experience.

SUMMARY

Aspects of the present disclosure relate to head-worn computer systems with see-through displays.

These and other systems, methods, objects, features, and advantages of the present disclosure will be apparent to those skilled in the art from the following detailed description of the preferred embodiment and the drawings. All documents mentioned herein are hereby incorporated in their entirety by reference.

BRIEF DESCRIPTION OF THE DRAWINGS

Embodiments are described with reference to the following Figures. The same numbers may be used throughout to reference like features and components that are shown in the Figures:

FIGS. 13a to 13c illustrate peripheral lighting systems in accordance with the principles of the present disclosure.

FIGS. 14a to 14h illustrate light suppression systems in accordance with the principles of the present disclosure.

FIG. 15 illustrates an external user interface in accordance with the principles of the present disclosure.

FIG. 19 illustrates eye glint in the prediction of eye direction analysis in accordance with the principles of the present disclosure.

FIGS. 29 and 29a illustrate haptic systems in accordance with the principles of the present disclosure.

While the disclosure has been described in connection with certain preferred embodiments, other embodiments would be understood by one of ordinary skill in the art and are encompassed herein.

DETAILED DESCRIPTION OF THE PREFERRED EMBODIMENT(S)

Aspects of the present disclosure relate to head-worn computing ("HWC") systems. HWC involves, in some instances, a system that mimics the appearance of head-worn glasses or sunglasses. The glasses may be a fully developed computing platform, such as including computer displays presented in each of the lenses of the glasses to the eyes of the user. In embodiments, the lenses and displays may be configured to allow a person wearing the glasses to see the environment through the lenses while also seeing, simultaneously, digital imagery, which forms an overlaid image that is perceived by the person as a digitally augmented image of the environment, or augmented reality ("AR").

HWC involves more than just placing a computing system on a person's head. The system may need to be designed as a lightweight, compact and fully functional computer display, such as wherein the computer display includes a high resolution digital display that provides a high level of emersion comprised of the displayed digital content and the see-through view of the environmental surroundings. User interfaces and control systems suited to the HWC device may be required that are unlike those used for a more conventional computer such as a laptop. For the HWC and associated systems to be most effective, the glasses may be equipped with sensors to determine environmental conditions, geographic location, relative positioning to other points of interest, objects identified by imaging and movement by the user or other users in a connected group, compass heading, head tilt, where the user is looking and the like. The HWC may then change the mode of operation to match the conditions, location, positioning, movements, and the like, in a method generally referred to as a contextually aware HWC. The glasses also may need to be connected, wirelessly or otherwise, to other systems either locally or through a network. Controlling the glasses may be achieved through the use of an external device, automatically through contextually gathered information, through user gestures captured by the glasses sensors, and the like. Each technique may be further refined depending on the software application being used in the glasses. The glasses may further be used to control or coordinate with external devices that are associated with the glasses.

Figure 1:
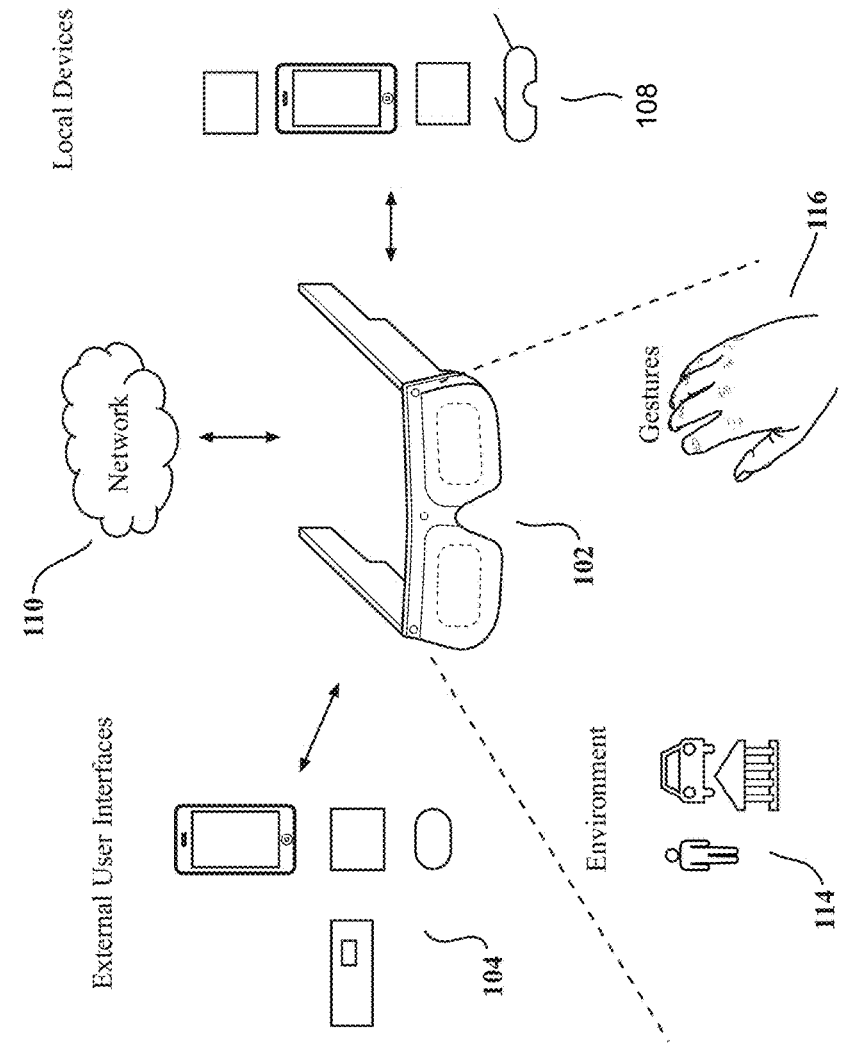
FIG. 1 illustrates a head worn computing system in accordance with the principles of the present disclosure.

Referring to FIG. 1, an overview of the HWC system 100 is presented. As shown, the HWC system 100 comprises a HWC 102, which in this instance is configured as glasses to be worn on the head with sensors such that the HWC 102 is aware of the objects and conditions in the environment 114. In this instance, the HWC 102 also receives and interprets control inputs such as gestures and movements 116. The HWC 102 may communicate with external user interfaces 104. The external user interfaces 104 may provide a physical user interface to take control instructions from a user of the HWC 102 and the external user interfaces 104 and the HWC 102 may communicate bi-directionally to affect the user's command and provide feedback to the external device 108. The HWC 102 may also communicate bi-directionally with externally controlled or coordinated local devices 108. For example, an external user interface 104 may be used in connection with the HWC 102 to control an externally controlled or coordinated local device 108. The externally controlled or coordinated local device 108 may provide feedback to the HWC 102 and a customized GUI may be presented in the HWC 102 based on the type of device or specifically identified device 108. The HWC 102 may also interact with remote devices and information sources 112 through a network connection 110. Again, the external user interface 104 may be used in connection with the HWC 102 to control or otherwise interact with any of the remote devices 108 and information sources 112 in a similar way as when the external user interfaces 104 are used to control or otherwise interact with the externally controlled or coordinated local devices 108. Similarly, HWC 102 may interpret gestures 116 (e.g. captured from forward, downward, upward, rearward facing sensors such as camera(s), range finders, IR sensors, etc.) or environmental conditions sensed in the environment 114 to control either local or remote devices 108 or 112.

We will now describe each of the main elements depicted on FIG. 1 in more detail; however, these descriptions are intended to provide general guidance and should not be construed as limiting. Additional description of each element may also be further described herein.

The HWC 102 is a computing platform intended to be worn on a person's head. The HWC 102 may take many different forms to fit many different functional requirements. In some situations, the HWC 102 will be designed in the form of conventional glasses. The glasses may or may not have active computer graphics displays. In situations where the HWC 102 has integrated computer displays the displays may be configured as see-through displays such that the digital imagery can be overlaid with respect to the user's view of the environment 114. There are a number of see-through optical designs that may be used, including ones that have a reflective display (e.g. LCoS, DLP), emissive displays (e.g. OLED, LED), hologram, TIR waveguides, and the like. In embodiments, lighting systems used in connection with the display optics may be solid state lighting systems, such as LED, OLED, quantum dot, quantum dot LED, etc. In addition, the optical configuration may be monocular or binocular. It may also include vision corrective optical components. In embodiments, the optics may be packaged as contact lenses. In other embodiments, the HWC 102 may be in the form of a helmet with a see-through shield, sunglasses, safety glasses, goggles, a mask, fire helmet with see-through shield, police helmet with see through shield, military helmet with see-through shield, utility form customized to a certain work task (e.g. inventory control, logistics, repair, maintenance, etc.), and the like.

The HWC 102 may also have a number of integrated computing facilities, such as an integrated processor, integrated power management, communication structures (e.g. cell net, WiFi, Bluetooth, local area connections, mesh connections, remote connections (e.g. client server, etc.)), and the like. The HWC 102 may also have a number of positional awareness sensors, such as GPS, electronic compass, altimeter, tilt sensor, IMU, and the like. It may also have other sensors such as a camera, rangefinder, hyperspectral camera, Geiger counter, microphone, spectral illumination detector, temperature sensor, chemical sensor, biologic sensor, moisture sensor, ultrasonic sensor, and the like.

The HWC 102 may also have integrated control technologies. The integrated control technologies may be contextual based control, passive control, active control, user control, and the like. For example, the HWC 102 may have an integrated sensor (e.g. camera) that captures user hand or body gestures 116 such that the integrated processing system can interpret the gestures and generate control commands for the HWC 102. In another example, the HWC 102 may have sensors that detect movement (e.g. a nod, head shake, and the like) including accelerometers, gyros and other inertial measurements, where the integrated processor may interpret the movement and generate a control command in response. The HWC 102 may also automatically control itself based on measured or perceived environmental conditions. For example, if it is bright in the environment the HWC 102 may increase the brightness or contrast of the displayed image. In embodiments, the integrated control technologies may be mounted on the HWC 102 such that a user can interact with it directly. For example, the HWC 102 may have a button(s), touch capacitive interface, and the like.

As described herein, the HWC 102 may be in communication with external user interfaces 104. The external user interfaces may come in many different forms. For example, a cell phone screen may be adapted to take user input for control of an aspect of the HWC 102. The external user interface may be a dedicated UI (e.g. air mouse, finger mounted mouse), such as a keyboard, touch surface, button(s), joy stick, and the like. In embodiments, the external controller may be integrated into another device such as a ring, watch, bike, car, and the like. In each case, the external user interface 104 may include sensors (e.g. IMU, accelerometers, compass, altimeter, and the like) to provide additional input for controlling the HWD 104.

As described herein, the HWC 102 may control or coordinate with other local devices 108. The external devices 108 may be an audio device, visual device, vehicle, cell phone, computer, and the like. For instance, the local external device 108 may be another HWC 102, where information may then be exchanged between the separate HWCs 108.

Similar to the way the HWC 102 may control or coordinate with local devices 106, the HWC 102 may control or coordinate with remote devices 112, such as the HWC 102 communicating with the remote devices 112 through a network 110. Again, the form of the remote device 112 may have many forms. Included in these forms is another HWC 102. For example, each HWC 102 may communicate its GPS position such that all the HWCs 102 know where all of HWC 102 are located.

Figure 2:
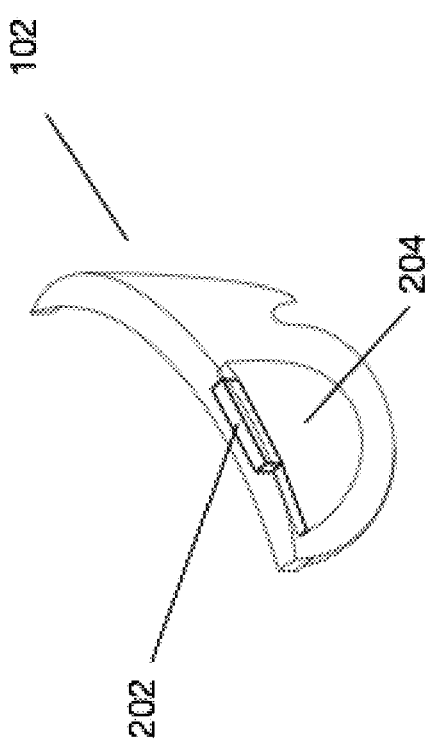
FIG. 2 illustrates a head worn computing system with optical system in accordance with the principles of the present disclosure.

FIG. 2 illustrates a HWC 102 with an optical system that includes an upper optical module 202 and a lower optical module 204. While the upper and lower optical modules 202 and 204 will generally be described as separate modules, it should be understood that this is illustrative only and the present disclosure includes other physical configurations, such as that when the two modules are combined into a single module or where the elements making up the two modules are configured into more than two modules. In embodiments, the upper module 202 includes a computer controlled display (e.g. LCoS, FLCoS, DLP, OLED, backlit LCD, etc.) and image light delivery optics. In embodiments, the lower module includes eye delivery optics that are configured to receive the upper module's image light and deliver the image light to the eye of a wearer of the HWC. In FIG. 2, it should be noted that while the upper and lower optical modules 202 and 204 are illustrated in one side of the HWC such that image light can be delivered to one eye of the wearer, that it is envisioned by the present disclosure that embodiments will contain two image light delivery systems, one for each eye.

Figure 3:
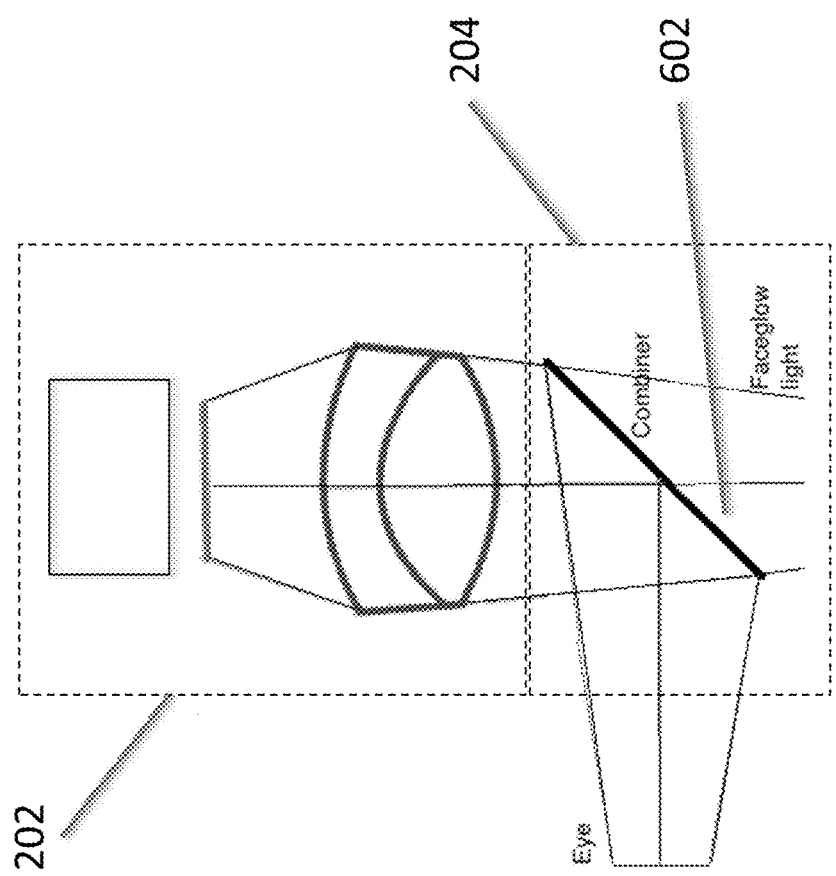
FIG. 3 illustrates upper and lower optical modules in accordance with the principles of the present disclosure.

FIG. 3 illustrates a combination of an upper optical module 202 with a lower optical module 204. In this embodiment, the image light projected from the upper optical module 202 may or may not be polarized. The image light is reflected off a flat combiner element 602 such that it is directed towards the user's eye. Wherein, the combiner element 602 is a partial mirror that reflects image light while transmitting a substantial portion of light from the environment so the user can look through the combiner element and see the environment surrounding the HWC.

The combiner 602 may include a holographic pattern, to form a holographic mirror. If a monochrome image is desired, there may be a single wavelength reflection design for the holographic pattern on the surface of the combiner 602. If the intention is to have multiple colors reflected from the surface of the combiner 602, a multiple wavelength holographic mirror maybe included on the combiner surface. For example, in a three-color embodiment, where red, green and blue pixels are generated in the image light, the holographic mirror may be reflective to wavelengths substantially matching the wavelengths of the red, green and blue light provided in the image light. This configuration can be used as a wavelength specific mirror where pre-determined wavelengths of light from the image light are reflected to the user's eye. This configuration may also be made such that substantially all other wavelengths in the visible pass through the combiner element 602 so the user has a substantially clear view of the environmental surroundings when looking through the combiner element 602. The transparency between the user's eye and the surrounding may be approximately 80% when using a combiner that is a holographic mirror. Wherein holographic mirrors can be made using lasers to produce interference patterns in the holographic material of the combiner where the wavelengths of the lasers correspond to the wavelengths of light that are subsequently reflected by the holographic mirror.

In another embodiment, the combiner element 602 may include a notch mirror comprised of a multilayer coated substrate wherein the coating is designed to substantially reflect the wavelengths of light provided in the image light by the light source and substantially transmit the remaining wavelengths in the visible spectrum. For example, in the case where red, green and blue light is provided by the light source in the upper optics to enable full color images to be provided to the user, the notch mirror is a tristimulus notch mirror wherein the multilayer coating is designed to substantially reflect narrow bands of red, green and blue light that are matched to the what is provided by the light source and the remaining visible wavelengths are substantially transmitted through the coating to enable a view of the environment through the combiner. In another example where monochrome images are provided to the user, the notch mirror is designed to reflect a single narrow band of light that is matched to the wavelength range of the image light provided by the upper optics while transmitting the remaining visible wavelengths to enable a see-thru view of the environment. The combiner 602 with the notch mirror would operate, from the user's perspective, in a manner similar to the combiner that includes a holographic pattern on the combiner element 602. The combiner, with the tristimulus notch mirror, would reflect image light associated with pixels, to the eye because of the match between the reflective wavelengths of the notch mirror and the wavelengths or color of the image light, and the wearer would simultaneously be able to see with high clarity the environmental surroundings. The transparency between the user's eye and the surrounding may be approximately 80% when using the tristimulus notch mirror. In addition, the image provided with the notch mirror combiner can provide higher contrast images than the holographic mirror combiner because the notch mirror acts in a purely reflective manner compared to the holographic mirror which operates through diffraction, and as such the notch mirror is subject to less scattering of the imaging light by the combiner. In another embodiment, the combiner element 602 may include a simple partial mirror that reflects a portion (e.g. 50%) of all wavelengths of light in the visible.

Image light can escape through the combiner 602 and may produce face glow from the optics shown in FIG. 3, as the escaping image light is generally directed downward onto the cheek of the user. When using a holographic mirror combiner or a tristimulus notch mirror combiner, the escaping light can be trapped to avoid face glow. In embodiments, if the image light is polarized before the combiner, a linear polarizer can be laminated, or otherwise associated, to the combiner, with the transmission axis of the polarizer oriented relative to the polarized image light so that any escaping image light is absorbed by the polarizer. In embodiments, the image light would be polarized to provide S polarized light to the combiner for better reflection. As a result, the linear polarizer on the combiner would be oriented to absorb S polarized light and pass P polarized light. This provides the preferred orientation of polarized sunglasses as well.

If the image light is unpolarized, a microlouvered film such as a privacy filter can be used to absorb the escaping image light while providing the user with a see-thru view of the environment. In this case, the absorbance or transmittance of the microlouvered film is dependent on the angle of the light,. Where steep angle light is absorbed and light at less of an angle is transmitted. For this reason, in an embodiment, the combiner with the microlouver film is angled at greater than 45 degrees to the optical axis of the image light (e.g. the combiner can be oriented at 50 degrees so the image light from the file lens is incident on the combiner at an oblique angle.

Figure 4:
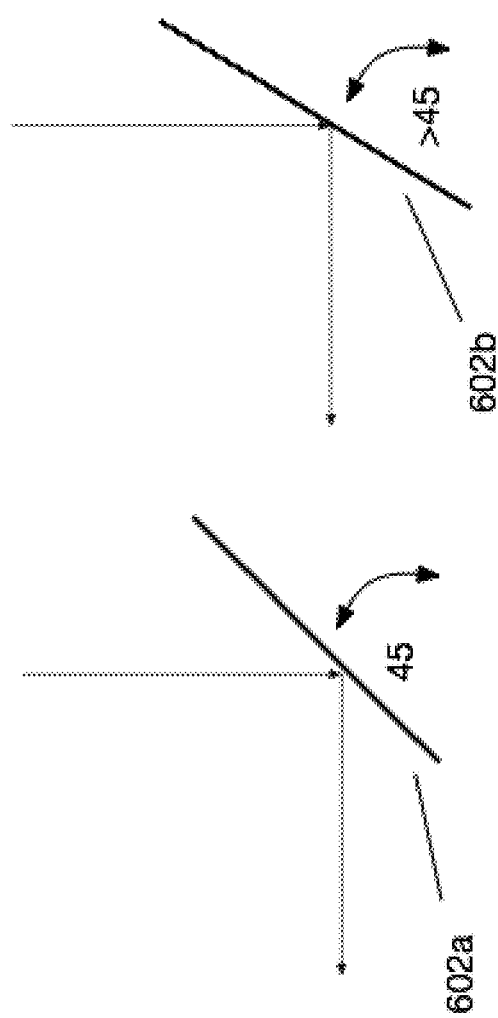
FIG. 4 illustrates angles of combiner elements in accordance with the principles of the present disclosure.

FIG. 4 illustrates an embodiment of a combiner element 602 at various angles when the combiner element 602 includes a holographic mirror. Normally, a mirrored surface reflects light at an angle equal to the angle that the light is incident to the mirrored surface. Typically, this necessitates that the combiner element be at 45 degrees, 602a, if the light is presented vertically to the combiner so the light can be reflected horizontally towards the wearer's eye. In embodiments, the incident light can be presented at angles other than vertical to enable the mirror surface to be oriented at other than 45 degrees, but in all cases wherein a mirrored surface is employed (including the tristimulus notch mirror described previously), the incident angle equals the reflected angle. As a result, increasing the angle of the combiner 602a requires that the incident image light be presented to the combiner 602a at a different angle which positions the upper optical module 202 to the left of the combiner as shown in FIG. 4. In contrast, a holographic mirror combiner, included in embodiments, can be made such that light is reflected at a different angle from the angle that the light is incident onto the holographic mirrored surface. This allows freedom to select the angle of the combiner element 602b independent of the angle of the incident image light and the angle of the light reflected into the wearer's eye. In embodiments, the angle of the combiner element 602b is greater than 45 degrees (shown in FIG. 4) as this allows a more laterally compact HWC design. The increased angle of the combiner element 602b decreases the front to back width of the lower optical module 204 and may allow for a thinner HWC display (i.e. the furthest element from the wearer's eye can be closer to the wearer's face).

Figure 5:
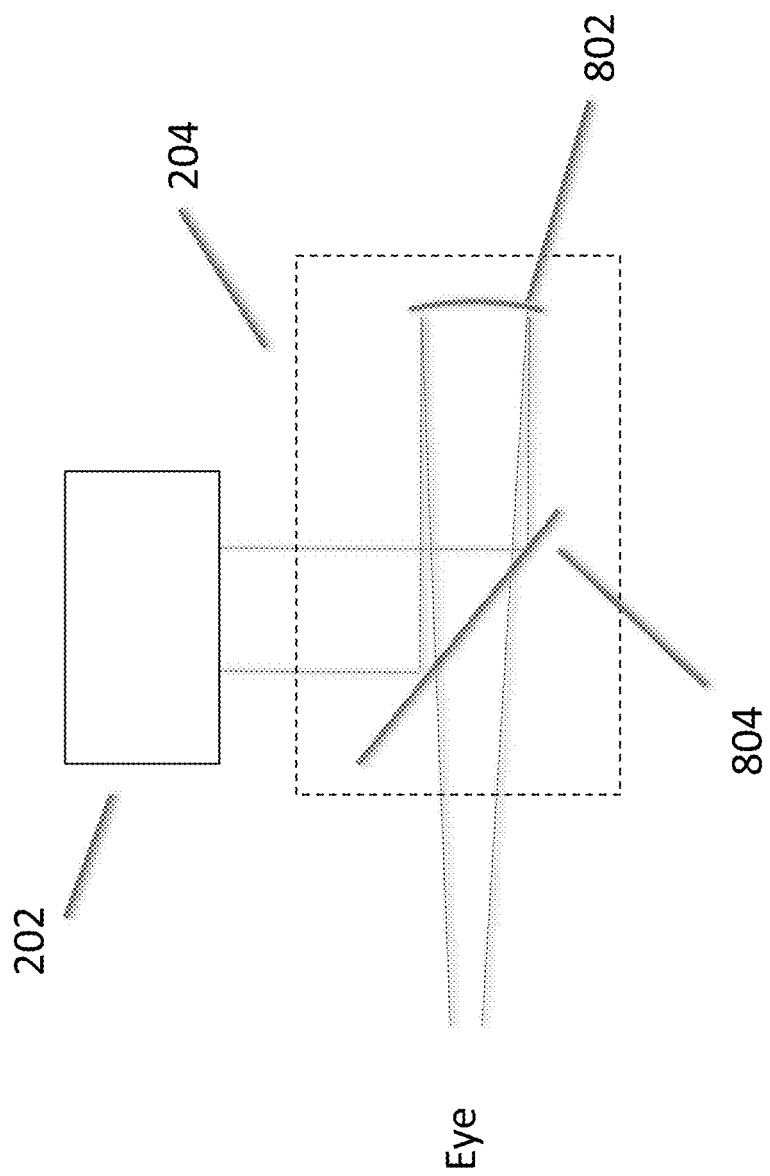
FIG. 5 illustrates upper and lower optical modules in accordance with the principles of the present disclosure.

FIG. 5 illustrates another embodiment of a lower optical module 204. In this embodiment, polarized or unpolarized image light provided by the upper optical module 202, is directed into the lower optical module 204. The image light reflects off a partial mirror 804 (e.g. polarized mirror, notch mirror, holographic mirror, etc.) and is directed toward a curved partially reflective mirror 802. The curved partial mirror 802 then reflects the image light back towards the user's eye, which passes through the partial mirror 804. The user can also see through the partial mirror 804 and the curved partial mirror 802 to see the surrounding environment. As a result, the user perceives a combined image comprised of the displayed image light overlaid onto the see-thru view of the environment. In a preferred embodiment, the partial mirror 804 and the curved partial mirror 802 are both non-polarizing so that the transmitted light from the surrounding environment is unpolarized so that rainbow interference patterns are eliminated when looking at polarized light in the environment such as provided by a computer monitor or in the reflected light from a lake.

While many of the embodiments of the present disclosure have been referred to as upper and lower modules containing certain optical components, it should be understood that the image light production and management functions described in connection with the upper module may be arranged to direct light in other directions (e.g. upward, sideward, etc.). In embodiments, it may be preferred to mount the upper module 202 above the wearer's eye, in which case the image light would be directed downward. In other embodiments it may be preferred to produce light from the side of the wearer's eye, or from below the wearer's eye. In addition, the lower optical module is generally configured to deliver the image light to the wearer's eye and allow the wearer to see through the lower optical module, which may be accomplished through a variety of optical components.

Figure 6:
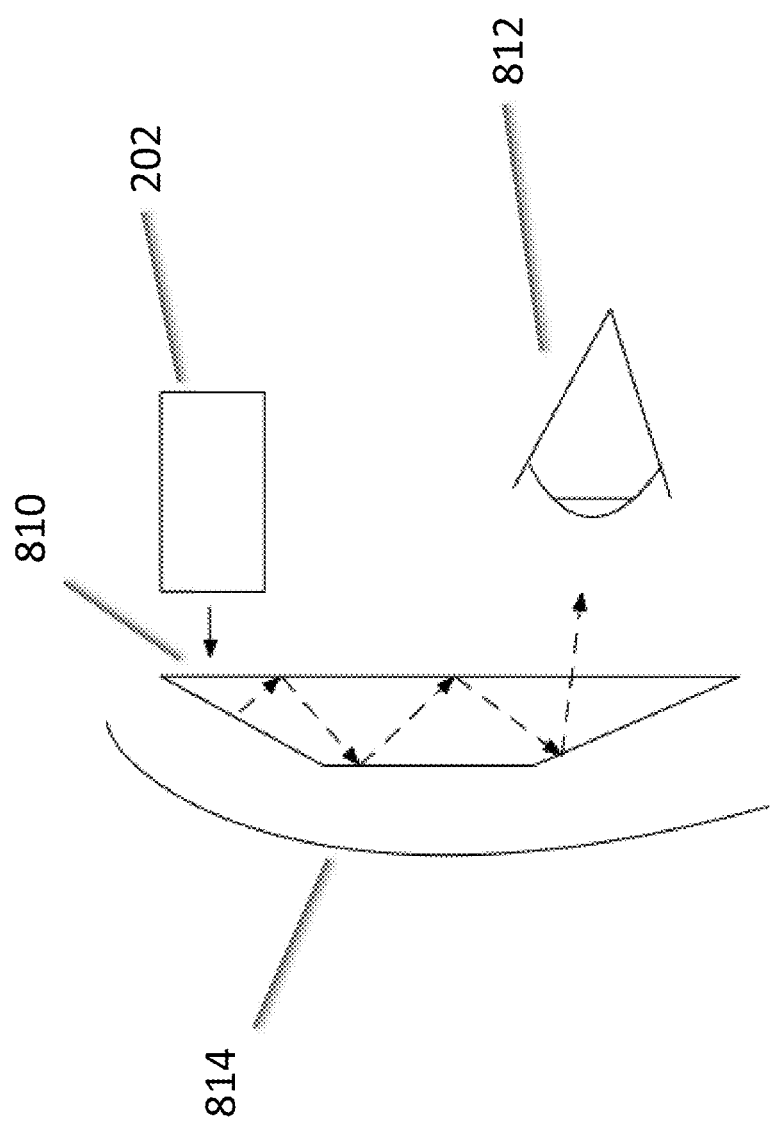
FIG. 6 illustrates upper and lower optical modules in accordance with the principles of the present disclosure.

FIG. 6 illustrates an embodiment of the present disclosure where the upper optical module 202 is arranged to direct image light into a total internal reflection (TIR) waveguide 810. In this embodiment, the upper optical module 202 is positioned above the wearer's eye 812 and the light is directed horizontally into the TIR waveguide 810. The TIR waveguide is designed to internally reflect the image light in a series of downward TIR reflections until it reaches the portion in front of the wearer's eye, where the light passes out of the TIR waveguide 812 in a direction toward the wearer's eye. In this embodiment, an outer shield 814 may be positioned in front of the TIR waveguide 810.

Figure 7:
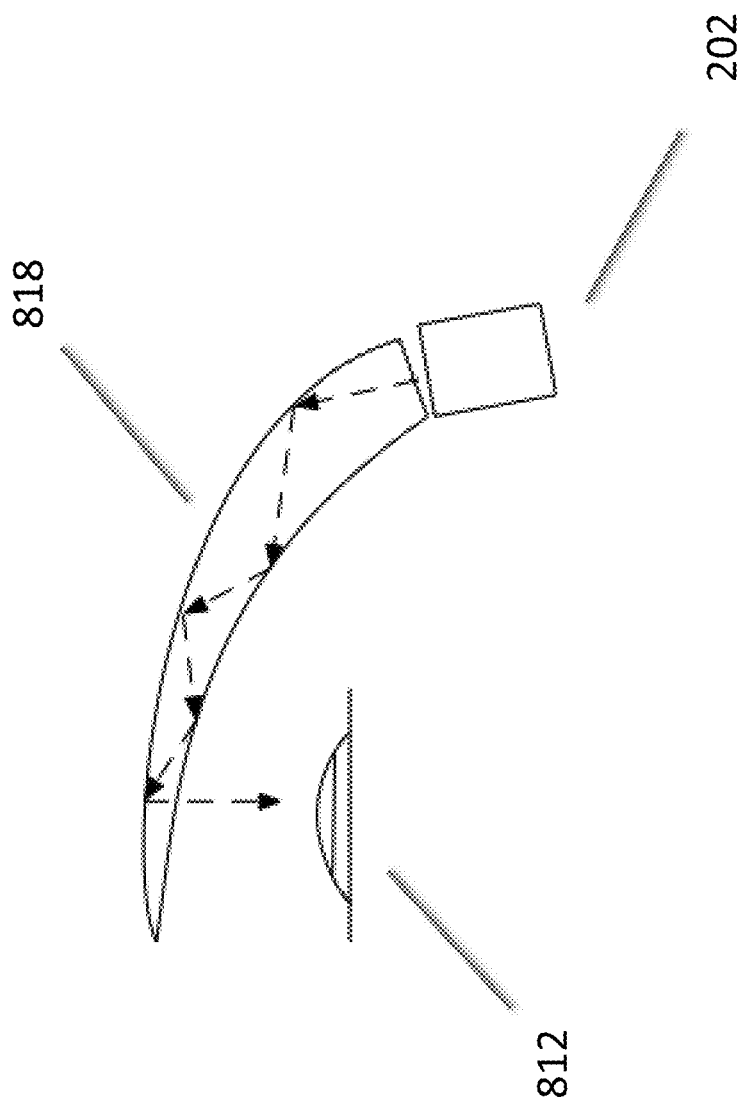
FIG. 7 illustrates upper and lower optical modules in accordance with the principles of the present disclosure.

FIG. 7 illustrates an embodiment of the present disclosure where the upper optical module 202 is arranged to direct image light into a TIR waveguide 818. In this embodiment, the upper optical module 202 is arranged on the side of the TIR waveguide 818. For example, the upper optical module may be positioned in the arm or near the arm of the HWC when configured as a pair of head worn glasses. The TIR waveguide 818 is designed to internally reflect the image light in a series of TIR reflections until it reaches the portion in front of the wearer's eye, where the light passes out of the TIR waveguide 818 in a direction toward the wearer's eye 812.

Figure 8:
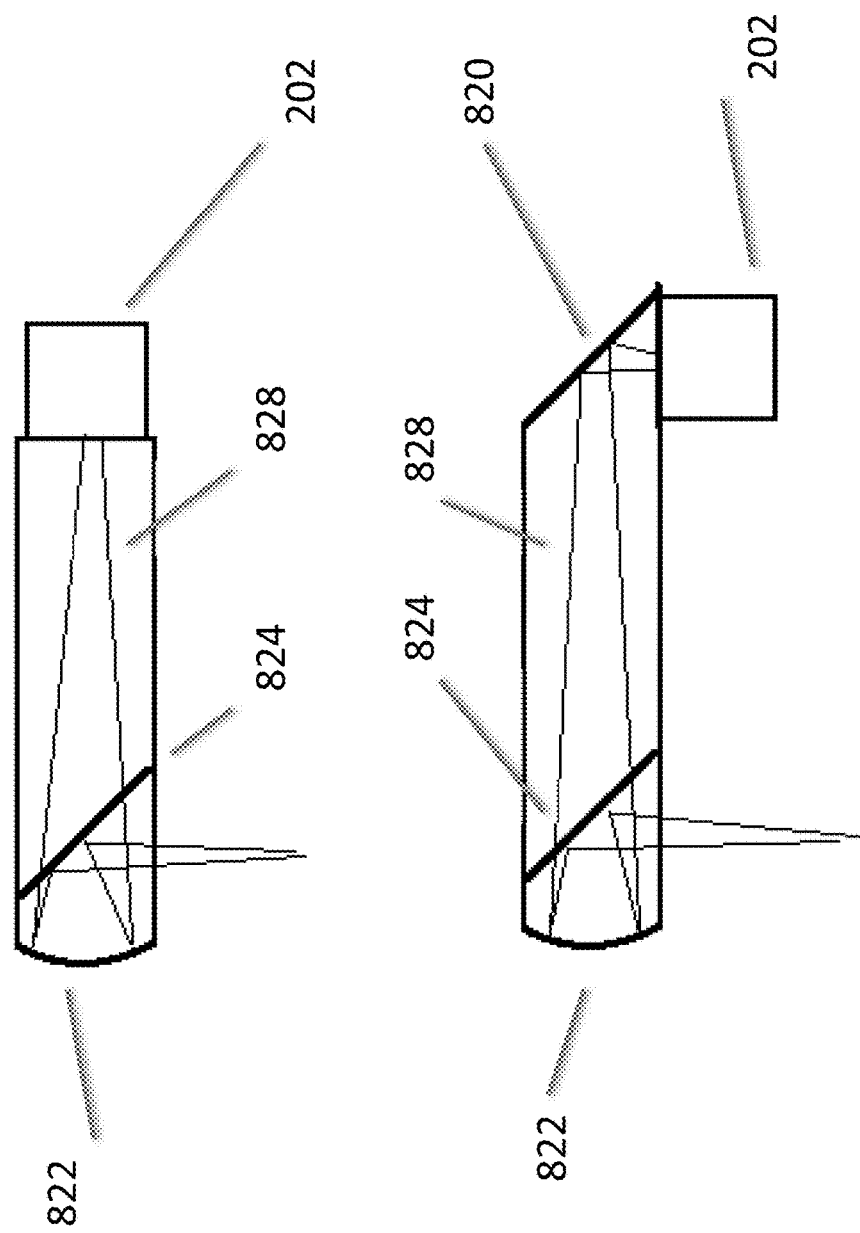
FIG. 8 illustrates upper and lower optical modules in accordance with the principles of the present disclosure.

FIG. 8 illustrates yet further embodiments of the present disclosure where an upper optical module 202 directs polarized image light into an optical guide 828 where the image light passes through a polarized reflector 824, changes polarization state upon reflection of the optical element 822 which includes a ¼ wave film for example and then is reflected by the polarized reflector 824 towards the wearer's eye, due to the change in polarization of the image light. The upper optical module 202 may be positioned behind the optical guide 828 wherein the image light is directed toward a mirror 820 that reflects the image light along the optical guide 828 and towards the polarized reflector 824. Alternatively, in other embodiments, the upper optical module 202 may direct the image light directly along the optical guide 828 and towards the polarized reflector 824. It should be understood that the present disclosure comprises other optical arrangements intended to direct image light into the wearer's eye.

Figure 9:
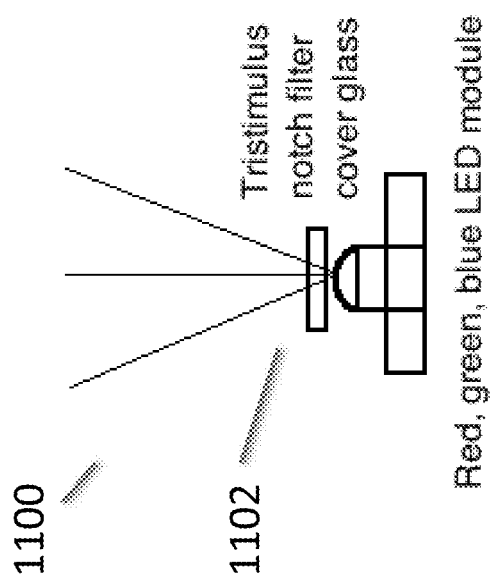
FIGS. 9, 10a, 10b and 11 illustrate light sources and filters in accordance with the principles of the present disclosure.
Figure 10A:
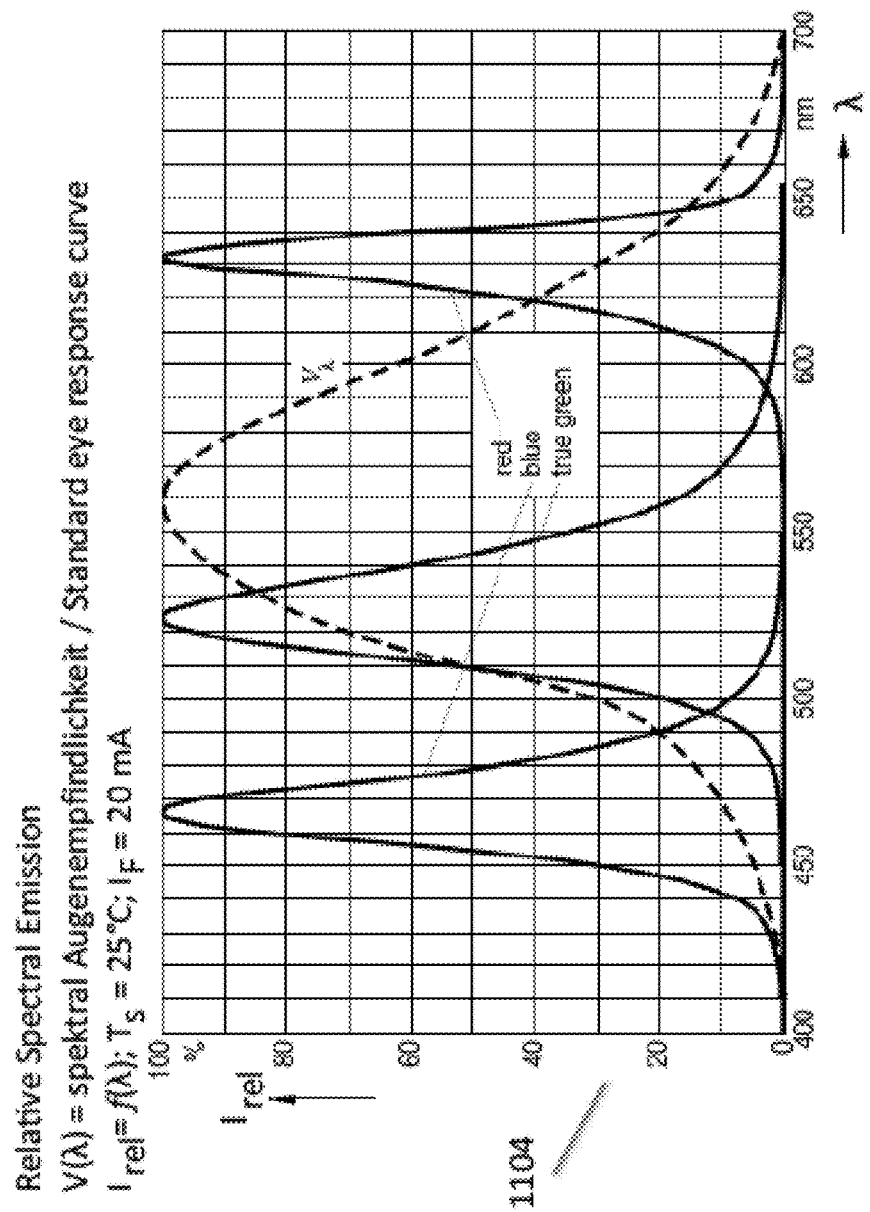
Figure 10B:
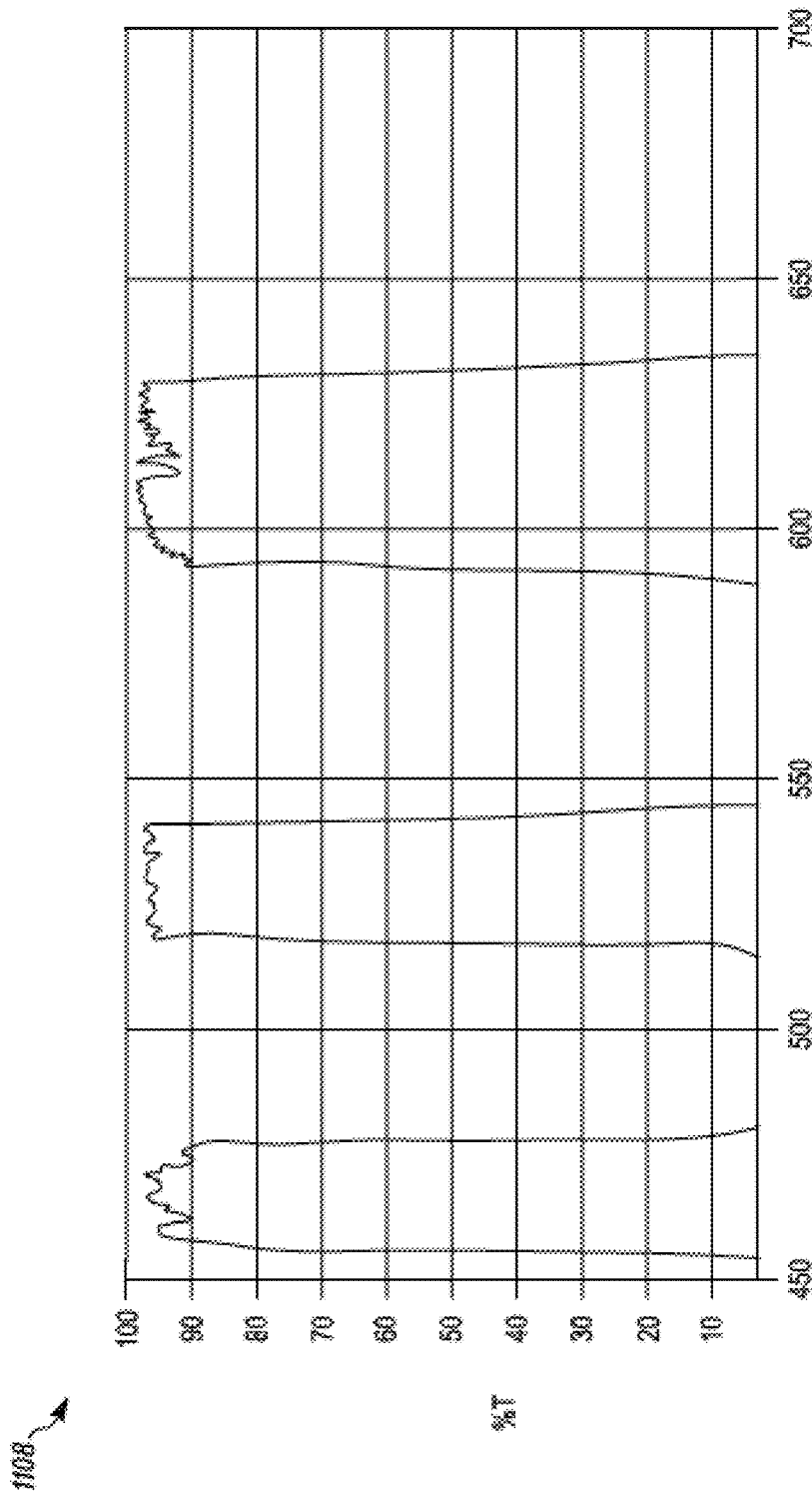
Figure 11:
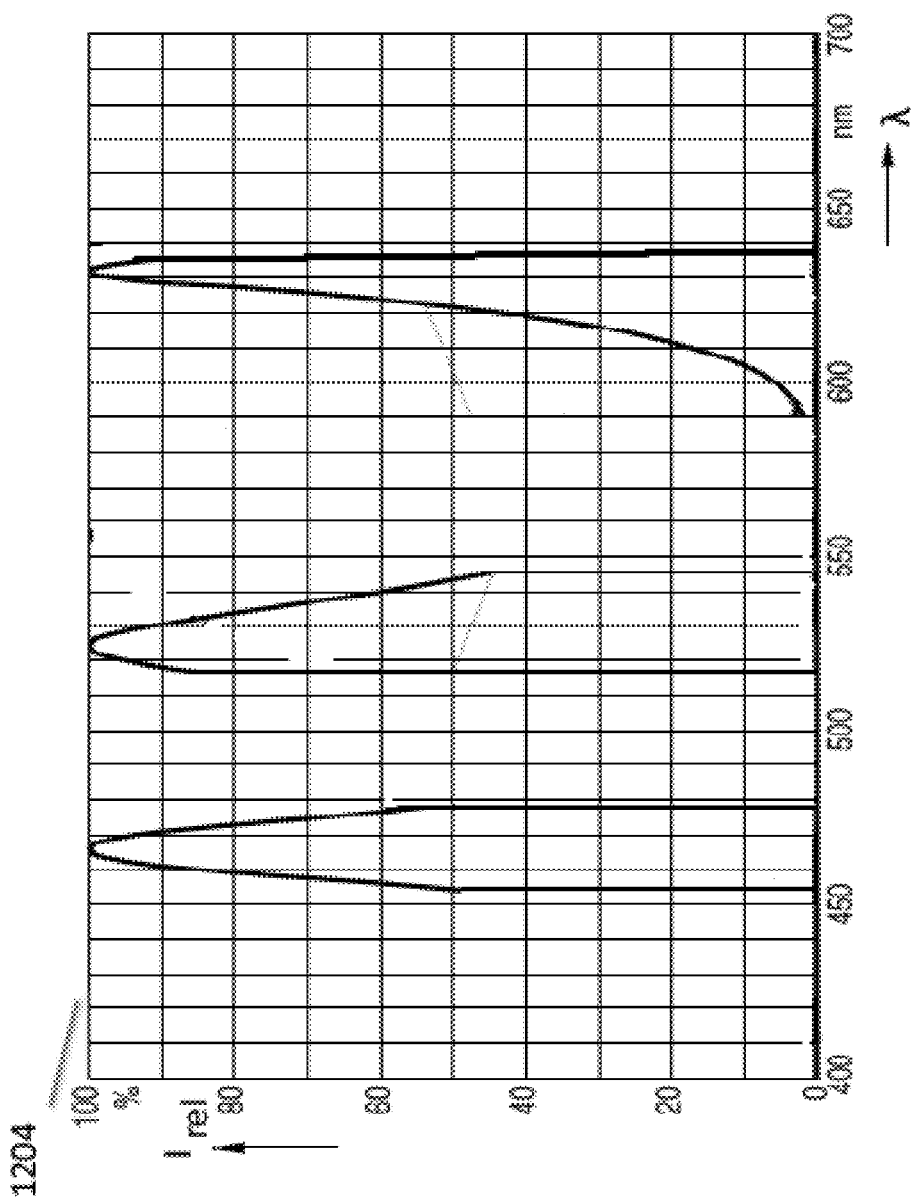

FIG. 9 illustrates a light source 1100 that may be used in association with the upper optics module 202. In embodiments, the light source 1100 may provide light to a backlighting optical system that is associated with the light source 1100 and which serves to homogenize the light and thereby provide uniform illuminating light to an image source in the upper optics. In embodiments, the light source 1100 includes a tristimulus notch filter 1102. The tristimulus notch filter 1102 has narrow band pass filters for three wavelengths, as indicated in FIG. 10b in a transmission graph 1108. The graph shown in FIG. 10a, as 1104 illustrates an output of three different colored LEDs. One can see that the bandwidths of emission are narrow, but they have long tails. The tristimulus notch filter 1102 can be used in connection with such LEDs to provide a light source 1100 that emits narrow filtered wavelengths of light as shown in FIG. 11 as the transmission graph 1110. Wherein the clipping effects of the tristimulus notch filter 1102 can be seen to have cut the tails from the LED emission graph 1104 to provide narrower wavelength bands of light to the upper optical module 202. The light source 1100 can be used in connection with a matched combiner 602 that includes a holographic mirror or tristimulus notch mirror that substantially reflects the narrow bands of image light toward the wearer's eye with a reduced amount of image light that does not get reflected by the combiner, thereby improving efficiency of the head-worn computer (HWC) or head-mounted display (HMD) and reducing escaping light that can cause faceglow.

Figure 12A:
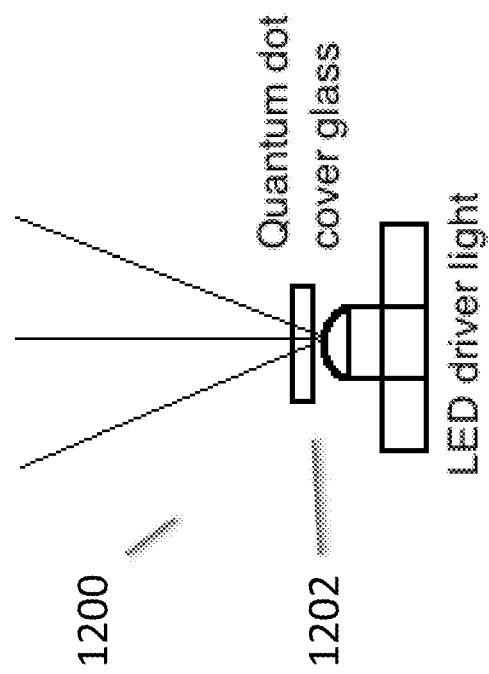
FIGS. 12a to 12c illustrate light sources and quantum dot systems in accordance with the principles of the present disclosure.
Figure 12B:
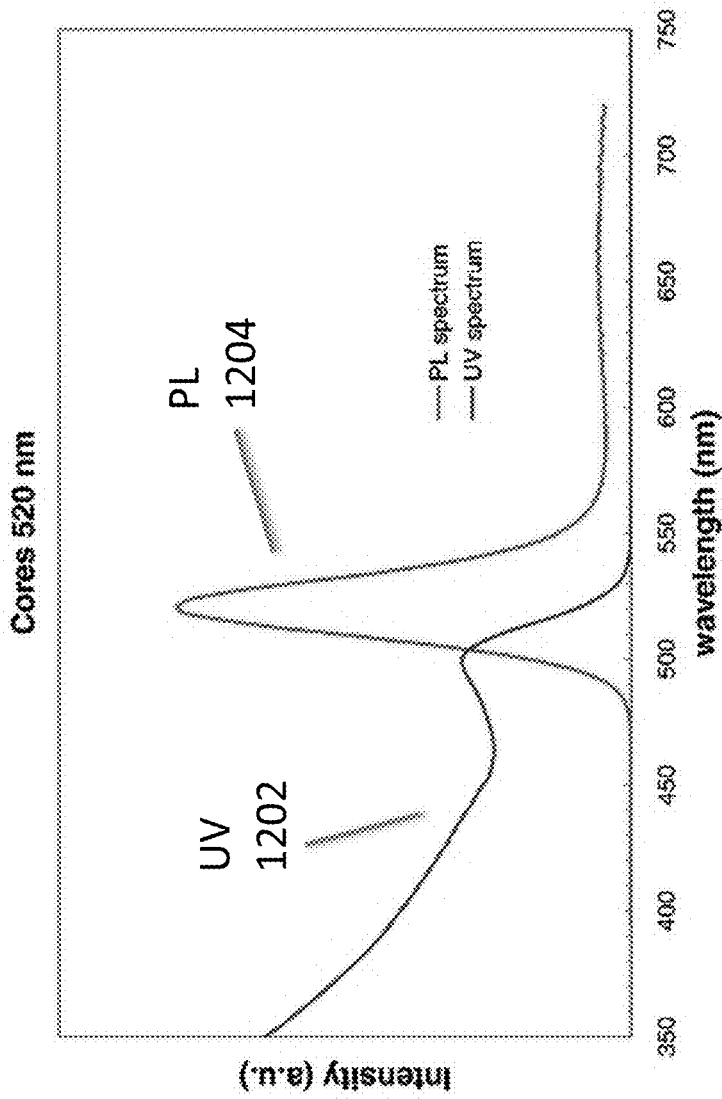
Figure 12C:
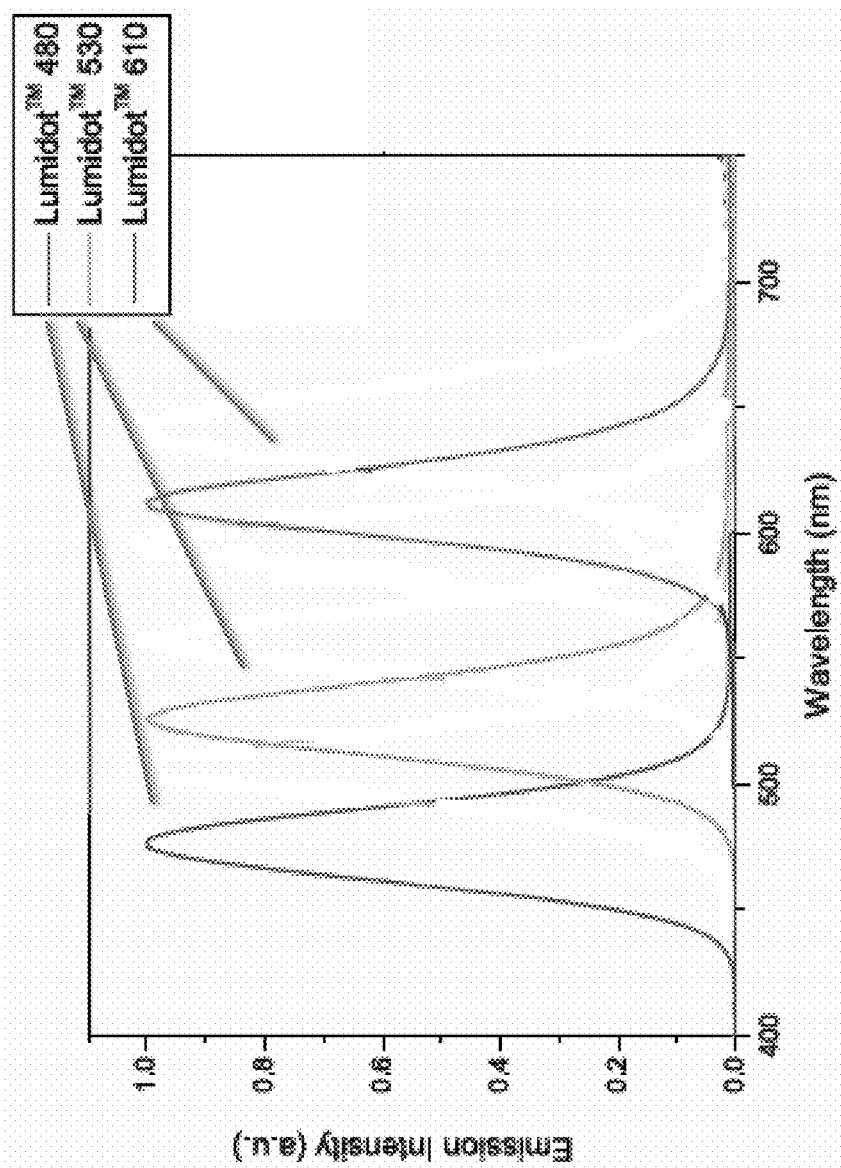

FIG. 12a illustrates another light source 1200 that may be used in association with the upper optics module 202. In embodiments, the light source 1200 may provide light to a backlighting optical system that homogenizes the light prior to illuminating the image source in the upper optics as described previously herein. In embodiments, the light source 1200 includes a quantum dot cover glass 1202. Where the quantum dots absorb light of a shorter wavelength and emit light of a longer wavelength (FIG. 12b shows an example wherein a UV spectrum 1202 applied to a quantum dot results in the quantum dot emitting a narrow band shown as a PL spectrum 1204) that is dependent on the material makeup and size of the quantum dot. As a result, quantum dots in the quantum dot cover glass 1202 can be tailored to provide one or more bands of narrow bandwidth light (e.g. red, green and blue emissions dependent on the different quantum dots included as illustrated in the graph shown in FIG. 12c where three different quantum dots are used. In embodiments, the LED driver light emits UV light, deep blue or blue light. For sequential illumination of different colors, multiple light sources 1200 would be used where each light source 1200 would include a quantum dot cover glass 1202 with at least one type of quantum dot selected to emit at one of each of the desired colors. The light source 1100 can be used in connection with a combiner 602 with a holographic mirror or tristimulus notch mirror to provide narrow bands of image light that are reflected toward the wearer's eye with less wasted image light that does not get reflected.

Another aspect of the present disclosure relates to the generation of peripheral image lighting effects for a person wearing a HWC. In embodiments, a solid state lighting system (e.g. LED, OLED, etc), or other lighting system, may be included inside the optical elements of an lower optical module 204. The solid state lighting system may be arranged such that lighting effects outside of a field of view (FOV) associated with displayed digital content is presented to create an immersive effect for the person wearing the HWC. To this end, the lighting effects may be presented to any portion of the HWC that is visible to the wearer. The solid state lighting system may be digitally controlled by an integrated processor on the HWC. In embodiments, the integrated processor will control the lighting effects in coordination with digital content that is presented within the FOV of the HWC. For example, a movie, picture, game, or other content, may be displayed or playing within the FOV of the HWC. The content may show a bomb blast on the right side of the FOV and at the same moment, the solid state lighting system inside of the upper module optics may flash quickly in concert with the FOV image effect. The effect may not be fast, it may be more persistent to indicate, for example, a general glow or color on one side of the user. The solid state lighting system may be color controlled, with red, green and blue LEDs, for example, such that color control can be coordinated with the digitally presented content within the field of view.

Figure 13A:
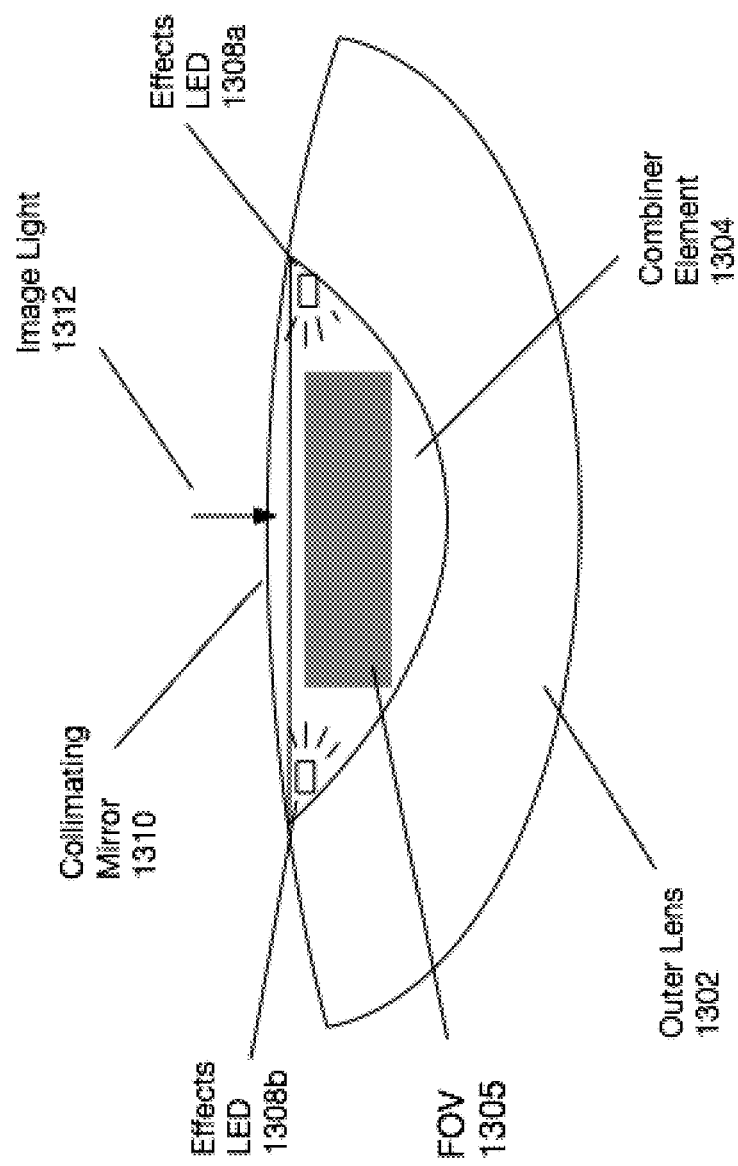

FIG. 13a illustrates optical components of a lower optical module 204 together with an outer lens 1302. FIG. 13a also shows an embodiment including effects LED's 1308a and 1308b. FIG. 13a illustrates image light 1312, as described herein elsewhere, directed into the upper optical module where it will reflect off of the combiner element 1304, as described herein elsewhere. The combiner element 1304 in this embodiment is angled towards the wearer's eye at the top of the module and away from the wearer's eye at the bottom of the module, as also illustrated and described in connection with FIG. 8 (e.g. at a 45 degree angle). The image light 1312 provided by an upper optical module 202 (not shown in FIG. 13a) reflects off of the combiner element 1304 towards the collimating mirror 1310, away from the wearer's eye, as described herein elsewhere. The image light 1312 then reflects and focuses off of the collimating mirror 1304, passes back through the combiner element 1304, and is directed into the wearer's eye. The wearer can also view the surrounding environment through the transparency of the combiner element 1304, collimating mirror 1310, and outer lens 1302 (if it is included). As described herein elsewhere, the image light may or may not be polarized and the see-through view of the surrounding environment is preferably non-polarized to provide a view of the surrounding environment that does not include rainbow interference patterns if the light from the surrounding environment is polarized such as from a computer monitor or reflections from a lake. The wearer will generally perceive that the image light forms an image in the FOV 1305. In embodiments, the outer lens 1302 may be included. The outer lens 1302 is an outer lens that may or may not be corrective and it may be designed to conceal the lower optical module components in an effort to make the HWC appear to be in a form similar to standard glasses or sunglasses.

In the embodiment illustrated in FIG. 13a, the effects LEDs 1308a and 1308b are positioned at the sides of the combiner element 1304 and the outer lens 1302 and/or the collimating mirror 1310. In embodiments, the effects LEDs 1308a are positioned within the confines defined by the combiner element 1304 and the outer lens 1302 and/or the collimating mirror. The effects LEDs 1308a and 1308b are also positioned outside of the FOV 1305 associated with the displayed digital content. In this arrangement, the effects LEDs 1308a and 1308b can provide lighting effects within the lower optical module outside of the FOV 1305. In embodiments the light emitted from the effects LEDs 1308a and 1308b may be polarized and the outer lens 1302 may include a polarizer such that the light from the effects LEDs 1308a and 1308b will pass through the combiner element 1304 toward the wearer's eye and will be absorbed by the outer lens 1302. This arrangement provides peripheral lighting effects to the wearer in a more private setting by not transmitting the lighting effects through the front of the HWC into the surrounding environment. However, in other embodiments, the effects LEDs 1308a and 1308b may be non-polarized so the lighting effects provided are made to be purposefully viewable by others in the environment for entertainment such as giving the effect of the wearer's eye glowing in correspondence to the image content being viewed by the wearer.

FIG. 13b illustrates a cross section of the embodiment described in connection with FIG. 13a. As illustrated, the effects LED 1308a is located in the upper-front area inside of the optical components of the lower optical module. It should be understood that the effects LED 1308a position in the described embodiments is only illustrative and alternate placements are encompassed by the present disclosure. Additionally, in embodiments, there may be one or more effects LEDs 1308a in each of the two sides of HWC to provide peripheral lighting effects near one or both eyes of the wearer.

Figure 13C:
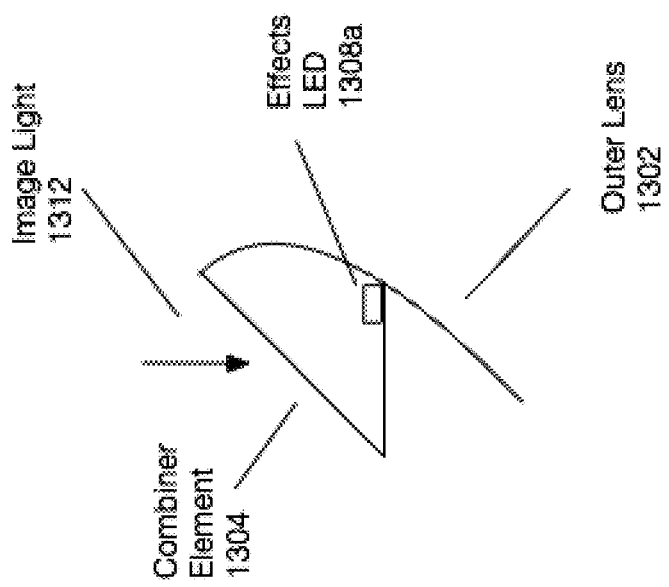

FIG. 13c illustrates an embodiment where the combiner element 1304 is angled away from the eye at the top and towards the eye at the bottom (e.g. in accordance with the holographic or notch filter embodiments described herein). In this embodiment, the effects LED 1308a may be located on the outer lens 1302 side of the combiner element 1304 to provide a concealed appearance of the lighting effects. As with other embodiments, the effects LED 1308a of FIG. 13c may include a polarizer such that the emitted light can pass through a polarized element associated with the combiner element 1304 and be blocked by a polarized element associated with the outer lens 1302. Alternatively the effects LED 13087a can be configured such that at least a portion of the light is reflected away from the wearer's eye so that it is visible to people in the surrounding environment. This can be accomplished for example by using a combiner 1304 that is a simple partial mirror so that a portion of the image light 1312 is reflected toward the wearer's eye and a first portion of the light from the effects LED 13087a is transmitted toward the wearer's eye and a second portion of the light from the effects LED 1308a is reflected outward toward the surrounding environment.

FIGS. 14a, 14b, 14c and 14d show illustrations of a HWC that includes eye covers 1402 to restrict loss of image light to the surrounding environment and to restrict the ingress of stray light from the environment. Where the eye covers 1402 can be removably attached to the HWC with magnets 1404. Another aspect of the present disclosure relates to automatically configuring the lighting system(s) used in the HWC 102. In embodiments, the display lighting and/or effects lighting, as described herein, may be controlled in a manner suitable for when an eye cover 1402 is attached or removed from the HWC 102. For example, at night, when the light in the environment is low, the lighting system(s) in the HWC may go into a low light mode to further control any amounts of stray light escaping from the HWC and the areas around the HWC. Covert operations at night, while using night vision or standard vision, may require a solution which prevents as much escaping light as possible so a user may clip on the eye cover(s) 1402 and then the HWC may go into a low light mode. The low light mode may, in some embodiments, only go into a low light mode when the eye cover 1402 is attached if the HWC identifies that the environment is in low light conditions (e.g. through environment light level sensor detection). In embodiments, the low light level may be determined to be at an intermediate point between full and low light dependent on environmental conditions.

Another aspect of the present disclosure relates to automatically controlling the type of content displayed in the HWC when eye covers 1402 are attached or removed from the HWC. In embodiments, when the eye cover(s) 1402 is attached to the HWC, the displayed content may be restricted in amount or in color amounts. For example, the display(s) may go into a simple content delivery mode to restrict the amount of information displayed. This may be done to reduce the amount of light produced by the display(s). In an embodiment, the display(s) may change from color displays to monochrome displays to reduce the amount of light produced. In an embodiment, the monochrome lighting may be red to limit the impact on the wearer's eyes to maintain an ability to see better in the dark.

Another aspect of the present disclosure relates to a system adapted to quickly convert from a see-through system to a non-see-through or very low transmission see-through system for a more immersive user experience. The conversion system may include replaceable lenses, an eye cover, and optics adapted to provide user experiences in both modes. The outer lenses, for example, may be 'blacked-out' with an opaque cover 1412 to provide an experience where all of the user's attention is dedicated to the digital content and then the outer lenses may be switched out for high see-through lenses so the digital content is augmenting the user's view of the surrounding environment. Another aspect of the disclosure relates to low transmission outer lenses that permit the user to see through the outer lenses but remain dark enough to maintain most of the user's attention on the digital content. The slight see-through can provide the user with a visual connection to the surrounding environment and this can reduce or eliminate nausea and other problems associated with total removal of the surrounding view when viewing digital content.

Figure 14A:
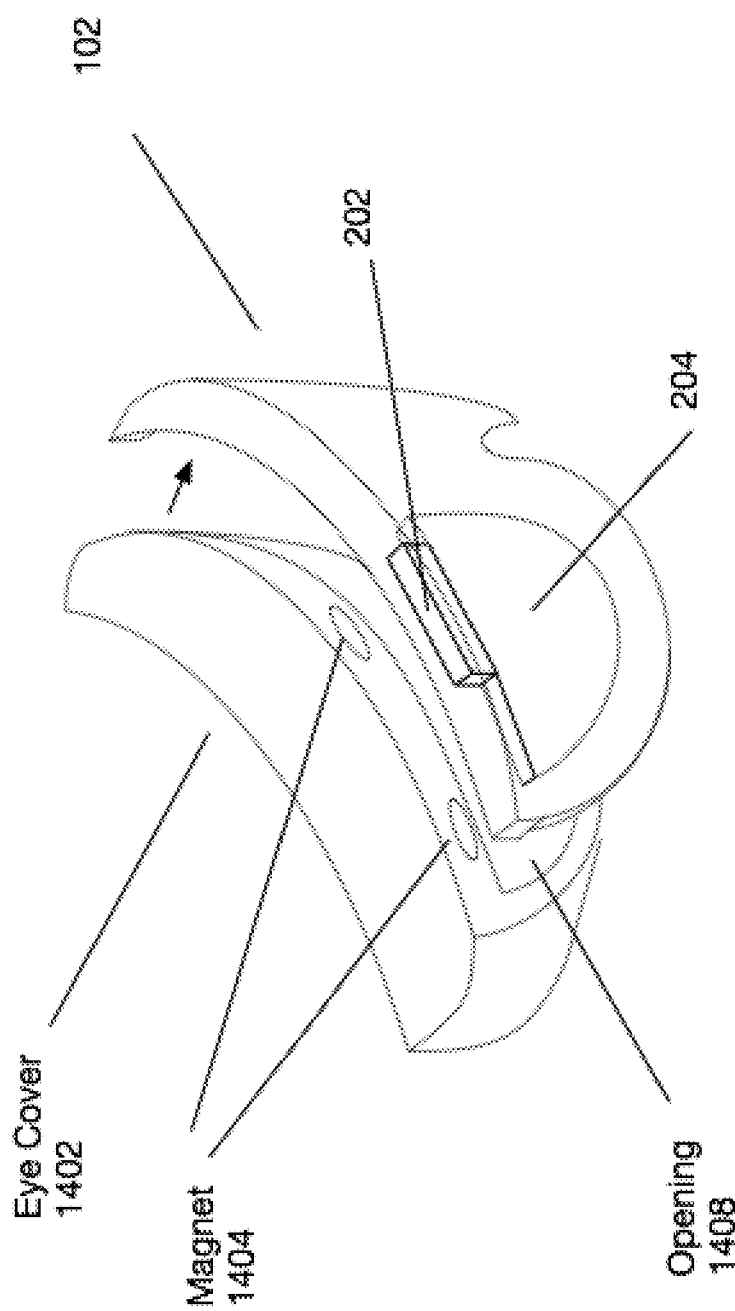
Figure 14C:
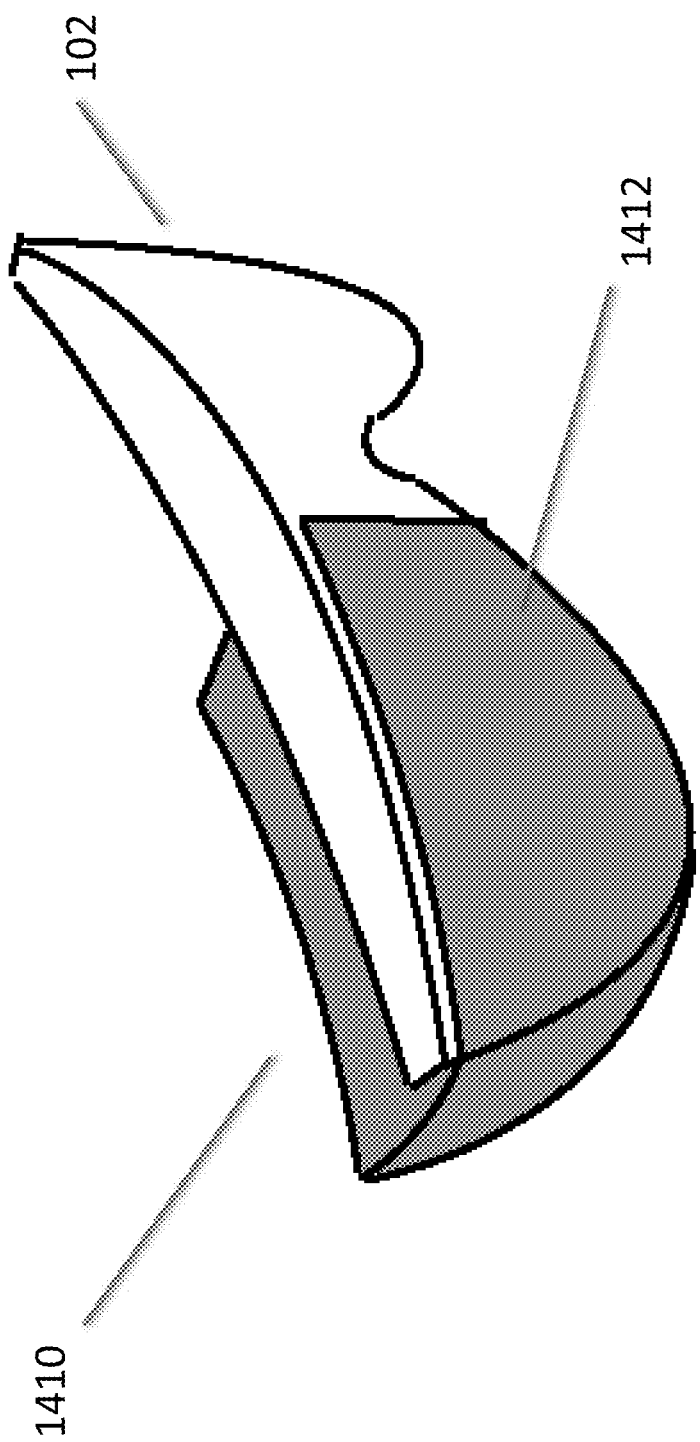
Figure 14D:
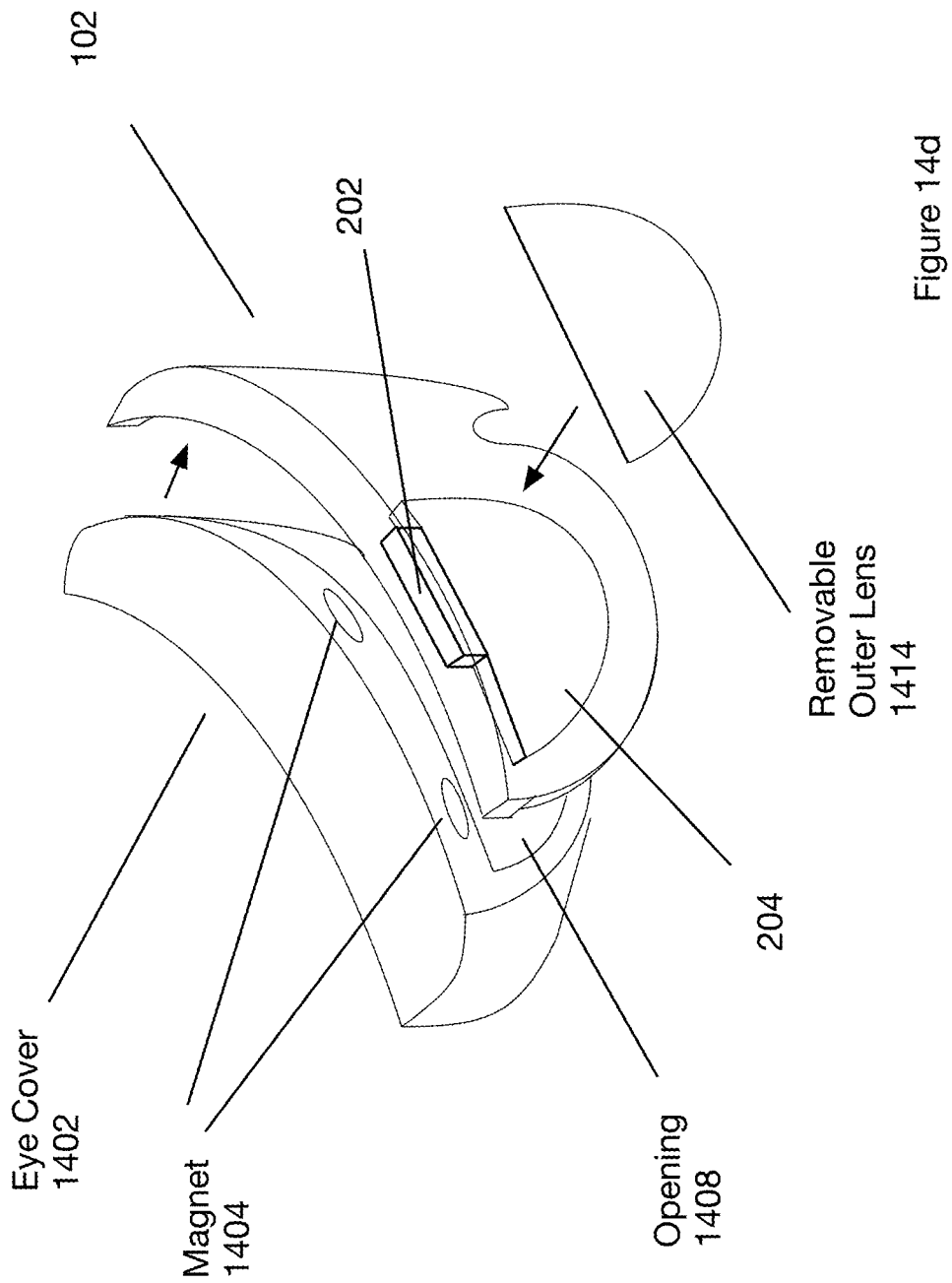

FIG. 14d illustrates a head-worn computer system 102 with a see-through digital content display 204 adapted to include a removable outer lens 1414 and a removable eye cover 1402. The eye cover 1402 may be attached to the head-worn computer 102 with magnets 1404 or other attachment systems (e.g. mechanical attachments, a snug friction fit between the arms of the head-worn computer 102, etc.). The eye cover 1402 may be attached when the user wants to cut stray light from escaping the confines of the head-worn computer, create a more immersive experience by removing the otherwise viewable peripheral view of the surrounding environment, etc. The removable outer lens 1414 may be of several varieties for various experiences. It may have no transmission or a very low transmission to create a dark background for the digital content, creating an immersive experience for the digital content. It may have a high transmission so the user can see through the see-through display and the outer lens 1414 to view the surrounding environment, creating a system for a heads-up display, augmented reality display, assisted reality display, etc. The outer lens 1414 may be dark in a middle portion to provide a dark background for the digital content (i.e. dark backdrop behind the see-through field of view from the user's perspective) and a higher transmission area elsewhere. The outer lenses 1414 may have a transmission in the range of 2 to 5%, 5 to 10%, 10 to 20% for the immersion effect and above 10% or 20% for the augmented reality effect, for example. The outer lenses 1414 may also have an adjustable transmission to facilitate the change in system effect. For example, the outer lenses 1414 may be electronically adjustable tint lenses (e.g. liquid crystal or have crossed polarizers with an adjustment for the level of cross).

In embodiments, the eye cover 1402 may have areas of transparency or partial transparency to provide some visual connection with the user's surrounding environment. This may also reduce or eliminate nausea or other feelings associated with the complete removal of the view of the surrounding environment.

Figure 14E:
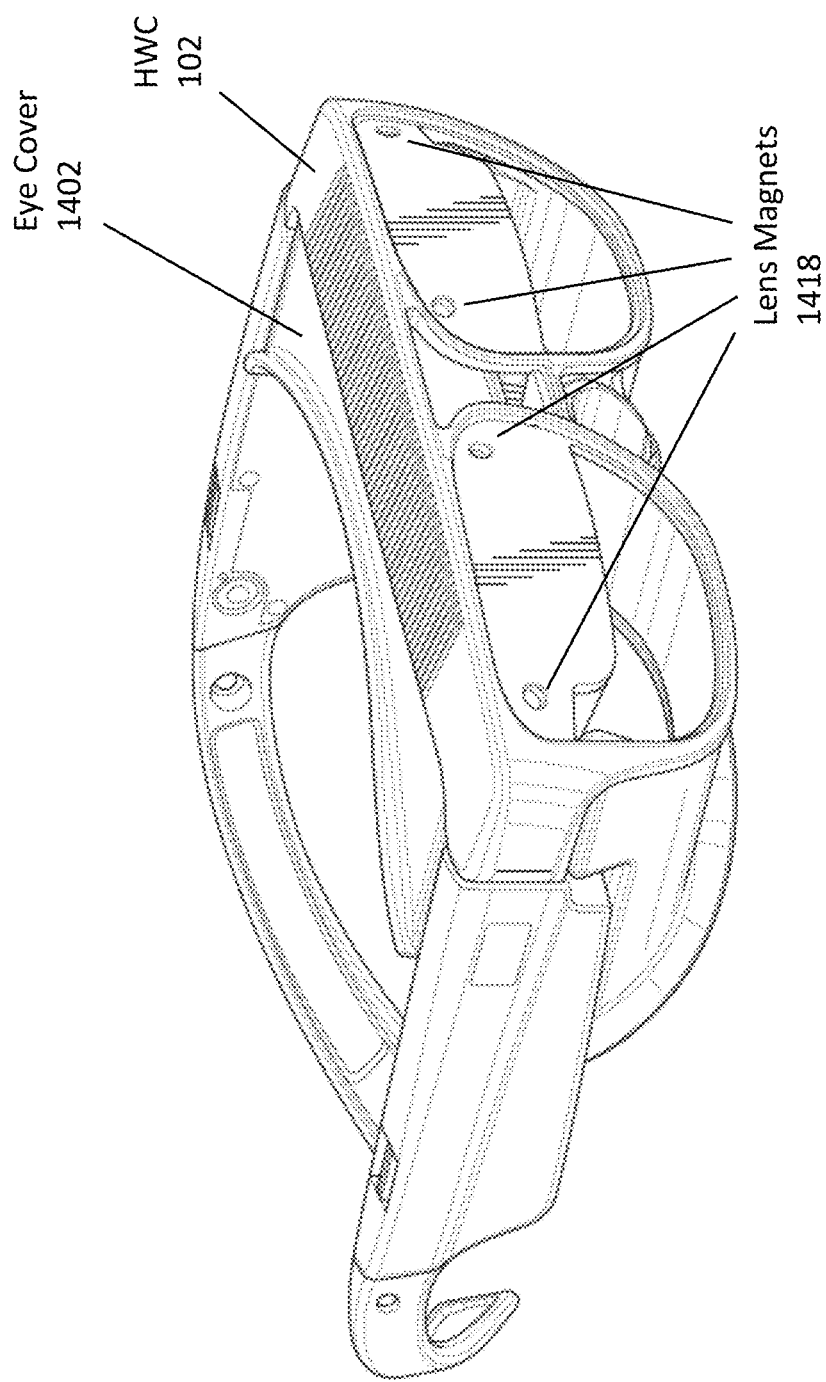

FIG. 14e illustrates a HWC 102 assembled with an eye cover 1402 without outer lenses in place. The outer lenses, in embodiments, may be held in place with magnets 1418 for ease of removal and replacement. In embodiments, the outer lenses may be held in place with other systems, such as mechanical systems.

Figure 14F:
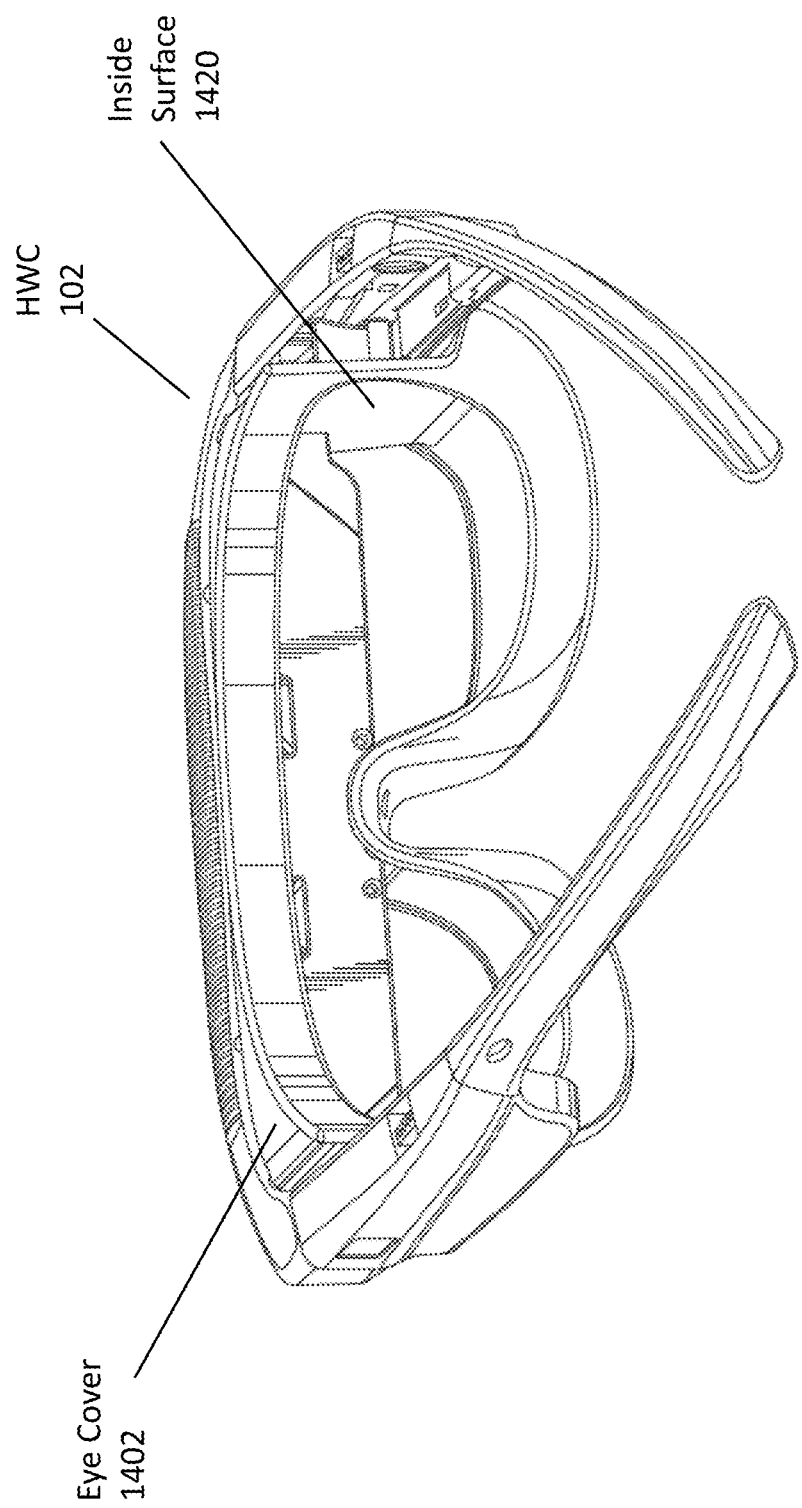

Another aspect of the present disclosure relates to an effects system that generates effects outside of the field of view in the see-through display of the head-worn computer. The effects may be, for example, lighting effects, sound effects, tactile effects (e.g. through vibration), air movement effects, etc. In embodiments, the effect generation system is mounted on the eye cover 1402. For example, a lighting system (e.g. LED(s), OLEDs, etc.) may be mounted on an inside surface 1420, or exposed through the inside surface 1420, as illustrated in FIG. 14f, such that they can create a lighting effect (e.g. a bright light, colored light, subtle color effect) in coordination with content being displayed in the field of view of the see-through display. The content may be a movie or a game, for example, and an explosion may happen on the right side of the content, as scripted, and matching the content, a bright flash may be generated by the effects lighting system to create a stronger effect. As another example, the effects system may include a vibratory system mounted near the sides or temples, or otherwise, and when the same explosion occurs, the vibratory system may generate a vibration on the right side to increase the user experience indicating that the explosion had a real sound wave creating the vibration. As yet a further example, the effects system may have an air system where the effect is a puff of air blown onto the user's face. This may create a feeling of closeness with some fast moving object in the content. The effects system may also have speakers directed towards the user's ears or an attachment for ear buds, etc.

In embodiments, the effects generated by the effects system may be scripted by an author to coordinate with the content. In embodiments, sensors may be placed inside of the eye cover to monitor content effects (e.g. a light sensor to measure strong lighting effects or peripheral lighting effects) that would than cause an effect(s) to be generated.

The effects system in the eye cover may be powered by an internal battery and the battery, in embodiments, may also provide additional power to the head-worn computer 102 as a back-up system. In embodiments, the effects system is powered by the batteries in the head-worn computer. Power may be delivered through the attachment system (e.g. magnets, mechanical system) or a dedicated power system.

The effects system may receive data and/or commands from the head-worn computer through a data connection that is wired or wireless. The data may come through the attachment system, a separate line, or through Bluetooth or other short range communication protocol, for example.

In embodiments, the eye cover 1402 is made of reticulated foam, which is very light and can contour to the user's face. The reticulated foam also allows air to circulate because of the open-celled nature of the material, which can reduce user fatigue and increase user comfort. The eye cover 1402 may be made of other materials, soft, stiff, priable, etc. and may have another material on the periphery that contacts the face for comfort. In embodiments, the eye cover 1402 may include a fan to exchange air between an external environment and an internal space, where the internal space is defined in part by the face of the user. The fan may operate very slowly and at low power to exchange the air to keep the face of the user cool. In embodiments the fan may have a variable speed controller and/or a temperature sensor may be positioned to measure temperature in the internal space to control the temperature in the internal space to a specified range, temperature, etc. The internal space is generally characterized by the space confined space in front of the user's eyes and upper cheeks where the eye cover encloses the area.

Another aspect of the present disclosure relates to flexibly mounting an audio headset on the head-worn computer 102 and/or the eye cover 1402. In embodiments, the audio headset is mounted with a relatively rigid system that has flexible joint(s) (e.g. a rotational joint at the connection with the eye cover, a rotational joint in the middle of a rigid arm, etc.) and extension(s) (e.g. a telescopic arm) to provide the user with adjustability to allow for a comfortable fit over, in or around the user's ear. In embodiments, the audio headset is mounted with a flexible system that is more flexible throughout, such as with a wire-based connection.

FIG. 14g illustrates a head-worn computer 102 with removable lenses 1414 along with a mounted eye cover 1402. The head-worn computer, in embodiments, includes a see-through display (as disclosed herein). The eye cover 1402 also includes a mounted audio headset 1422. The mounted audio headset 1422 in this embodiment is mounted to the eye cover 1402 and has audio wire connections (not shown). In embodiments, the audio wires' connections may connect to an internal wireless communication system (e.g. Bluetooth, NFC, WiFi) to make connection to the processor in the head-worn computer. In embodiments, the audio wires may connect to a magnetic connector, mechanical connector or the like to make the connection.

FIG. 14h illustrates an unmounted eye cover 1402 with a mounted audio headset 1422. As illustrated, the mechanical design of the eye cover is adapted to fit onto the head-worn computer to provide visual isolation or partial isolation and the audio headset.

In embodiments, the eye cover 1402 may be adapted to be removably mounted on a head-worn computer 102 with a see-through computer display. An audio headset 1422 with an adjustable mount may be connected to the eye cover, wherein the adjustable mount may provide extension and rotation to provide a user of the head-worn computer with a mechanism to align the audio headset with an ear of the user. In embodiments, the audio headset includes an audio wire connected to a connector on the eye cover and the eye cover connector may be adapted to removably mate with a connector on the head-worn computer. In embodiments, the audio headset may be adapted to receive audio signals from the head-worn computer 102 through a wireless connection (e.g. Bluetooth, WiFi). As described elsewhere herein, the head-worn computer 102 may have a removable and replaceable front lens 1414. The eye cover 1402 may include a battery to power systems internal to the eye cover 1402. The eye cover 1402 may have a battery to power systems internal to the head-worn computer 102.

In embodiments, the eye cover 1402 may include a fan adapted to exchange air between an internal space, defined in part by the user's face, and an external environment to cool the air in the internal space and the user's face. In embodiments, the audio headset 1422 may include a vibratory system (e.g. a vibration motor, piezo motor, etc. in the armature and/or in the section over the ear) adapted to provide the user with a haptic feedback coordinated with digital content presented in the see-through computer display. In embodiments, the head-worn computer 102 includes a vibratory system adapted to provide the user with a haptic feedback coordinated with digital content presented in the see-through computer display.

In embodiments, the eye cover 1402 is adapted to be removably mounted on a head-worn computer with a see-through computer display. The eye cover 1402 may also include a flexible audio headset mounted to the eye cover 1402, wherein the flexibility provides the user of the head-worn computer 102 with a mechanism to align the audio headset with an ear of the user. In embodiments, the flexible audio headset is mounted to the eye cover 1402 with a magnetic connection. In embodiments, the flexible audio headset may be mounted to the eye cover 1402 with a mechanical connection.

In embodiments, the audio headset 1422 may be spring or otherwise loaded such that the head set presses inward towards the user's ears for a more secure fit.

Referring to FIG. 15, we now turn to describe a particular external user interface 104, referred to generally as a pen 1500. The pen 1500 is a specially designed external user interface 104 and can operate as a user interface, to many different styles of HWC 102. The pen 1500 generally follows the form of a conventional pen, which is a familiar user handled device and creates an intuitive physical interface for many of the operations to be carried out in the HWC system 100. The pen 1500 may be one of several user interfaces 104 used in connection with controlling operations within the HWC system 100. For example, the HWC 102 may watch for and interpret hand gestures 116 as control signals, where the pen 1500 may also be used as a user interface with the same HWC 102. Similarly, a remote keyboard may be used as an external user interface 104 in concert with the pen 1500. The combination of user interfaces or the use of just one control system generally depends on the operation(s) being executed in the HWC's system 100.

While the pen 1500 may follow the general form of a conventional pen, it contains numerous technologies that enable it to function as an external user interface 104. FIG. 15 illustrates technologies comprised in the pen 1500. As can be seen, the pen 1500 may include a camera 1508, which is arranged to view through lens 1502. The camera may then be focused, such as through lens 1502, to image a surface upon which a user is writing or making other movements to interact with the HWC 102. There are situations where the pen 1500 will also have an ink, graphite, or other system such that what is being written can be seen on the writing surface. There are other situations where the pen 1500 does not have such a physical writing system so there is no deposit on the writing surface, where the pen would only be communicating data or commands to the HWC 102. The lens 1502 configuration is described in greater detail herein. The function of the camera 1508 is to capture information from an unstructured writing surface such that pen strokes can be interpreted as intended by the user. To assist in the predication of the intended stroke path, the pen 1500 may include a sensor, such as an IMU 1512. Of course, the IMU could be included in the pen 1500 in its separate parts (e.g. gyro, accelerometer, etc.) or an IMU could be included as a single unit. In this instance, the IMU 1512 is used to measure and predict the motion of the pen 1500. In turn, the integrated microprocessor 1510 would take the IMU information and camera information as inputs and process the information to form a prediction of the pen tip movement.

The pen 1500 may also include a pressure monitoring system 1504, such as to measure the pressure exerted on the lens 1502. As will be described in greater detail herein, the pressure measurement can be used to predict the user's intention for changing the weight of a line, type of a line, type of brush, click, double click, and the like. In embodiments, the pressure sensor may be constructed using any force or pressure measurement sensor located behind the lens 1502, including for example, a resistive sensor, a current sensor, a capacitive sensor, a voltage sensor such as a piezoelectric sensor, and the like.

The pen 1500 may also include a communications module 1518, such as for bi-directional communication with the HWC 102. In embodiments, the communications module 1518 may be a short distance communication module (e.g. Bluetooth). The communications module 1518 may be security matched to the HWC 102. The communications module 1518 may be arranged to communicate data and commands to and from the microprocessor 1510 of the pen 1500. The microprocessor 1510 may be programmed to interpret data generated from the camera 1508, IMU 1512, and pressure sensor 1504, and the like, and then pass a command onto the HWC 102 through the communications module 1518, for example. In another embodiment, the data collected from any of the input sources (e.g. camera 1508, IMU 1512, pressure sensor 1504) by the microprocessor may be communicated by the communication module 1518 to the HWC 102, and the HWC 102 may perform data processing and prediction of the user's intention when using the pen 1500. In yet another embodiment, the data may be further passed on through a network 110 to a remote device 112, such as a server, for the data processing and prediction. The commands may then be communicated back to the HWC 102 for execution (e.g. display writing in the glasses display, make a selection within the UI of the glasses display, control a remote external device 112, control a local external device 108), and the like. The pen may also include memory 1514 for long or short term uses.

The pen 1500 may also include a number of physical user interfaces, such as quick launch buttons 1522, a touch sensor 1520, and the like. The quick launch buttons 1522 may be adapted to provide the user with a fast way of jumping to a software application in the HWC system 100. For example, the user may be a frequent user of communication software packages (e.g. email, text, Twitter, Instagram, Facebook, Google+, and the like), and the user may program a quick launch button 1522 to command the HWC 102 to launch an application. The pen 1500 may be provided with several quick launch buttons 1522, which may be user programmable or factory programmable. The quick launch button 1522 may be programmed to perform an operation. For example, one of the buttons may be programmed to clear the digital display of the HWC 102. This would create a fast way for the user to clear the screens on the HWC 102 for any reason, such as for example to better view the environment. The quick launch button functionality will be discussed in further detail below. The touch sensor 1520 may be used to take gesture style input from the user. For example, the user may be able to take a single finger and run it across the touch sensor 1520 to affect a page scroll.

The pen 1500 may also include a laser pointer 1524. The laser pointer 1524 may be coordinated with the IMU 1512 to coordinate gestures and laser pointing. For example, a user may use the laser 1524 in a presentation to help with guiding the audience with the interpretation of graphics and the IMU 1512 may, either simultaneously or when the laser 1524 is off, interpret the user's gestures as commands or data input.

Figure 16:
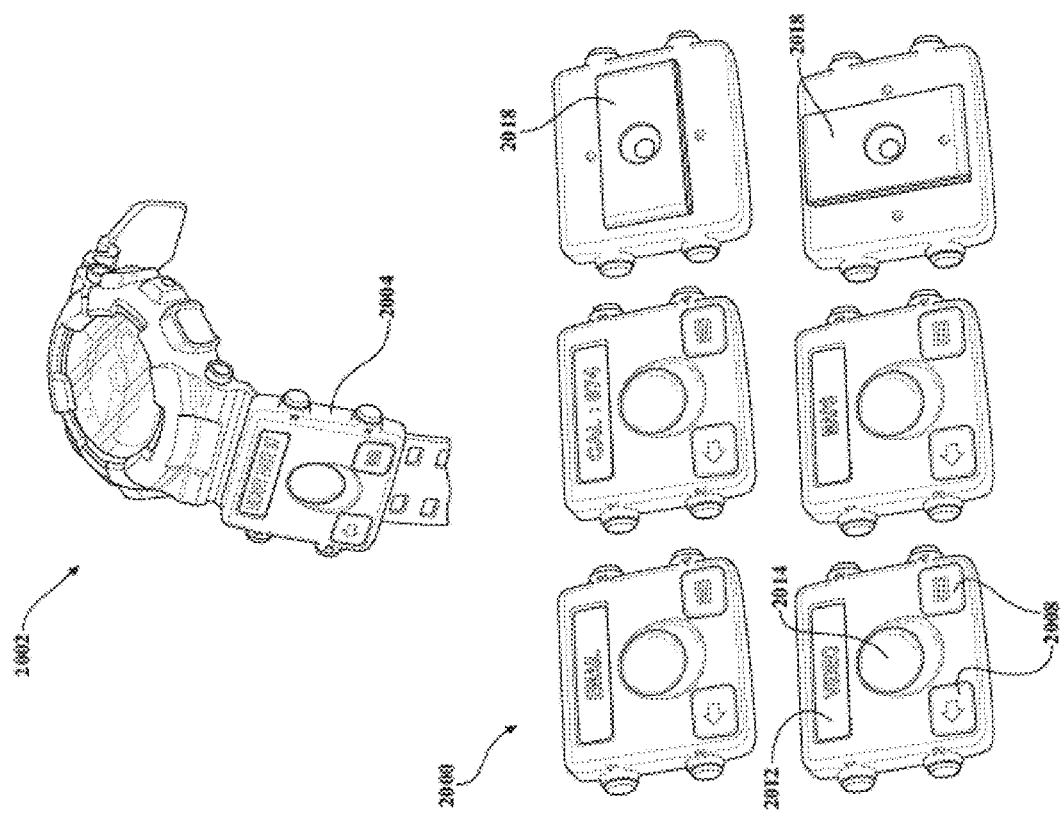
FIG. 16 illustrates external user interfaces in accordance with the principles of the present disclosure.

FIG. 16 illustrates yet another embodiment of the present disclosure. FIG. 16 illustrates a watchband clip-on controller 2000. The watchband clip-on controller may be a controller used to control the HWC 102 or devices in the HWC system 100. The watchband clip-on controller 2000 has a fastener 2018 (e.g. rotatable clip) that is mechanically adapted to attach to a watchband, as illustrated at 2004.

The watchband controller 2000 may have quick launch interfaces 2008 (e.g. to launch applications and choosers as described herein), a touch pad 2014 (e.g. to be used as a touch style mouse for GUI control in a HWC 102 display) and a display 2012. The clip 2018 may be adapted to fit a wide range of watchbands so it can be used in connection with a watch that is independently selected for its function. The clip, in embodiments, is rotatable such that a user can position it in a desirable manner. In embodiments the clip may be a flexible strap. In embodiments, the flexible strap may be adapted to be stretched to attach to a hand, wrist, finger, device, weapon, and the like.

In embodiments, the watchband controller may be configured as a removable and replacable watchband. For example, the controller may be incorporated into a band with a certain width, segment spacing's, etc. such that the watchband, with its incorporated controller, can be attached to a watch body. The attachment, in embodiments, may be mechanically adapted to attach with a pin upon which the watchband rotates. In embodiments, the watchband controller may be electrically connected to the watch and/or watch body such that the watch, watch body and/or the watchband controller can communicate data between them.

The watchband controller 2000 may have 3-axis motion monitoring (e.g. through an IMU, accelerometers, magnetometers, gyroscopes, etc.) to capture user motion. The user motion may then be interpreted for gesture control.

In embodiments, the watchband controller 2000 may comprise fitness sensors and a fitness computer. The sensors may track heart rate, calories burned, strides, distance covered, and the like. The data may then be compared against performance goals and/or standards for user feedback.

Figure 17:
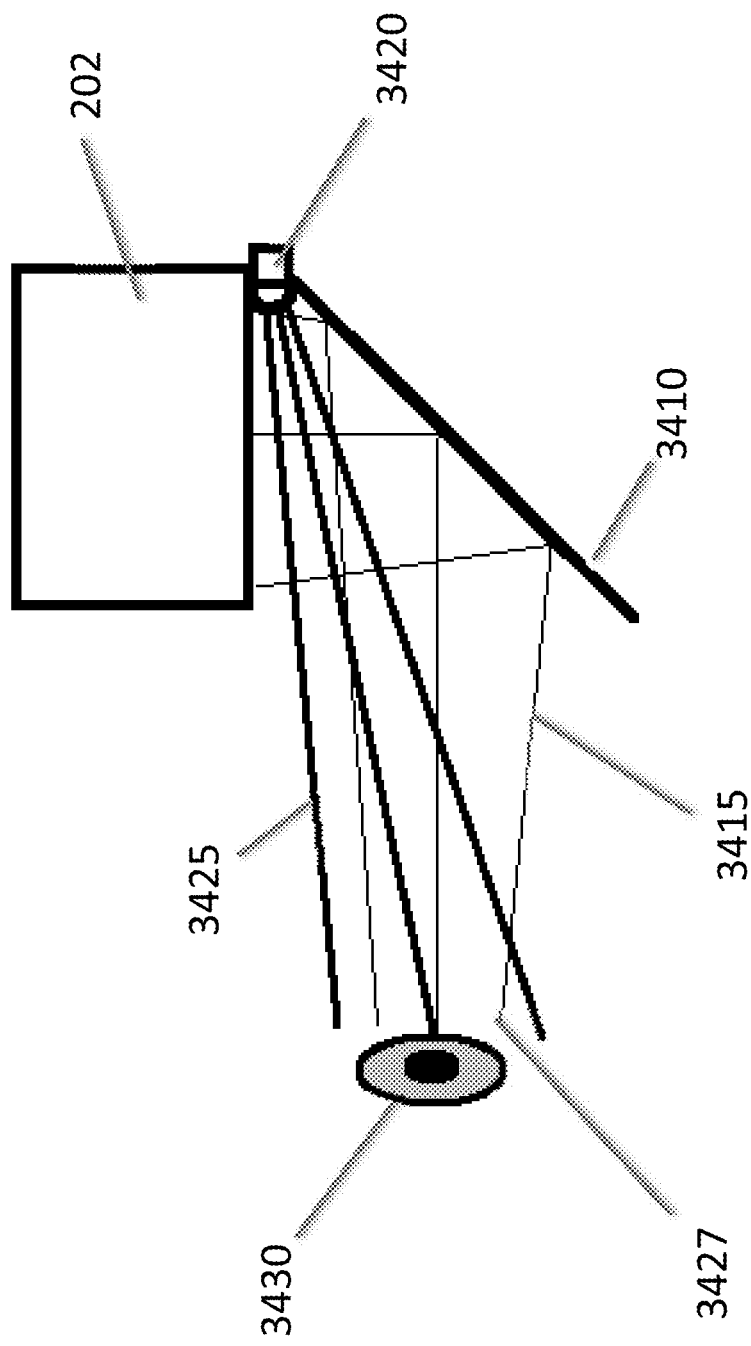
FIGS. 17 and 18 illustrate structured eye lighting systems according to the principles of the present disclosure.
Figure 18:
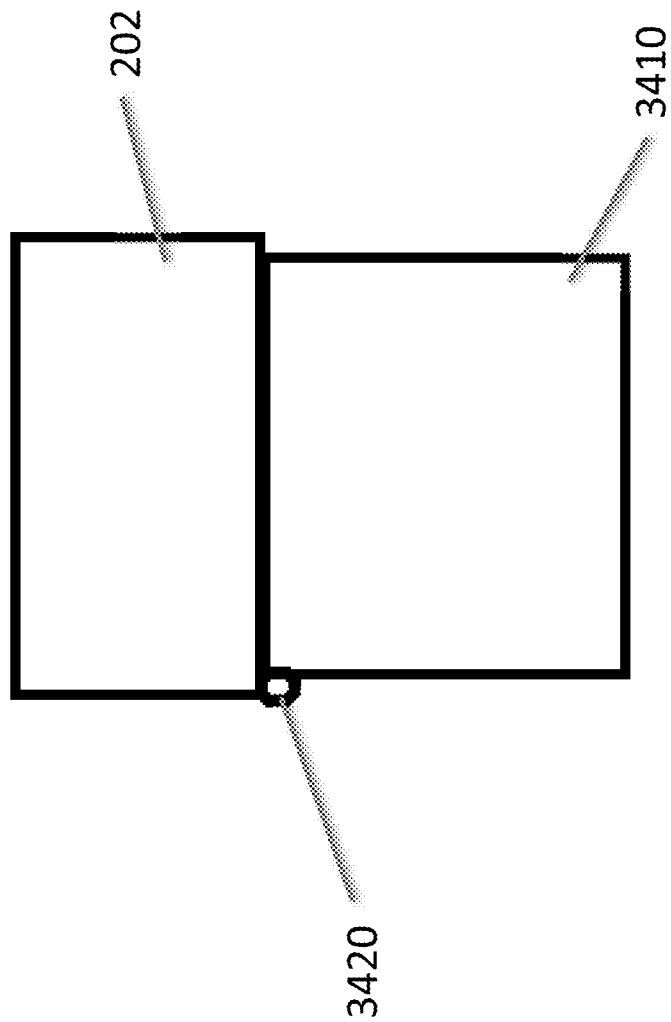

In embodiments directed to capturing images of the wearer's eye, light to illuminate the wearer's eye can be provided by several different sources including: light from the displayed image (i.e. image light); light from the environment that passes through the combiner or other optics; light provided by a dedicated eye light, etc. FIGS. 17 and 18 show illustrations of dedicated eye illumination lights 3420. FIG. 17 shows an illustration from a side view in which the dedicated illumination eye light 3420 is positioned at a corner of the combiner 3410 so that it doesn't interfere with the image light 3415. The dedicated eye illumination light 3420 is pointed so that the eye illumination light 3425 illuminates the eyebox 3427 where the eye 3430 is located when the wearer is viewing displayed images provided by the image light 3415. FIG. 18 shows an illustration from the perspective of the eye of the wearer to show how the dedicated eye illumination light 3420 is positioned at the corner of the combiner 3410. While the dedicated eye illumination light 3420 is shown at the upper left corner of the combiner 3410, other positions along one of the edges of the combiner 3410, or other optical or mechanical components, are possible as well. In other embodiments, more than one dedicated eye light 3420 with different positions can be used. In an embodiment, the dedicated eye light 3420 is an infrared light that is not visible by the wearer (e.g. 800 nm) so that the eye illumination light 3425 doesn't interfere with the displayed image perceived by the wearer.

In embodiments, the eye imaging camera is inline with the image light optical path, or part of the image light optical path. For example, the eye camera may be positioned in the upper module to capture eye image light that reflects back through the optical system towards the image display. The eye image light may be captured after reflecting off of the image source (e.g. in a DLP configuration where the mirrors can be positioned to reflect the light towards the eye image light camera), a partially reflective surface may be placed along the image light optical path such that when the eye image light reflects back into the upper or lower module that it is reflected in a direction that the eye imaging camera can capture light eye image light. In other embodiments, the eye image light camera is positioned outside of the image light optical path. For example, the camera(s) may be positioned near the outer lens of the platform.

FIG. 19 shows a series of illustrations of captured eye images that show the eye glint (i.e. light that reflects off the front of the eye) produced by a dedicated eye light mounted adjacent to the combiner as previously described herein. In this embodiment of the disclosure, captured images of the wearer's eye are analyzed to determine the relative positions of the iris 3550, pupil, or other portion of the eye, and the eye glint 3560. The eye glint is a reflected image of the dedicated eye light 3420 when the dedicated light is used. FIG. 19 illustrates the relative positions of the iris 3550 and the eye glint 3560 for a variety of eye positions. By providing a dedicated eye light 3420 in a fixed position, combined with the fact that the human eye is essentially spherical, or at least a reliably repeatable shape, the eye glint provides a fixed reference point against which the determined position of the iris can be compared to determine where the wearer is looking, either within the displayed image or within the see-through view of the surrounding environment. By positioning the dedicated eye light 3420 at a corner of the combiner 3410, the eye glint 3560 is formed away from the iris 3550 in the captured images. As a result, the positions of the iris and the eye glint can be determined more easily and more accurately during the analysis of the captured images, since they do not interfere with one another. In a further embodiment, the combiner includes an associated cut filter that prevents infrared light from the environment from entering the HWC and the eye camera is an infrared camera, so that the eye glint 3560 is only provided by light from the dedicated eye light. For example, the combiner can include a low pass filter that passes visible light while reflecting infrared light from the environment away from the eye camera, reflecting infrared light from the dedicated eye light toward the user's eye and the eye camera can include a high pass filter that absorbs visible light associated with the displayed image while passing infrared light associated with the eye image.

In an embodiment of the eye imaging system, the lens for the eye camera is designed to take into account the optics associated with the upper module 202 and the lower module 204. This is accomplished by designing the eye camera to include the optics in the upper module 202 and optics in the lower module 204, so that a high MTF image is produced, at the image sensor in the eye camera, of the wearer's eye. In yet a further embodiment, the eye camera lens is provided with a large depth of field to eliminate the need for focusing the eye camera to enable sharp images of the eye to be captured. Where a large depth of field is typically provided by a high f/# lens (e.g. f/# >5). In this case, the reduced light gathering associated with high f/# lenses is compensated by the inclusion of a dedicated eye light to enable a bright image of the eye to be captured. Further, the brightness of the dedicated eye light can be modulated and synchronized with the capture of eye images so that the dedicated eye light has a reduced duty cycle and the brightness of infrared light on the wearer's eye is reduced.

Figure 20B:
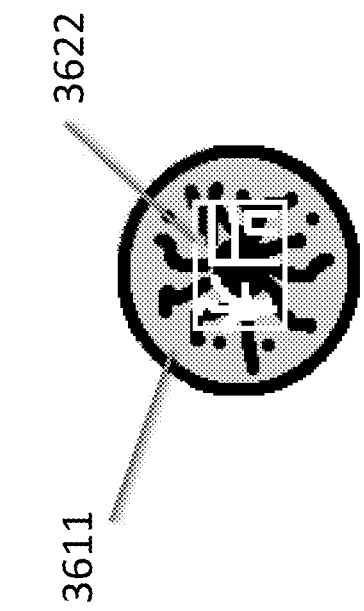
FIG. 20b illustrates a digital content presentation reflection off of the wearer's eye that may be analyzed in accordance with the principles of the present disclosure.
Figure 20A:
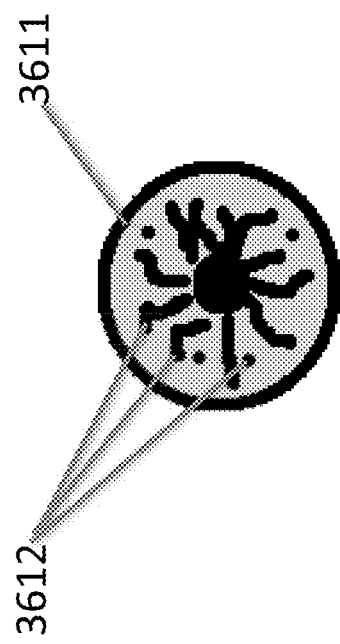
FIG. 20a illustrates eye characteristics that may be used in personal identification through analysis of a system according to the principles of the present disclosure.

In a further embodiment, FIG. 20a shows an illustration of an eye image that is used to identify the wearer of the HWC. In this case, an image of the wearer's eye 3611 is captured and analyzed for patterns of identifiable features 3612. The patterns are then compared to a database of eye images to determine the identity of the wearer. After the identity of the wearer has been verified, the operating mode of the HWC and the types of images, applications, and information to be displayed can be adjusted and controlled in correspondence to the determined identity of the wearer. Examples of adjustments to the operating mode depending on who the wearer is determined to be or not be include: making different operating modes or feature sets available, shutting down or sending a message to an external network, allowing guest features and applications to run, etc.

FIG. 20b is an illustration of another embodiment using eye imaging, in which the sharpness of the displayed image is determined based on the eye glint produced by the reflection of the displayed image from the wearer's eye surface. By capturing images of the wearer's eye 3611, an eye glint 3622, which is a small version of the displayed image can be captured and analyzed for sharpness. If the displayed image is determined to not be sharp, then an automated adjustment to the focus of the HWC optics can be performed to improve the sharpness. This ability to perform a measurement of the sharpness of a displayed image at the surface of the wearer's eye can provide a very accurate measurement of image quality. Having the ability to measure and automatically adjust the focus of displayed images can be very useful in augmented reality imaging where the focus distance of the displayed image can be varied in response to changes in the environment or changes in the method of use by the wearer.

An aspect of the present disclosure relates to controlling the HWC 102 through interpretations of eye imagery. In embodiments, eye-imaging technologies, such as those described herein, are used to capture an eye image or a series of eye images for processing. The image(s) may be processed to determine a user intended action, an HWC predetermined reaction, or other action. For example, the imagery may be interpreted as an affirmative user control action for an application on the HWC 102. Or, the imagery may cause, for example, the HWC 102 to react in a pre-determined way such that the HWC 102 is operating safely, intuitively, etc.

Figure 21:
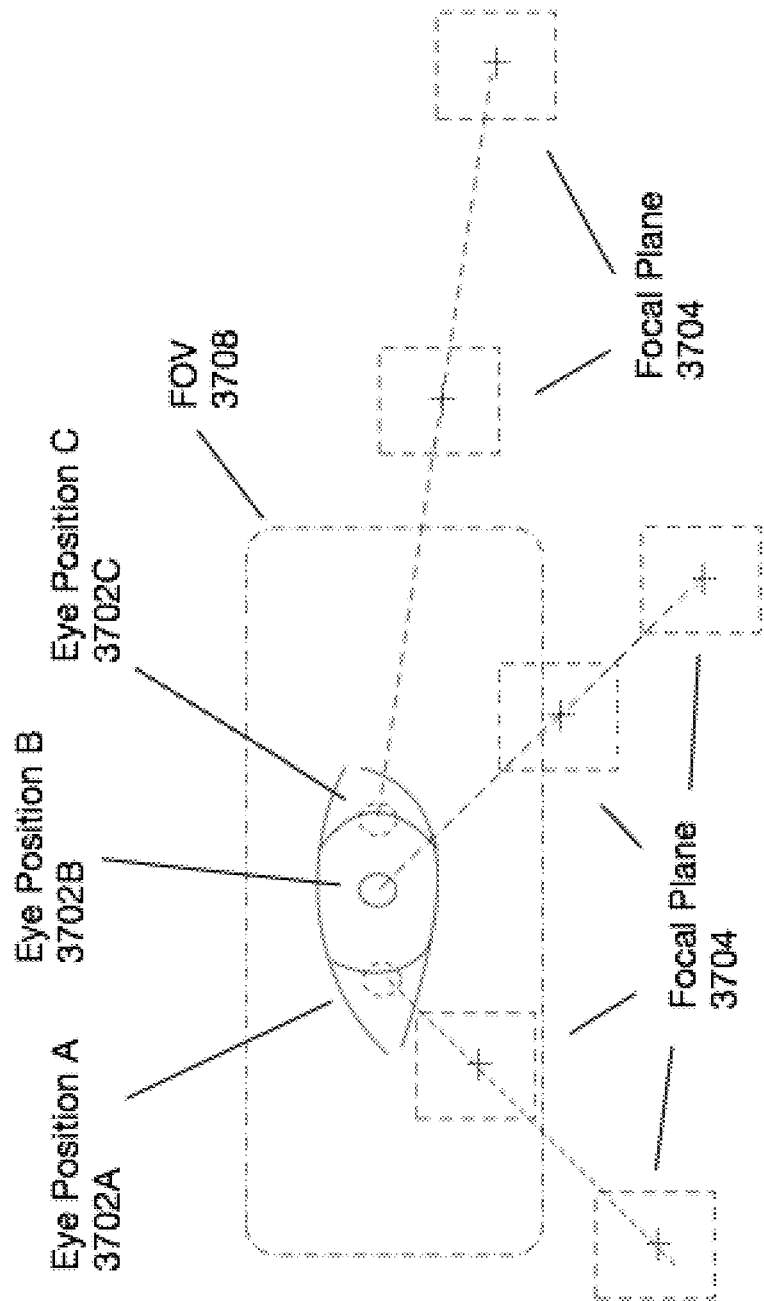
FIG. 21 illustrates eye imaging along various virtual target lines and various focal planes in accordance with the principles of the present disclosure.

FIG. 21 illustrates an eye imagery process that involves imaging the HWC 102 wearer's eye(s) and processing the images (e.g. through eye imaging technologies described herein) to determine in what position 3702 the eye is relative to it's neutral or forward looking position and/or the FOV 3708. The process may involve a calibration step where the user is instructed, through guidance provided in the FOV of the HWC 102, to look in certain directions such that a more accurate prediction of the eye position relative to areas of the FOV can be made. In the event the wearer's eye is determined to be looking towards the right side of the FOV 3708 (as illustrated in FIG. 21, the eye is looking out of the page) a virtual target line may be established to project what in the environment the wearer may be looking towards or at. The virtual target line may be used in connection with an image captured by camera on the HWC 102 that images the surrounding environment in front of the wearer. In embodiments, the field of view of the camera capturing the surrounding environment matches, or can be matched (e.g. digitally), to the FOV 3708 such that making the comparison is made more clear. For example, with the camera capturing the image of the surroundings in an angle that matches the FOV 3708 the virtual line can be processed (e.g. in 2d or 3d, depending on the camera images capabilities and/or the processing of the images) by projecting what surrounding environment objects align with the virtual target line. In the event there are multiple objects along the virtual target line, focal planes may be established corresponding to each of the objects such that digital content may be placed in an area in the FOV 3708 that aligns with the virtual target line and falls at a focal plane of an intersecting object. The user then may see the digital content when he focuses on the object in the environment, which is at the same focal plane. In embodiments, objects in line with the virtual target line may be established by comparison to mapped information of the surroundings.

In embodiments, the digital content that is in line with the virtual target line may not be displayed in the FOV until the eye position is in the right position. This may be a predetermined process. For example, the system may be set up such that a particular piece of digital content (e.g. an advertisement, guidance information, object information, etc.) will appear in the event that the wearer looks at a certain object(s) in the environment. A virtual target line(s) may be developed that virtually connects the wearer's eye with an object(s) in the environment (e.g. a building, portion of a building, mark on a building, gps location, etc.) and the virtual target line may be continually updated depending on the position and viewing direction of the wearer (e.g. as determined through GPS, e-compass, IMU, etc.) and the position of the object. When the virtual target line suggests that the wearer's pupil is substantially aligned with the virtual target line or about to be aligned with the virtual target line, the digital content may be displayed in the FOV 3704.

In embodiments, the time spent looking along the virtual target line and/or a particular portion of the FOV 3708 may indicate that the wearer is interested in an object in the environment and/or digital content being displayed. In the event there is no digital content being displayed at the time a predetermined period of time is spent looking at a direction, digital content may be presented in the area of the FOV 3708. The time spent looking at an object may be interpreted as a command to display information about the object, for example. In other embodiments, the content may not relate to the object and may be presented because of the indication that the person is relatively inactive. In embodiments, the digital content may be positioned in proximity to the virtual target line, but not in-line with it such that the wearer's view of the surroundings are not obstructed but information can augment the wearer's view of the surroundings. In embodiments, the time spent looking along a target line in the direction of displayed digital content may be an indication of interest in the digital content. This may be used as a conversion event in advertising. For example, an advertiser may pay more for an add placement if the wearer of the HWC 102 looks at a displayed advertisement for a certain period of time. As such, in embodiments, the time spent looking at the advertisement, as assessed by comparing eye position with the content placement, target line or other appropriate position may be used to determine a rate of conversion or other compensation amount due for the presentation.

Figure 22:
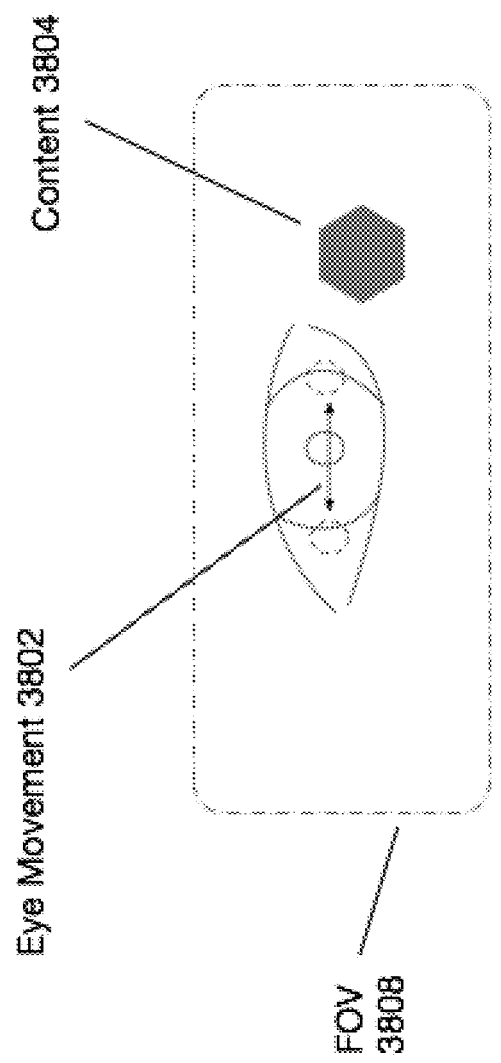
FIG. 22 illustrates content control with respect to eye movement based on eye imaging in accordance with the principles of the present disclosure.

An aspect of the disclosure relates to removing content from the FOV of the HWC 102 when the wearer of the HWC 102 apparently wants to view the surrounding environments clearly. FIG. 22 illustrates a situation where eye imagery suggests that the eye has or is moving quickly so the digital content 3804 in the FOV 3808 is removed from the FOV 3808. In this example, the wearer may be looking quickly to the side indicating that there is something on the side in the environment that has grabbed the wearer's attention. This eye movement 3802 may be captured through eye imaging techniques (e.g. as described herein) and if the movement matches a predetermined movement (e.g. speed, rate, pattern, etc.) the content may be removed from view. In embodiments, the eye movement is used as one input and HWC movements indicated by other sensors (e.g. IMU in the HWC) may be used as another indication. These various sensor movements may be used together to project an event that should cause a change in the content being displayed in the FOV.

Another aspect of the present disclosure relates to determining a focal plane based on the wearer's eye convergence. Eyes are generally converged slightly and converge more when the person focuses on something very close. This is generally referred to as convergence. In embodiments, convergence is calibrated for the wearer. That is, the wearer may be guided through certain focal plane exercises to determine how much the wearer's eyes converge at various focal planes and at various viewing angles. The convergence information may then be stored in a database for later reference. In embodiments, a general table may be used in the event there is no calibration step or the person skips the calibration step. The two eyes may then be imaged periodically to determine the convergence in an attempt to understand what focal plane the wearer is focused on. In embodiments, the eyes may be imaged to determine a virtual target line and then the eye's convergence may be determined to establish the wearer's focus, and the digital content may be displayed or altered based thereon.

Figure 23:
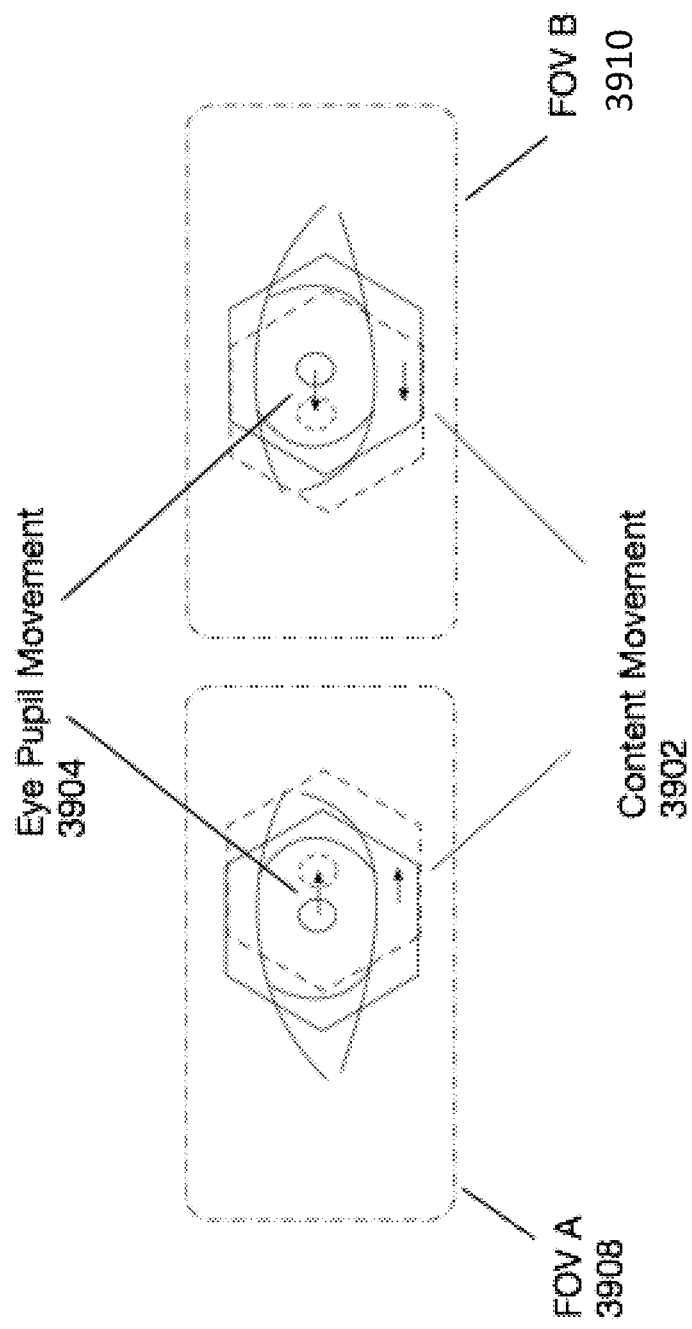
FIG. 23 illustrates eye imaging and eye convergence in accordance with the principles of the present disclosure.

FIG. 23 illustrates a situation where digital content is moved 3902 within one or both of the FOVs 3908 and 3910 to align with the convergence of the eyes as determined by the pupil movement 3904. By moving the digital content to maintain alignment, in embodiments, the overlapping nature of the content is maintained so the object appears properly to the wearer. This can be important in situations where 3D content is displayed.

An aspect of the present disclosure relates to controlling the HWC 102 based on events detected through eye imaging. A wearer winking, blinking, moving his eyes in a certain pattern, etc. may, for example, control an application of the HWC 102. Eye imaging (e.g. as described herein) may be used to monitor the eye(s) of the wearer and once a predetermined pattern is detected an application control command may be initiated.

An aspect of the disclosure relates to monitoring the health of a person wearing a HWC 102 by monitoring the wearer's eye(s). Calibrations may be made such that the normal performance, under various conditions (e.g. lighting conditions, image light conditions, etc.) of a wearer's eyes may be documented. The wearer's eyes may then be monitored through eye imaging (e.g. as described herein) for changes in their performance. Changes in performance may be indicative of a health concern (e.g. concussion, brain injury, stroke, loss of blood, etc.). If detected the data indicative of the change or event may be communicated from the HWC 102.

Aspects of the present disclosure relate to security and access of computer assets (e.g. the HWC itself and related computer systems) as determined through eye image verification. As discussed herein elsewhere, eye imagery may be compared to known person eye imagery to confirm a person's identity. Eye imagery may also be used to confirm the identity of people wearing the HWCs 102 before allowing them to link together or share files, streams, information, etc.

A variety of use cases for eye imaging are possible based on technologies described herein. An aspect of the present disclosure relates to the timing of eye image capture. The timing of the capture of the eye image and the frequency of the capture of multiple images of the eye can vary dependent on the use case for the information gathered from the eye image. For example, capturing an eye image to identify the user of the HWC may be required only when the HWC has been turned ON or when the HWC determines that the HWC has been put onto a wearer's head to control the security of the HWC and the associated information that is displayed to the user, wherein the orientation, movement pattern, stress or position of the earhorns (or other portions of the HWC) of the HWC can be used to determine that a person has put the HWC onto their head with the intention to use the HWC. Those same parameters may be monitored in an effort to understand when the HWC is dismounted from the user's head. This may enable a situation where the capture of an eye image for identifying the wearer may be completed only when a change in the wearing status is identified. In a contrasting example, capturing eye images to monitor the health of the wearer may require images to be captured periodically (e.g. every few seconds, minutes, hours, days, etc.). For example, the eye images may be taken in minute intervals when the images are being used to monitor the health of the wearer when detected movements indicate that the wearer is exercising. In a further contrasting example, capturing eye images to monitor the health of the wearer for long-term effects may only require that eye images be captured monthly. Embodiments of the disclosure relate to selection of the timing and rate of capture of eye images to be in correspondence with the selected use scenario associated with the eye images. These selections may be done automatically, as with the exercise example above where movements indicate exercise, or these selections may be set manually. In a further embodiment, the selection of the timing and rate of eye image capture is adjusted automatically depending on the mode of operation of the HWC. The selection of the timing and rate of eye image capture can further be selected in correspondence with input characteristics associated with the wearer including age and health status, or sensed physical conditions of the wearer including heart rate, chemical makeup of the blood and eye blink rate.

Figure 24:
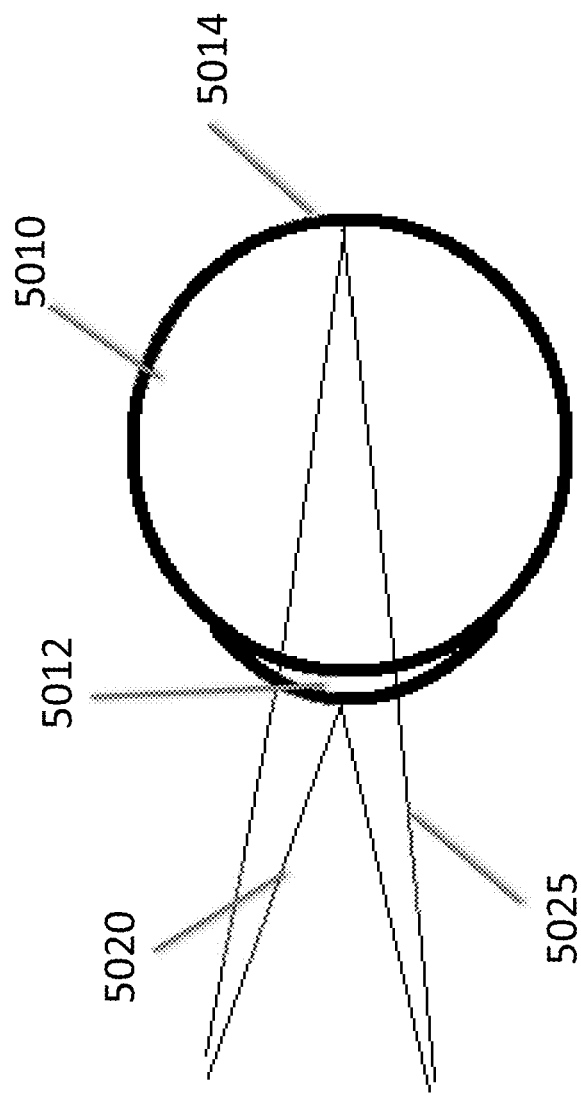
FIG. 24 illustrates light impinging an eye in accordance with the principles of the present disclosure.

FIG. 24 illustrates a cross section of an eyeball of a wearer of an HWC with focus points that can be associated with the eye imaging system of the disclosure. The eyeball 5010 includes an iris 5012 and a retina 5014. Because the eye imaging system of the disclosure provides coaxial eye imaging with a display system, images of the eye can be captured from a perspective directly in front of the eye and inline with where the wearer is looking. In embodiments of the disclosure, the eye imaging system can be focused at the iris 5012 and/or the retina 5014 of the wearer, to capture images of the external surface of the iris 5012 or the internal portions of the eye, which includes the retina 5014. FIG. 24 shows light rays 5020 and 5025 that are respectively associated with capturing images of the iris 5012 or the retina 5014 wherein the optics associated with the eye imaging system are respectively focused at the iris 5012 or the retina

Figure 25:
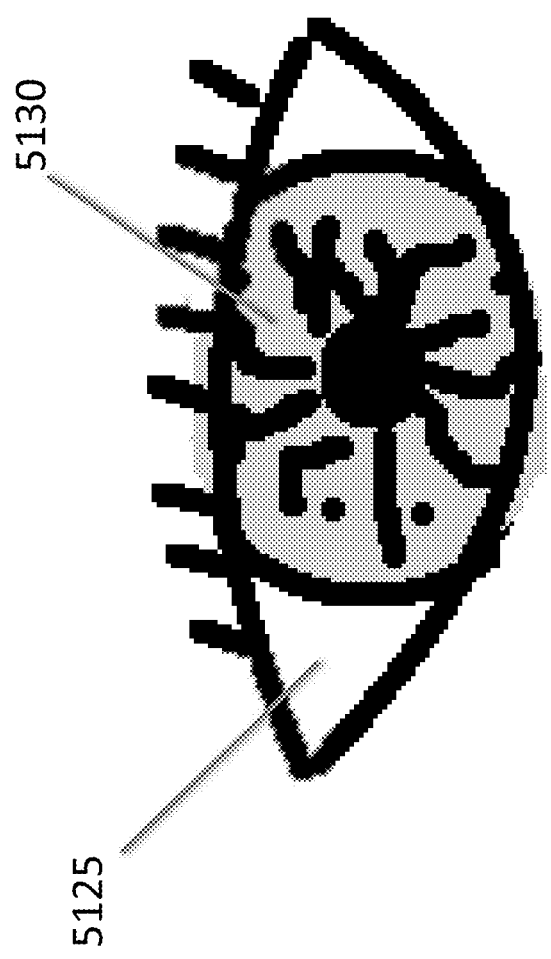
FIG. 25 illustrates a view of an eye in accordance with the principles of the present disclosure.

5014. Illuminating light can also be provided in the eye imaging system to illuminate the iris 5012 or the retina 5014. FIG. 25 shows an illustration of an eye including an iris 5130 and a sclera 5125. In embodiments, the eye imaging system can be used to capture images that include the iris 5130 and portions of the sclera 5125. The images can then be analyzed to determine color, shapes and patterns that are associated with the user. In further embodiments, the focus of the eye imaging system is adjusted to enable images to be captured of the iris 5012 or the retina 5014. Illuminating light can also be adjusted to illuminate the iris 5012 or to pass through the pupil of the eye to illuminate the retina 5014. The illuminating light can be visible light to enable capture of colors of the iris 5012 or the retina 5014, or the illuminating light can be ultraviolet (e.g. 340 nm), near infrared (e.g. 850 nm) or mid-wave infrared (e.g. 5000 nm) light to enable capture of hyperspectral characteristics of the eye.

Figure 26B:
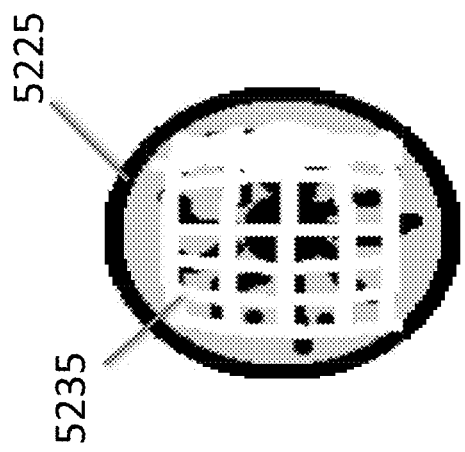
FIGS. 26a and 26b illustrate views of an eye with a structured light pattern in accordance with the principles of the present disclosure.
Figure 26A:
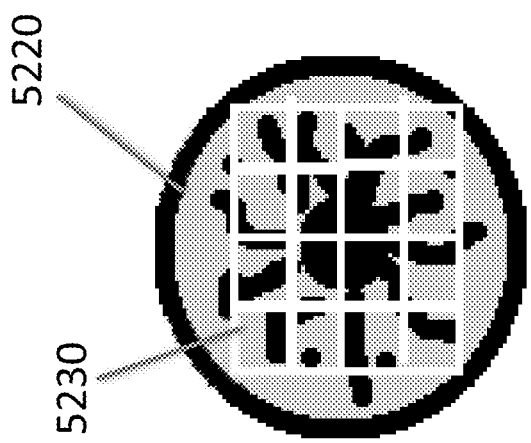

FIGS. 26*a* and 26*b* illustrate captured images of eyes where the eyes are illuminated with structured light patterns. In FIG. 26*a*, an eye 5220 is shown with a projected structured light pattern 5230, where the light pattern is a grid of lines. A light pattern of such as 5230 can be provided by the light source 5355 by including a diffractive or a refractive device to modify the light 5357 as are known by those skilled in the art. A visible light source can also be included for the second camera, which can include a diffractive or refractive to modify the light 5467 to provide a light pattern. FIG. 26*b* illustrates how the structured light pattern of 5230 becomes distorted to 5235 when the user's eye 5225 looks to the side. This distortion comes from the fact that the human eye is not completely spherical in shape, instead the iris sticks out slightly from the eyeball to form a bump in the area of the iris. As a result, the shape of the eye and the associated shape of the reflected structured light pattern is different depending on which direction the eye is pointed, when images of the eye are captured from a fixed position. Changes in the structured light pattern can subsequently be analyzed in captured eye images to determine the direction that the eye is looking.

The eye imaging system can also be used for the assessment of aspects of health of the user. In this case, information gained from analyzing captured images of the iris 5130 or sclera 5125 are different from information gained from analyzing captured images of the retina 5014. Where images of the retina 5014 are captured using light that illuminates the inner portions of the eye including the retina 5014. The light can be visible light, but in an embodiment, the light is infrared light (e.g. wavelength 1 to 5 microns) and the eye camera is an infrared light sensor (e.g. an InGaAs sensor) or a low resolution infrared image sensor that is used to determine the relative amount of light that is absorbed, reflected or scattered by the inner portions of the eye. Wherein the majority of the light that is absorbed, reflected or scattered can be attributed to materials in the inner portion of the eye including the retina where there are densely packed blood vessels with thin walls so that the absorption, reflection and scattering are caused by the material makeup of the blood. These measurements can be conducted automatically when the user is wearing the HWC, either at regular intervals, after identified events or when prompted by an external communication. In a preferred embodiment, the illuminating light is near infrared or mid infrared (e.g. 0.7 to 5 microns wavelength) to reduce the chance for thermal damage to the wearer's eye. In a further embodiment, the light source and the camera together comprise a spectrometer wherein the relative intensity of the light reflected by the eye is analyzed over a series of narrow wavelengths within the range of wavelengths provided by the light source to determine a characteristic spectrum of the light that is absorbed, reflected or scattered by the eye. For example, the light source can provide a broad range of infrared light to illuminate the eye and the camera can include: a grating to laterally disperse the reflected light from the eye into a series of narrow wavelength bands that are captured by a linear photodetector so that the relative intensity by wavelength can be measured and a characteristic absorbance spectrum for the eye can be determined over the broad range of infrared. In a further example, the light source can provide a series of narrow wavelengths of light (ultraviolet, visible or infrared) to sequentially illuminate the eye and camera includes a photodetector that is selected to measure the relative intensity of the series of narrow wavelengths in a series of sequential measurements that together can be used to determine a characteristic spectrum of the eye. The determined characteristic spectrum is then compared to known characteristic spectra for different materials to determine the material makeup of the eye. In yet another embodiment, the illuminating light is focused on the retina and a characteristic spectrum of the retina is determined and the spectrum is compared to known spectra for materials that may be present in the user's blood. For example, in the visible wavelengths 540 nm is useful for detecting hemoglobin and 660 nm is useful for differentiating oxygenated hemoglobin. In a further example, in the infrared, a wide variety of materials can be identified as is known by those skilled in the art, including: glucose, urea, alcohol and controlled substances.

Another aspect of the present disclosure relates to an intuitive user interface mounted on the HWC 102 where the user interface includes tactile feedback (otherwise referred to as haptic feedback) to the user to provide the user an indication of engagement and change. In embodiments, the user interface is a rotating element on a temple section of a glasses form factor of the HWC 102. The rotating element may include segments such that it positively engages at certain predetermined angles. This facilitates a tactile feedback to the user. As the user turns the rotating element it 'clicks' through it's predetermined steps or angles and each step causes a displayed user interface content to be changed. For example, the user may cycle through a set of menu items or selectable applications. In embodiments, the rotating element also includes a selection element, such as a pressure-induced section where the user can push to make a selection.

Figure 27:
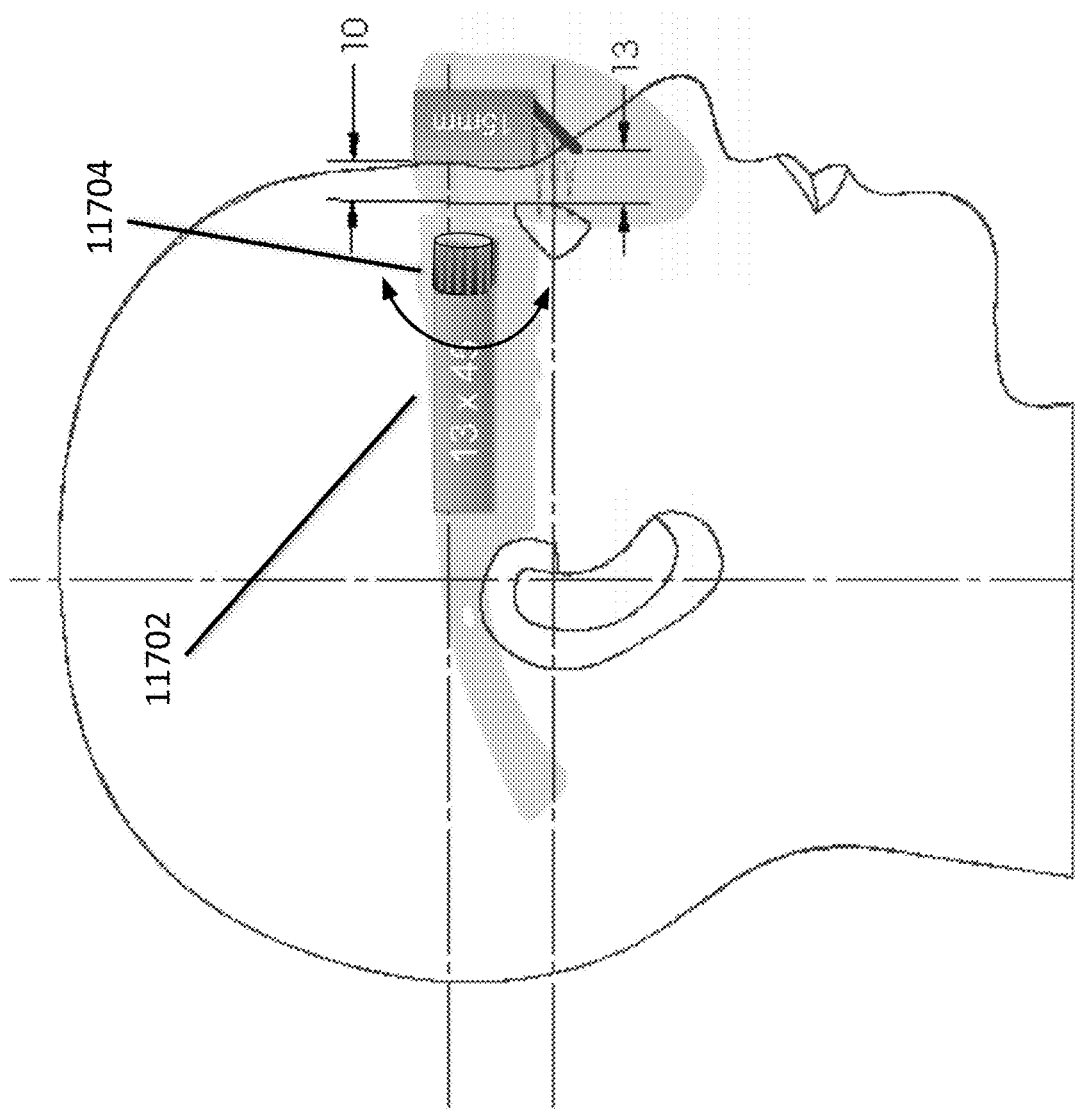
FIG. 27 illustrates a user interface in accordance with the principles of the present disclosure.
Figure 28:
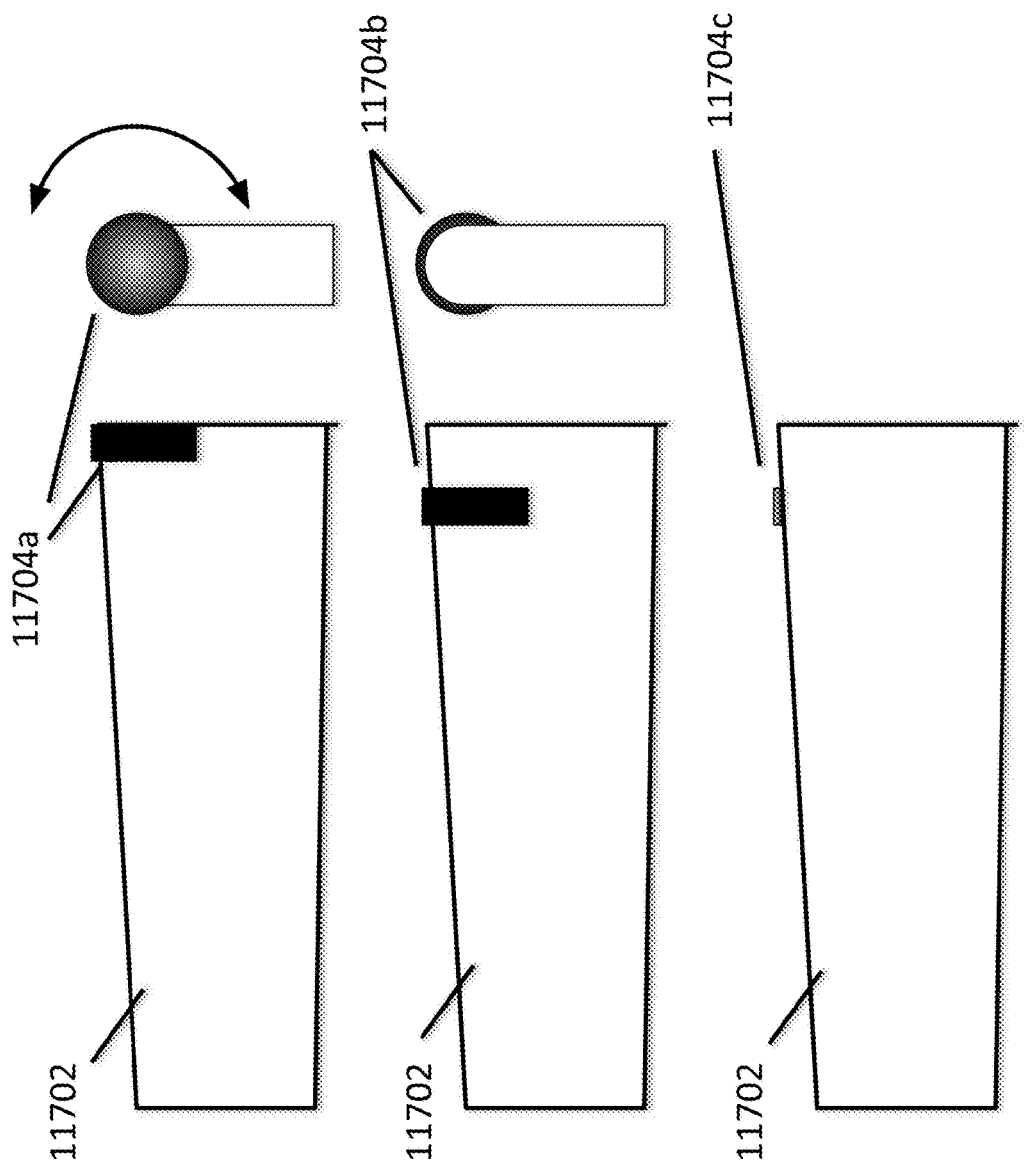
FIG. 28 illustrates a user interface in accordance with the principles of the present disclosure.

FIG. 27 illustrates a human head wearing a head-worn computer in a glasses form factor. The glasses have a temple section 11702 and a rotating user interface element 11704. The user can rotate the rotating element 11704 to cycle through options presented as content in the see-through display of the glasses. FIG. 28 illustrates several examples of different rotating user interface elements 11704*a*, 11704*b* and 11704*c*. Rotating element 11704*a* is mounted at the front end of the temple and has significant side and top exposure for user interaction. Rotating element 11704*b* is mounted further back and also has significant exposure (e.g. 270 degrees of touch). Rotating element 11704*c* has less exposure and is exposed for interaction on the top of the temple. Other embodiments may have a side or bottom exposure.

Another aspect of the present disclosure relates to a haptic system in a head-worn computer. Creating visual, audio, and haptic sensations in coordination can increase the enjoyment or effectiveness of awareness in a number of situations. For example, when viewing a movie or playing a game while digital content is presented in a computer display of a head-worn computer, it is more immersive to include coordinated sound and haptic effects. When presenting information in the head-worn computer, it may be advantageous to present a haptic effect to enhance or be the information. For example, the haptic sensation may gently cause the user of the head-worn computer believe that there is some presence on the user's right side, but out of sight. It may be a very light haptic effect to cause the 'tingling' sensation of a presence of unknown origin. It may be a high intensity haptic sensation to coordinate with an apparent explosion, either out of sight or in-sight in the computer display. Haptic sensations can be used to generate a perception in the user that objects and events are close by. As another example, digital content may be presented to the user in the computer displays and the digital content may appear to be within reach of the user. If the user reaches out his hand in an attempt to touch the digital object, which is not a real object, the haptic system may cause a sensation and the user may interpret the sensation as a touching sensation. The haptic system may generate slight vibrations near one or both temples for example and the user may infer from those vibrations that he has touched the digital object. This additional dimension in sensory feedback can be very useful and create a more intuitive and immersive user experience.

Another aspect of the present disclosure relates to controlling and modulating the intensity of a haptic system in a head-worn computer. In embodiments, the haptic system includes separate piezo strips such that each of the separate strips can be controlled separately. Each strip may be controlled over a range of vibration levels and some of the separate strips may have a greater vibration capacity than others. For example, a set of strips may be mounted in the arm of the head-worn computer (e.g. near the user's temple, ear, rear of the head, substantially along the length of the arm, etc.) and the further forward the strip the higher capacity the strip may have. The strips of varying capacity could be arranged in any number of ways, including linear, curved, compound shape, two dimensional array, one dimensional array, three dimensional array, etc.). A processor in the head-worn computer may regulate the power applied to the strips individually, in sub-groups, as a whole, etc. In embodiments, separate strips or segments of varying capacity are individually controlled to generate a finely controlled multi-level vibration system. Patterns based on frequency, duration, intensity, segment type, and/or other control parameters can be used to generate signature haptic feedback. For example, to simulate the haptic feedback of an explosion close to the user, a high intensity, low frequency, and moderate duration may be a pattern to use. A bullet whipping by the user may be simulated with a higher frequency and shorter duration. Following this disclosure, one can imagine various patterns for various simulation scenarios.

Another aspect of the present disclosure relates to making a physical connection between the haptic system and the user's head. Typically, with a glasses format, the glasses touch the user's head in several places (e.g. ears, nose, forehead, etc.) and these areas may be satisfactory to generate the necessary haptic feedback. In embodiments, an additional mechanical element may be added to better translate the vibration from the haptic system to a desired location on the user's head. For example, a vibration or signal conduit may be added to the head-worn computer such that there is a vibration translation medium between the head-worn computers internal haptic system and the user's temple area.

Figure 29:
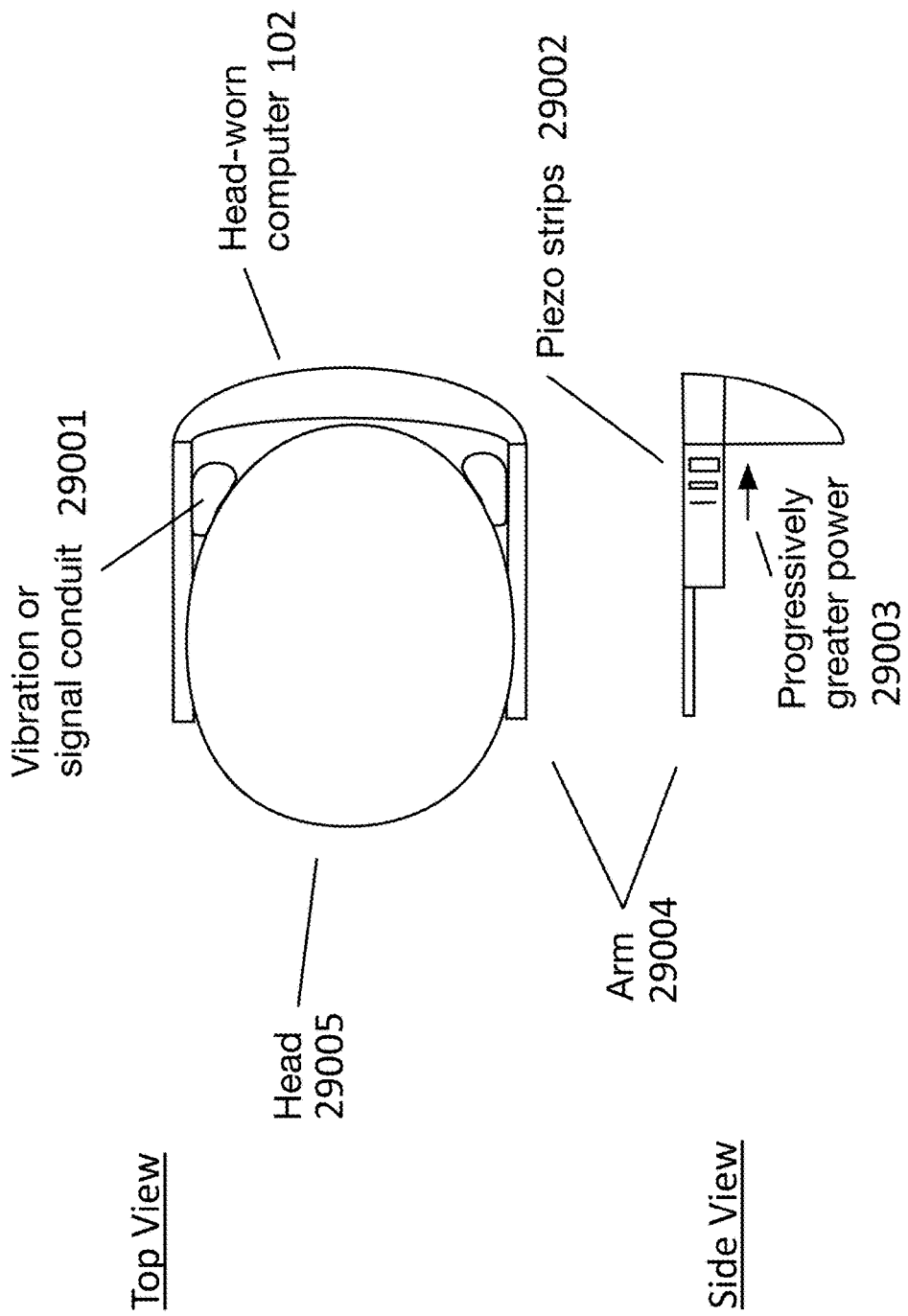
Figure 30:
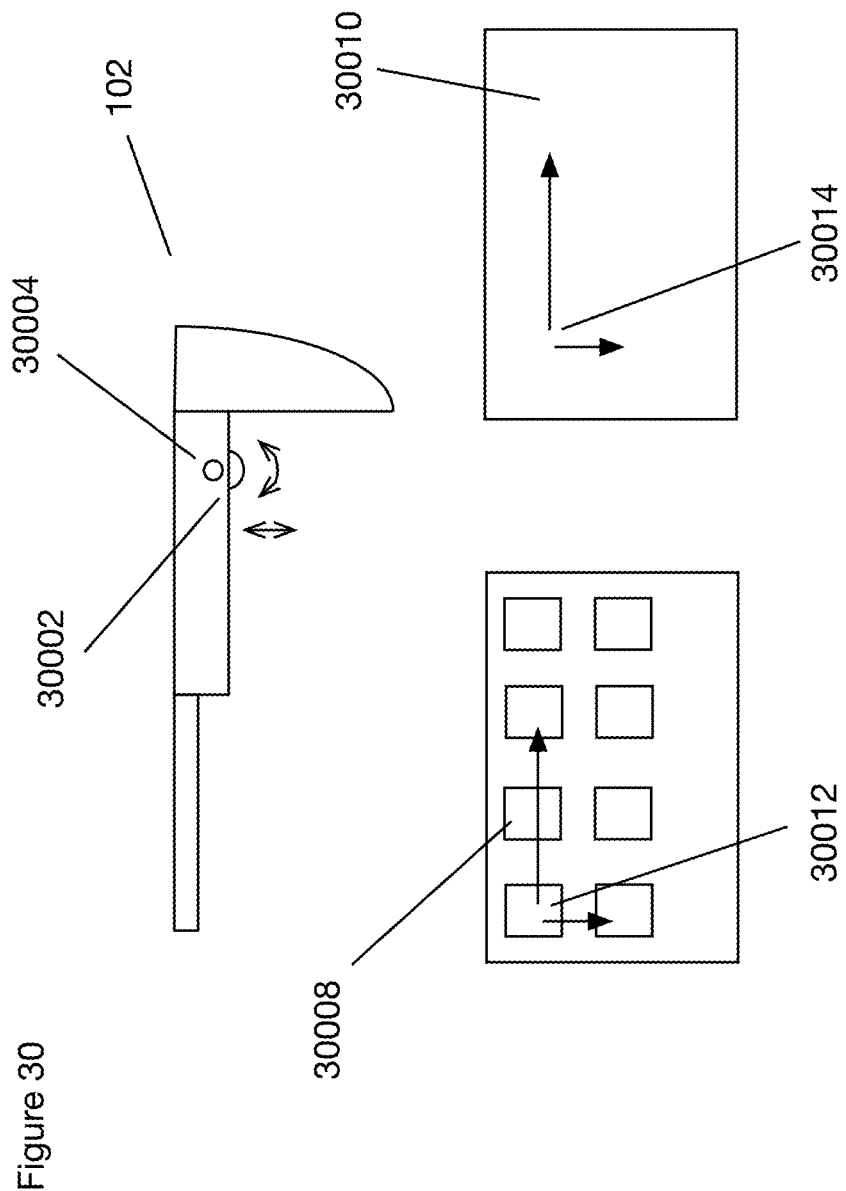
FIG. 30 illustrates a user interface system in accordance with the principles of the present disclosure.

FIG. 29 illustrates a head-worn computer 102 with a haptic system comprised of piezo strips 29002. In this embodiment, the piezo strips 29002 are arranged linearly with strips of increasing vibration capacity from back to front of the arm 29004. The increasing capacity may be provided by different sized strips, for example. This arrangement can cause a progressively increased vibration power 29003 from back to front. This arrangement is provided for ease of explanation; other arrangements are contemplated by the inventors of the present application and these examples should not be construed as limiting. The head-worn computer 102 may also have a vibration or signal conduit 29001 that facilitates the physical vibrations from the haptic system to the head of the user 29005. The vibration conduit may be malleable to form to the head of the user for a tighter or more appropriate fit.

An aspect of the present invention relates to a head-worn computer, comprising: a frame adapted to hold a computer display in front of a user's eye; a processor adapted to present digital content in the computer display and to produce a haptic signal in coordination with the digital content display; and a haptic system comprised of a plurality of haptic segments, wherein each of the haptic segments is individually controlled in coordination with the haptic signal. In embodiments, the haptic segments comprise a piezo strip activated by the haptic signal to generate a vibration in the frame. The intensity of the haptic system may be increased by activating more than one of the plurality of haptic segments. The intensity may be further increased by activating more than 2 of the plurality of haptic segments. In embodiments, each of the plurality of haptic segments comprises a different vibration capacity. In embodiments, the intensity of the haptic system may be regulated depending on which of the plurality of haptic segments is activated. In embodiments, each of the plurality of haptic segments are mounted in a linear arrangement and the segments are arranged such that the higher capacity segments are at one end of the linear arrangement. In embodiments, the linear arrangement is from back to front on an arm of the head-worn computer. In embodiments, the linear arrangement is proximate a temple of the user. In embodiments, the linear arrangement is proximate an ear of the user. In embodiments, the linear arrangement is proximate a rear portion of the user's head. In embodiments, the linear arrangement is from front to back on an arm of the head-worn computer, or otherwise arranged.

An aspect of the present disclosure provides a head-worn computer with a vibration conduit, wherein the vibration conduit is mounted proximate the haptic system and adapted to touch the skin of the user's head to facilitate vibration sensations from the haptic system to the user's head. In embodiments, the vibration conduit is mounted on an arm of the head-worn computer. In embodiments, the vibration conduit touches the user's head proximate a temple of the user's head. In embodiments, the vibration conduit is made of a soft material that deforms to increase contact area with the user's head.

An aspect of the present disclosure relates to a haptic array system in a head-worn computer. The haptic array(s) that can correlate vibratory sensations to indicate events, scenarios, etc. to the wearer. The vibrations may correlate or respond to auditory, visual, proximity to elements, etc. of a video game, movie, or relationships to elements in the real world as a means of augmenting the wearer's reality. As an example, physical proximity to objects in a wearer's environment, sudden changes in elevation in the path of the wearer (e.g. about to step off a curb), the explosions in a game or bullets passing by a wearer. Haptic effects from a piezo array(s) that make contact the side of the wearer's head may be adapted to effect sensations that correlate to other events experienced by the wearer.

FIG. 29a illustrates a haptic system according to the principles of the present disclosure. In embodiments the piezo strips are mounted or deposited with varying width and thus varying force Piezo Elements on a rigid or flexible, non-conductive substrate attached, to or part of the temples of glasses, goggles, bands or other form factor. The non-conductive substrate may conform to the curvature of a head by being curved and it may be able to pivot (e.g. in and out, side to side, up and down, etc.) from a person's head. This arrangement may be mounted to the inside of the temples of a pair of glasses. Similarly, the vibration conduit, described herein elsewhere, may be mounted with a pivot. As can be seen in FIG. 29a, the piezo strips 29002 may be mounted on a substrate and the substrate may be mounted to the inside of a glasses arm, strap, etc. The piezo strips in this embodiment increase in vibration capacity as they move forward.

In head-worn displays it is advantageous for the optics to be compact and low in weight to make the head-worn display more comfortable for the user. To this end, thinner optics are typically lower in weight. To provide a more immersive viewing experience, a wider display field of view is desirable. For augmented reality applications a large see-through field of view provides the user with an improved see-through view so the user feels more connected with the surrounding environment.

Figure 32:
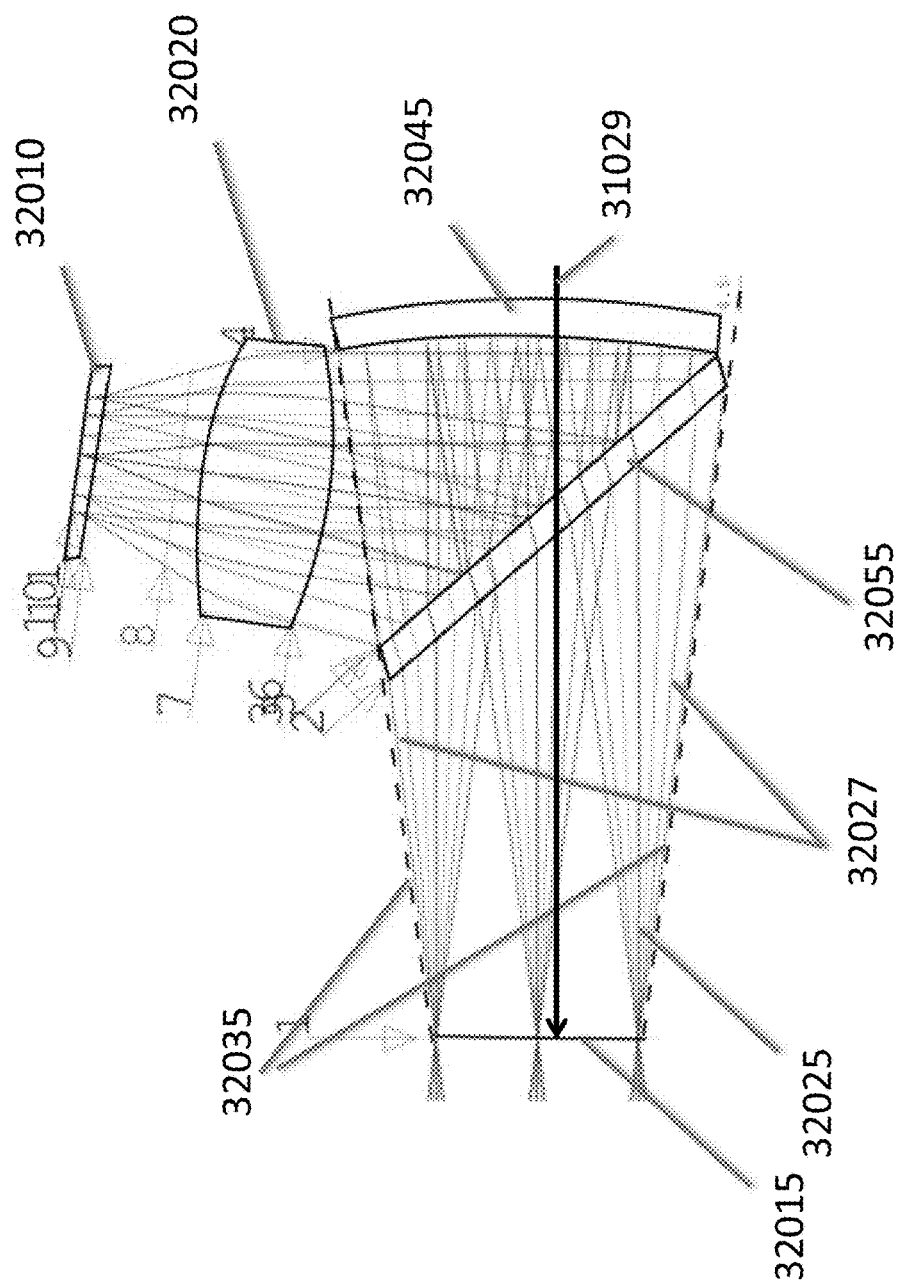

FIG. 32 is an illustration of a cross section of optics with a folded optical path that provide excellent image quality because the wavefront is preserved throughout and there are no structures with multiple edges that tend to scatter light, such as Fresnel lenses, segmented reflectors or diffractive lenses. These optics include an image source 32010 that provides image light 32025 that passes through the optics to the eyebox 32015 where a user can view a displayed image comprised of the image light 32025 in a display field of view. A see-through view of the surrounding environment can also be provided comprised of see-through light 31029 in a see-through field of view, wherein the displayed image is seen by the user as overlaid on top of the see-through view of the environment. Bundles of rays of image light 32025 are shown in FIG. 32 to illustrate how the light passes from the image source 32010 to the eyebox 32015 along a folded optical path. One or more lenses 32020 collect the image light 32025 and present it to a beam splitter 32055 plate that includes a first partially reflective surface to redirect a portion of the image light 32025 toward a curved partial mirror 32045 that includes a second partially reflective surface. A portion of the image light 32025 is then reflected by the curved partial mirror 32045 back toward the beam splitter 32055 which then transmits a portion of the image light 32025 so that it is presented to the eyebox 32015. The curve of the partial mirror 32045 presents the image light 32025 to the eyebox 32015 as a cone of light with an included angle indicated by the solid lines of the outermost rays 32027 that is the display field of view. The see-through field of view is limited by the edges of the various elements and is shown by the included angle between the dotted lines 32035. The multiply folded path of the image light 32025 between the image source 32010 and the eyebox 32015 greatly reduces the overall size of these optics. However, while these optics can provide excellent image quality and are relatively compact, there are opportunities to reduce the assembly cost, reduce the thickness, increase the display field of view and increase the see-through field of view.

Figure 31:
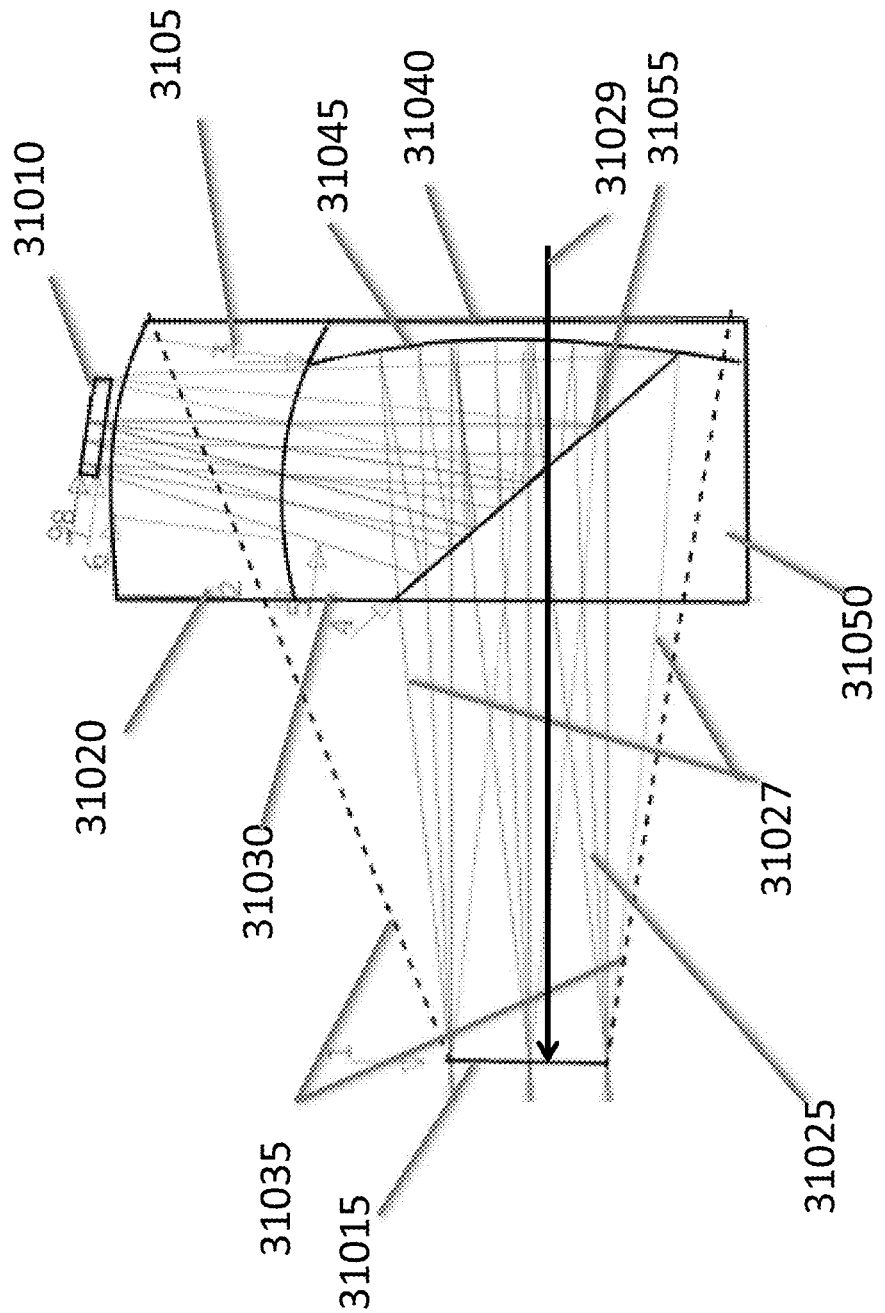
FIGS. 31, 32, 33a, 33b, 34, 35, 36, 37, 38, 38a, 39, 40, 41 and 42 illustrate solid see-through optical systems in accordance with the principles of the present disclosure.

FIG. 31 is an illustration of a cross section of a new form of folded optics that improves on the optics shown in FIG. 32. The optical path followed by the image light 31025 is similar to that followed by image light 32025 in that there are multiple folds between the image source 31010 and the eyebox 31015. See-through light 31029 can also be provided to the eyebox to provide the user with a see-through view of the surrounding environment. Bundles of rays of image light 31025 are shown in FIG. 31 to illustrate how the light passes from the image source 31010 to the eyebox 31015 along a folded optical path. The major difference in the optics shown in FIG. 31 is that surfaces of various optical elements are matched to one another so they can be are cemented together in a solid optical assembly 3105. Where the solid optical assembly 3105 includes at least the following elements: a field lens 31020, a power lens 31030, a prism 31050 and a front lens 31040. The field lens 31020 collects the image light 31025 provided by the image source 31010 and presents it to the power lens 31030. The field lens 31020 can have two optical surfaces that supply optical power provided by spherical or aspherical refractive surfaces. The power lens 31030 has an upper surface that is matched to the lower surface of the field lens 31020. The power lens 31030 also includes a first partially reflective surface 31055 that is plano and a second partially reflective surface 31045 that is curved (e.g. spherical or aspherical). A portion of the image light 31025 is reflected by the first partially reflective surface 31055 so that it is redirected toward the second partially reflective surface 31045 where a portion of the image light 31025 is reflected back toward the first partially reflective surface 31055. A portion of the image light 31025 is then transmitted through the first partially reflecting surface 31055 as it passes to the eyebox 31015. The curved shape of the second partially reflective surface 31045 supplies optical power to the image light 31025 thereby causing the image light 31025 to be presented to the eyebox 31015 as a cone of light with an included angle shown by the outermost rays 31027 of the image light 31025 that comprises the display field of view. Other surfaces in the solid optical assembly 3105 are matched to enable the various elements to be bonded together with transparent adhesive including: the front surface of the power lens 31030 and the back surface of the front lens 31040; the back surface of the power lens 31030 and the front surface of the prism 31050. The bondlines of transparent adhesive at the matched surfaces is typically 10-15 microns in thickness so that the bondlines have little affect on the image light 31025.

Figure 33B:
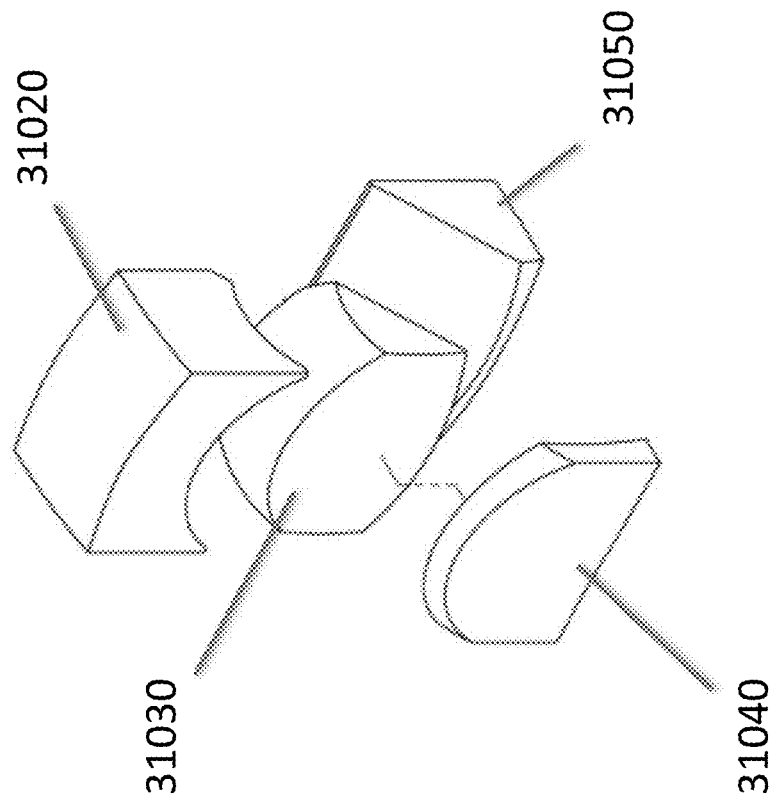
Figure 33A:
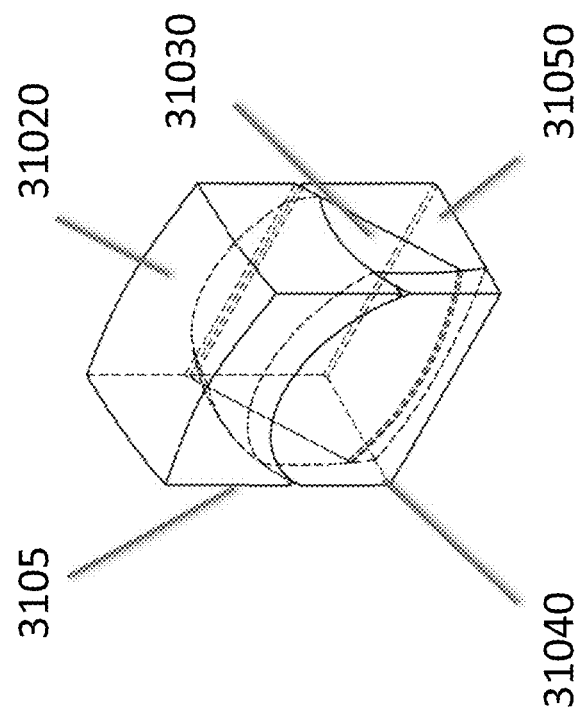

One advantage provided by the solid optical assembly 3105 is that the various elements included in the solid optical assembly 3105 (e.g. 31020, 31030, 31040 and 31050) can be separately manufactured and then cemented together to form a solid optical assembly 3105 as shown in FIGS. 33a and 33b. The solid optical assembly 3105 after being adhesively bonded together can be a robust preassembled optical unit that can be easily installed into a frame along with the image source 31010. The alignment of the various elements (e.g. 31020, 31030, 31040 and 31050) is rigidly held in place by a transparent cement between the surfaces between the various elements. Where the transparent cement used on the surfaces between the various elements, such as between the field lens 31020 and the power lens 31030, between the power lens 31030 and the front lens 31040, and between the power lens 31030 and the prism 31050, can be for example a UV curing adhesive, a two part adhesive or a thermal curing adhesive. The elements can be precisely held in alignment relative to one another by jigs, fixtures or robotic mechanisms while the transparent adhesive is cured in place (e.g. by heat or by ultraviolet light) to lock in the alignment. In a preferred embodiment, the matched surfaces that are cemented together are spherical. After the various elements of the solid optical assembly 3105 have been cemented together, the solid optical assembly 3105 can be installed into a rigid frame of the head-worn display that holds the solid optical assembly 3105 precisely in position relative to an adjacent solid optical assembly 3105 so that left and right versions of image light 31025 can be respectively provided to left and right eyes of a user. Image sources 31010, can be positioned over the respective left and right solid optical assemblies 3105 and the image sources 31010 can be aligned relative to the respective solid optical assemblies 3105 to precisely position the left and right images for viewing by the left and right eyes of the user.

In the solid optical assembly 3105, the field lens 31020 is made from a different optical material than the power lens 31030, the front lens 31040 and the prism 31050. By using optical materials (either glass or plastic) with different refractive indices (e.g. >0.05 different), a refractive effect supplying optical power can be provided across the curved interface between the field lens 31020 and the power lens 31030. For example, the field lens 31020 can be made from a material with a higher refractive index such as for example polycarbonate (1.59), polystyrene (1.58) or OKP4 (1.61) and the power lens can be made from a material with a lower refractive index, such as for example acrylic (1.49) or Zeonex (1.53). As such the solid optical assembly 3105 includes multiple internal optical surfaces including at least one refractive surface between the field lens 31020 and the power lens 31030 and two or more reflective surfaces between the power lens 31030 and the prism 31050 and between the power lens 31030 and the front lens 31040.

To provide for undistorted see-through, it is important that the materials for all the elements through the horizontal thickness, at the user's see-through view of the surrounding environment, of the solid optical assembly 3105 have the same or at least very similar refractive index (e.g. within <0.05) so that the solid optical assembly 3105 appears as a solid optical plate or window when the user is looking at the see-through view of the surrounding environment. As an example, the power lens 31030, the front lens 31040 and the prism 31050 can all be made of materials that have a very similar refractive index (e.g. within 0.005 refractive index units) so the see-through light 31029 passes through the solid optical assembly without being distorted. The field lens 31020 can be made of a material that has a higher refractive index to provide a refractive effect when combined with the power lens 31030, but the dimensions of the field lens 31020 are selected to provide planar front and back surfaces that are adjacent to and coplanar with the front and back surfaces of the lower optical elements including the power lens 31030, the front lens 31040 and the prism 31050, so the solid optical assembly 3105 appears to be a solid optical plate. Because the field lens 31020 extends through the thickness of the solid optical assembly 3105, and the power lens 31030, front lens 31040 and prism 31050 together extend through the thickness of the solid optical assembly 3105 an undistorted (e.g. distortion <0.5 degree) see-through view is provided to the user when looking through the field lens and when looking through the lower optics after the various elements have been cemented together with transparent adhesive.

Another advantage provided by the solid optical assembly 3105 is that the accuracy required in the various elements (e.g. 31020, 31030, 31040 and 31050) can be reduced. This is accomplished by using a transparent adhesive that has a refractive index that is very similar or index matched (e.g. within 0.05 index units) to the material of one of the elements such as the field lens 31020, the power lens 31030, the front lens 31040 and the prism 31050. Optically speaking, the transparent adhesive then becomes part of the element because the adhesive is index matched to the material of the element. The surface between the elements then becomes defined by either the surface of the element that has a different refractive index or by a partially reflective coating applied to the surface of one of the elements. As such only one side of each matched surface needs to be optically accurate while the mating surface does not need to be optically accurate. For example the lower surface of the field lens 31020 can have an accuracy of <5 microns while the upper surface of the power lens 31030 can have an accuracy of <30 micron if a transparent adhesive is used to bond the elements together that is index matched to the material of the power lens 31030. In the case of partially reflective coatings, the coating is applied to an accurate surface to provide improved optical performance. The mating surface then does not need to be very accurate provided the transparent adhesive is index matched to the mating surface so that any irregularities and inaccuracies of the mating surface are filled in by the transparent adhesive. As a result, the number of surfaces that need to be highly accurate is substantially reduced thereby increasing the yield during manufacturing and consequently reducing the manufacturing cost of the various elements. For example for the solid optical assembly 3105, there are four optical surfaces that need to be precise (e.g. within 5 microns of the desired surface geometry) to provide excellent image quality: the upper surface of the field lens 31020, the surface between the field lens 31020 and the power lens 31030, the surface between the power lens 31030 and the front lens 31040 and the surface between the power lens 31030 and the prism 310450. The accuracy of the mating surfaces to the internal accurate surfaces can be substantially reduced (e.g within 10-40 microns depending on whether the surface is respectively an external see-through surface or an internal cemented surface). In addition, since the first and second partially reflective surfaces (31055 and 31045 respectively), are internal to the solid optical assembly 3105, these precise optical surfaces are respectively protected from damage during use by the front lens 31040 and the prism 31050. In addition, the accurate surfaces can be positioned on different elements if that provides a manufacturing advantage since the surfaces are matched between elements. For example, the first partially reflective surface and it's associated partially reflective coating can be placed on either the lower surface of the power lens 31030 or the upper surface of the prism 31050, and the second partially reflective surface and it's associated partially reflective coating can be positioned on either the front surface of the power lens 31030 or the rear surface of the front lens 31040. Similarly the accurate surface between the power lens 31030 and the field lens 31020 can be provided by the upper surface of the power lens 31030 or the lower surface of the field lens 31020, however in this case, since the refractive indices of the two elements are different this accurate surface provides a refractive effect, the index matching adhesive is chosen to match the element that does not provide the accurate surface so the adhesive fills in the inaccuracies of the surface.

Yet another advantage provided by the solid optical assembly 3105 is that the see-through field of view can be substantially increased. As shown in FIG. 31 and as previously described herein, the solid optical assembly 3105 can be comprised of two different optical materials, wherein the field lens 31020 has one refractive index and the other various elements (31030, 31040 and 31050) all have very similar refractive indices that are different from the refractive index of the field lens 31020. Since the field lens 31020 shares the same front surface as the front lens 31040 and the same back surface as the prism 31050, the solid optical assembly 3105 appears to the user as a solid optical plate window with little see-through distortion. As a result, the user can see through both the field lens 31020 and the other various elements (31030, 31040 and 31050) and the see-through field of view then encompasses the entire front surface of the solid optical assembly 3105 as shown by the dotted lines 31035. By comparing the subtended angle of the dotted lines 31035 shown in FIG. 31 to the subtended angle of the dotted lines 32035 shown in FIG. 32, it can be readily seen that the solid optical assembly 3105 provides a much greater vertical see-through field of view than the embodiment shown in FIG. 32 because the vertical see-through angle of the embodiment shown in FIG. 32 is limited by the lower surface of the lens 32020 where the refractive index through the thickness changes substantially whereas the see-through angle of the solid optical assembly 3105 can encompass all of the various elements including the field lens 31020. As such the vertical see-through field of view can be substantially larger than the display field of view in the solid optical assembly 3105. The front lens 31040 and the prism 31050 are designed in conjunction with the power lens 31030 to provide a uniform thickness plate when cemented together so the see-through light 31029 is not distorted as it passes to the eyebox 31015. The field lens 31020 is then designed so that the lateral dimension matches the combined thickness of the power lens 31030, the front lens 31040 and the prism 31050. In this way, the solid optical assembly 3105 comprises a uniform thickness plate of optical material with plano front and back surfaces so the user is provided an undistorted see-through view of the surrounding environment.

Figure 35:
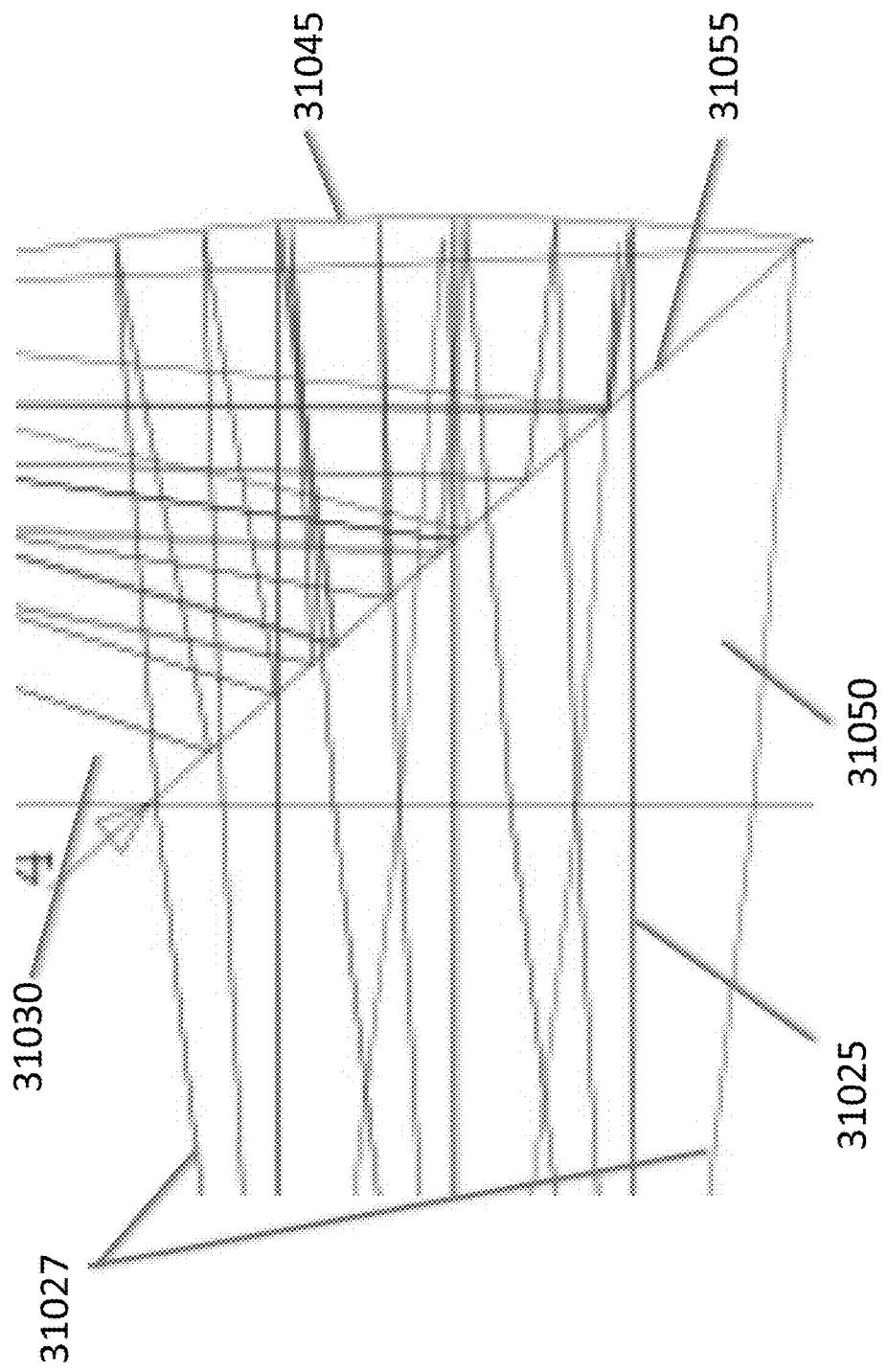

A further advantage provided by the solid optical assembly 3105 is that the optics can be substantially thinner than the embodiment shown in FIG. 32. This is because the image light 31025 is contained within the optical material of the solid optical assembly 3105 so that a refractive effect occurs as the image light 31025 exits from the back of the solid optical assembly 3105 as it passes from the high refractive index material of the solid optical assembly 3105 to the low refractive index air on it's way to the eyebox 31015. This can be seen as a change in angle of the outermost rays 31027 of the image light 31025 where they pass from the back surface of the prism 31050 into the air on the way to the eyebox 31015. As such, the subtended angle of the outermost rays 31027 of the image light 31025 is reduced inside the material of the solid optical assembly 3105. The reduced subtended angle of the outermost rays 31027 of the image light 31025 enables the radius of curvature of the second partially reflective surface 31045 to be increased and still provide the desired subtended angle of the outermost rays 31027 of the display field of view. Thus the reduced subtended angle enables a reduced thickness of the optics for a given display field of view. FIG. 35 is a magnified portion of FIG. 31 wherein the change in the subtended angle between the outermost rays 31027 of the image light 31025 can be better seen where they pass from the back surface of the prism 31050 into the air on their way to the eyebox 31015. Internal to the solid optical assembly 3105, the subtended angle between the outermost rays 31027 is reduced compared to the subtended angle in the air and as a result, the footprint (area covered by) of the ray bundles of the image light 31025 is reduced in size at the second partially reflective surface 31045 and at the first partially reflective surface 31055. This reduction in footprint of the ray bundles of the image light 31025 along with the reduced sag of the increased radius of curvature of the second partially reflective surface 31045 provides a reduction in the thickness of the solid optical assembly 3105 as measured from the front to the back (right to left as shown in FIG. 31). By comparison, the subtended angle of the outermost rays 32027 of the image 32025 in the optics shown in the embodiment depicted in FIG. 32 is constant between the eyebox 32015 and the curved partial mirror 32045 and as a result, the thickness of the optics is increased relative to what is provided by the solid optical assembly 3105. Consequently by positioning the first and second partially reflective surfaces (31055 and 31045) internal to the solid optical assembly 3105, the subtended angle of the image light 31025 is reduced relative to the display field of view and the footprints of the image light 31025 at the first and second partially reflective surfaces are correspondingly reduced thereby enabling a reduction in thickness of the solid optical assembly 3105. For example optics of the type shown in FIG. 32 can be 14 mm thick while solid optics of the type shown FIG. 31 can be 11 mm thick for the same field of view thereby reducing the thickness of the optics by 22%.

In embodiments, the solid optical assembly 3105 is a solid block comprised of two optical materials with at least one internal refractive surface and at least two internal reflective optical surfaces. Wherein the solid optical assembly 3105 maintains the wavefront of the image light 31025 throughout the optics to provide improved image quality in the displayed image presented to the user. The front and back surfaces of the solid optical assembly 3105 can both be plano so that an undistorted see-through view of the surrounding environment can be provided that is transmitted through the entire front surface of the solid optical assembly 3105 thereby providing a larger vertical see-through field of view. The plano front and back surfaces of the solid optical assembly 3105 also provide for easier cleaning of the solid optical assembly 3105 for improved viewing of the displayed image and the see-through view of the surrounding environment.

In embodiments, the curved surface of the second partially reflective surface 31045 can be replaced by a flat holographic surface that has optical power. The flat holographic surface with optical power can be positioned to be at the front surface of the solid optical assembly 3105 thereby making the front lens 31040 unnecessary and further reducing the overall thickness, or the flat holographic surface with optical power can be positioned internal to the solid optical assembly 3105 with a uniform thickness front lens 31040. Where the flat holographic surface provides the same optical power as the curved surface of the second partially reflective surface 31045.

In embodiments, features are added to the various elements to enable the elements to self align relative to each other during the cementing process. While spherical and aspherical surfaces do tend to align with each other when mating surfaces are brought together this alignment is largely in regard to the decenter and the Z position of the mating surfaces and not in regard to tilt or rotational alignment between the mating surfaces. As such, the features can include complimentary tapered structures or beveled structures with mating slots or grooves, so the elements are guided into position as they are pressed together to reduce tilt and rotational misalignment between surfaces. The features are preferably located at the sides of the elements so the thickness of the solid optical assembly 3105 is not increased. Alternatively, features can be located at the front or back of the elements and the features can be removed (e.g. by machining or cutting) from the solid optical assembly 3105 after cementing is completed.

Figure 34:
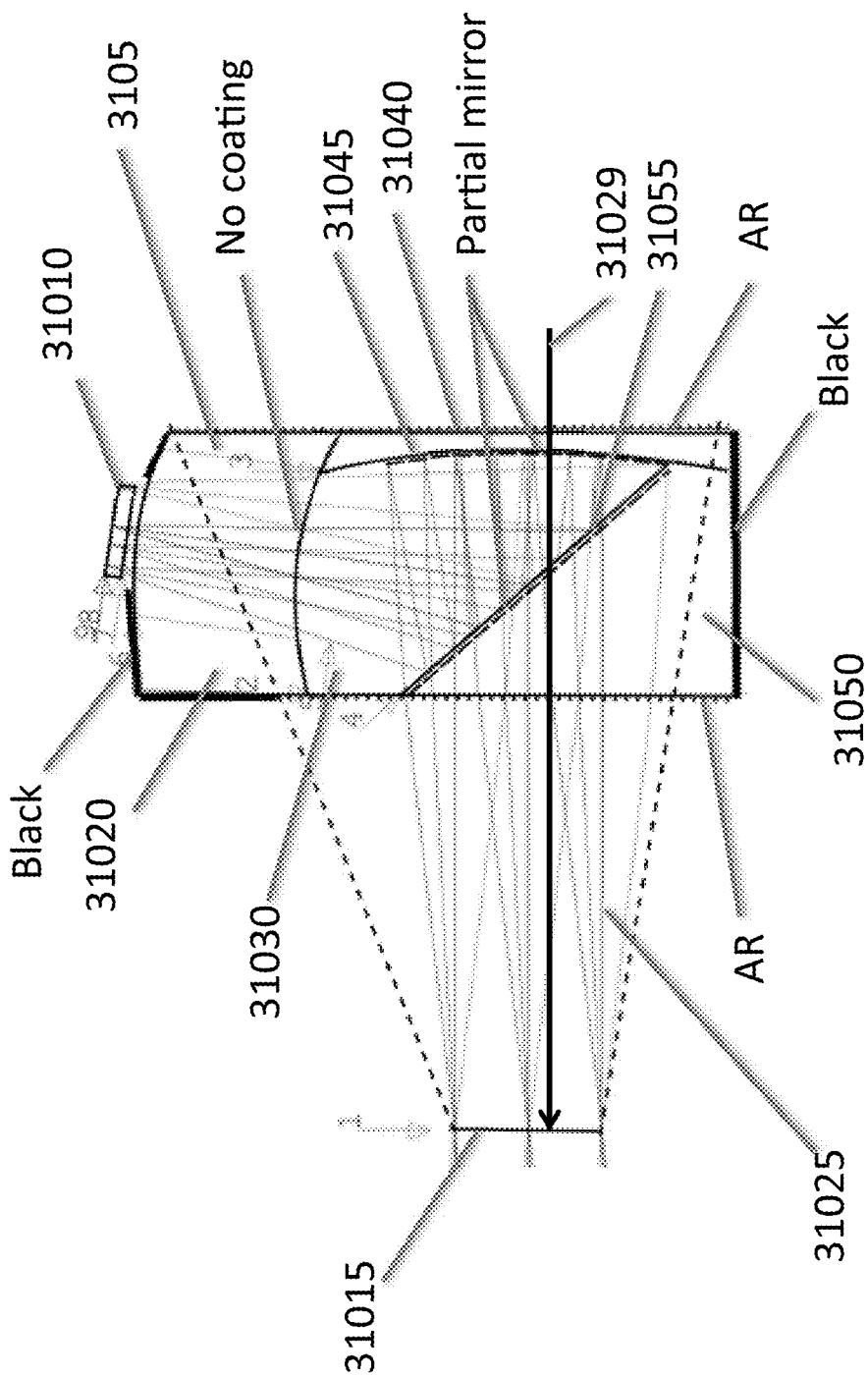

FIG. 34 shows an example of coatings that can be applied to the solid optic assembly 31045. Black coatings such as black paint can be applied to portions of the sides of the field lens 31020 to reduce stray light associated with image light 31025 that reflects off the internal sidewalls of the field lens 31020. Black coating can also be applied to the bottom surface of the prism 31050 to prevent image light 31025 that passes through the first partially reflective surface 31055 from escaping from the solid optic assembly 3105. Black coating on the bottom surface of the prism 31050 also prevents stray light from the environment below the head-worn display from being transmitted upward into the prism 31050 where it can be reflected by the first partially reflective surface back toward the eyebox 31015 thereby interfering with the displayed image seen by the user. The black coatings are indicated by heavy lines in FIG. 34. Antireflective coating can be applied to the front and back surfaces of the solid optics assembly 3105 as indicated by the dotted lines in FIG. 34. The black coatings and the antireflection coating can be applied to the solid optical assembly 3105 after the various elements have been cemented together to reduce the number of coating runs needed and thereby reduce coating costs. The first partially reflective surface 31055 and the second partially reflective surface 31045 are coated with partially reflective coatings as indicated by dashed lines in FIG. 34. Where the partially reflective coating may not be the same on these two internal surfaces. In embodiments, the first partially reflective surface 31055 and the second partially reflective surface 31045 can be coated with simple partial mirror coatings that reflect substantially all of the visible wavelengths equally (e.g. 50% reflectivity). Alternatively, at least one of the first or second partially reflective surfaces (31055, 31045) can be coated with a notch mirror coating that has a higher reflectivity for wavelength bands included in the image light 31025 as provided by the image source 31010 and has a higher transmitivity for visible wavelengths not included in the wavelength bands included in the image light 31025. Preferably, the notch mirror coating has a reflectivity of >50% for wavelength bands included in the image light 31025 and has a transmitivity of >50% for visible wavelengths not included in the wavelength bands of the image light 31025. In a further preferred embodiment, the notch mirror coating reflects a majority of selected wavelength bands of image light to provide a bright displayed image while simultaneously transmitting a majority of the visible light between the selected wavelength bands to provide a bright see-through view of the surrounding environment. As previously described herein, the partially reflective surface for the first partially reflective surface 31055 can be applied to either the lower surface of the power lens 31030 or the upper surface of the prism 31050 and the partially reflective surface for the second partially reflective surface 31045 can be applied to either the front surface of the power lens 31030 or the back surface of the front lens 31040. The notch mirror coating can be applied to a surface of a plastic element. In a preferred embodiment, an element of the solid optical assembly is glass element (e.g. the front lens 31040) and the notch mirror coating is applied to a surface of the glass element. Alternatively a notch mirror multilayer film (such as is described in U.S. Pat. No. 7,851,054) can be applied at an interface between elements and adhesively bonded into place.

In embodiments, the solid optical assembly 3105 is coated with black absorbing material on the sides and bottom of the solid optical assembly 3105 to reduce glinting reflections of see-through light 31029 from the non-optical surfaces of the solid optical assembly 3105. By applying the black to the sides and bottom of the solid optical assembly 3105, the see-through view is not significantly blocked while eliminating the glinting reflections substantially improves the viewing experience. The solid optical assembly 3105 can also be made wider or taller than is needed for displaying the image to the user to position the sides and bottom of the solid optical assembly 3105 further away from the user's line of sight where any artifacts caused by these non-optical surfaces are less noticeable.

Figure 36:
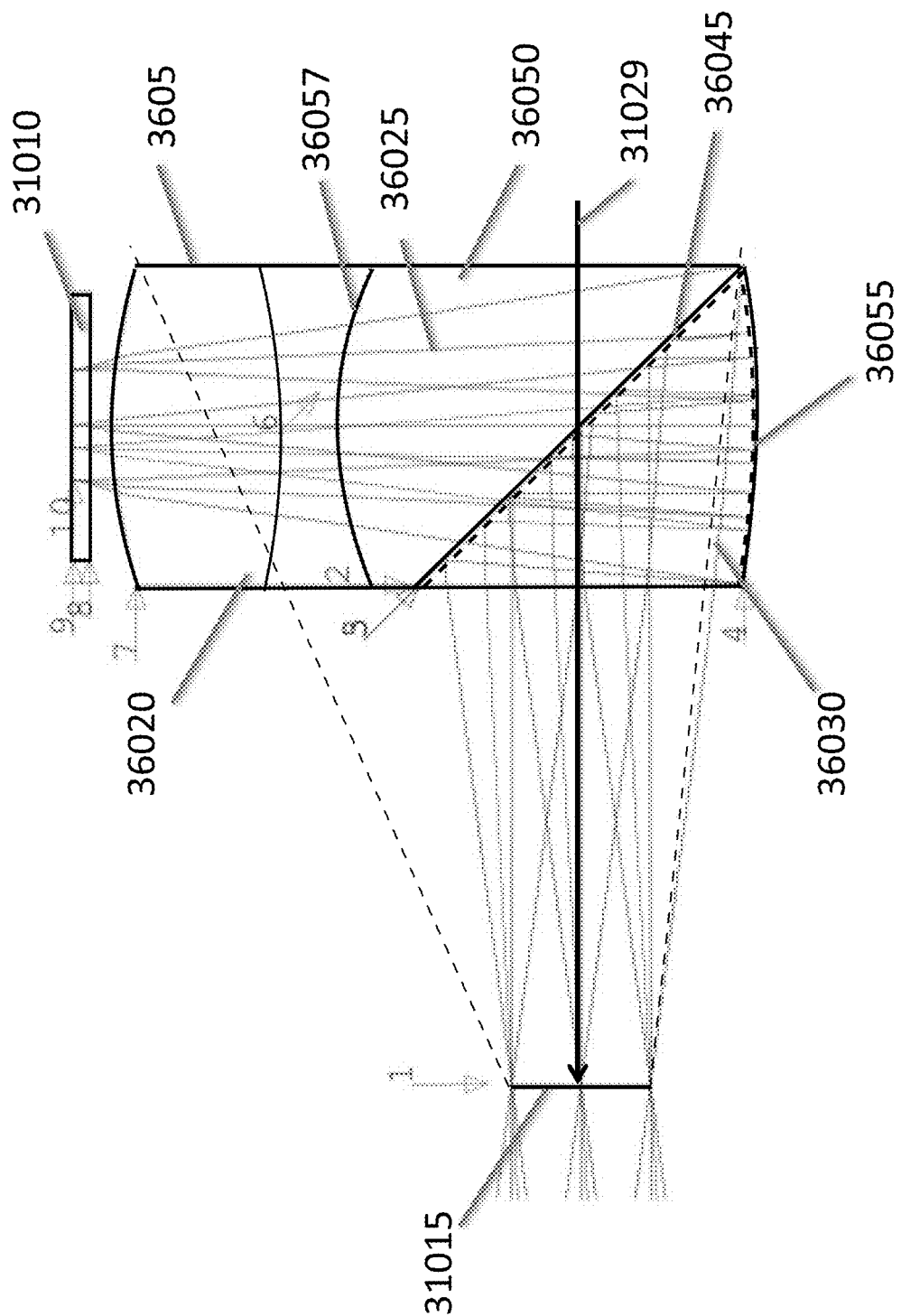

In embodiments the geometry of the solid optical assembly 3105 can be different from that shown in FIGS. 31, 33*a* and 33*b* wherein the curved optical surface of the second partially reflective surface 36055 is positioned at the bottom of the solid optical assembly 3605 as shown in FIG. 36. Where the solid optical assembly 3605 includes at least one upper lens 36020 which can include a field lens, a central prism element 36025 with a curved surface shared with the upper lens 36020, and a lower prism element 36030 that includes the curved surface associated with the second partially reflective surface 36055. The upper prism element 36050 and the lower prism element 36030 are made from materials with the same refractive index within <0.05 and adhesively bonded together with a transparent index matched adhesive. The material of the upper lens 36020 has a refractive index that is different from that of the upper prism element 36050 and the lower prism element 36030 (e.g. at least 0.05 greater) so that a refractive effect is supplied to the image light 36025 as it passes from the upper lens 36020 to the upper prism element 36050. The upper lens 36020 is adhesively bonded to the upper prism element 36050 with a transparent index matched adhesive, where the adhesive can be index matched to either the material of the upper lens 36020 or the material of the upper prism element 36050. The various elements included in the solid optical assembly 3605 together form a uniform thickness block that provides an undistorted see-through view of the surrounding environment. In addition, the central prism element 36025 and the lower prism element 36030 can be designed to be the same shape to reduce manufacturing cost. The second partially reflective surface 36055 is coated to make the surface a reflective surface that supplies optical power to the image light 36025. The first partially reflective surface 36045 can be coated such as with a partially reflective dielectric coating (e.g 20 to 50% reflectivity and 80 to 50% transmission), wherein the coating can be applied to either the lower surface of the upper prism element 36050 or the upper surface of the lower prism element 36030. Image light 36025 from the image source 31010 passes through the upper lens 36020 and the upper prism element 36050. A portion of the image light 36025 is transmitted by the first partially reflecting surface 36045. The image light 36025 then passes through the lower prism element 36030 until it is incident on the second partially reflecting surface 36055 where it is reflected by the curved surface which supplies optical power to the image light 36025 thereby providing a cone of image light 36025, which forms the display field of view, to the eyebox 31015. By positioning the curved surface of the second partially reflective surface 36055 at the bottom of the solid optical assembly 3605, the see-through light 31029 from the surrounding environment no longer has to pass through the second partially reflective surface 36045 thereby enabling the see-through transmission to be increased (e.g. >50% transmission). In addition, since the see-through light 31029 doesn't pass through the second partially reflective surface 36055, the curved surface of the second partially reflective surface 36055 can be coated with a full mirror coating (e.g. >90% reflectivity for visible light) to provide increased efficiency. However, the thickness of the solid optical assembly 3605 is increased in this geometry because the ray bundles of the image light 36025 are diverging in the longer vertical portion of the solid optical assembly 3605 thereby increasing the footprint of the ray bundles of the image light at the second partially reflective surface 36055, which causes the horizontal thickness of the solid optical assembly 3605 to be larger than the solid optical assembly 3105. However the principles and advantages of making a pre-assembled solid optical assembly 3605 in this geometry apply similarly as previously described herein.

Figure 37:
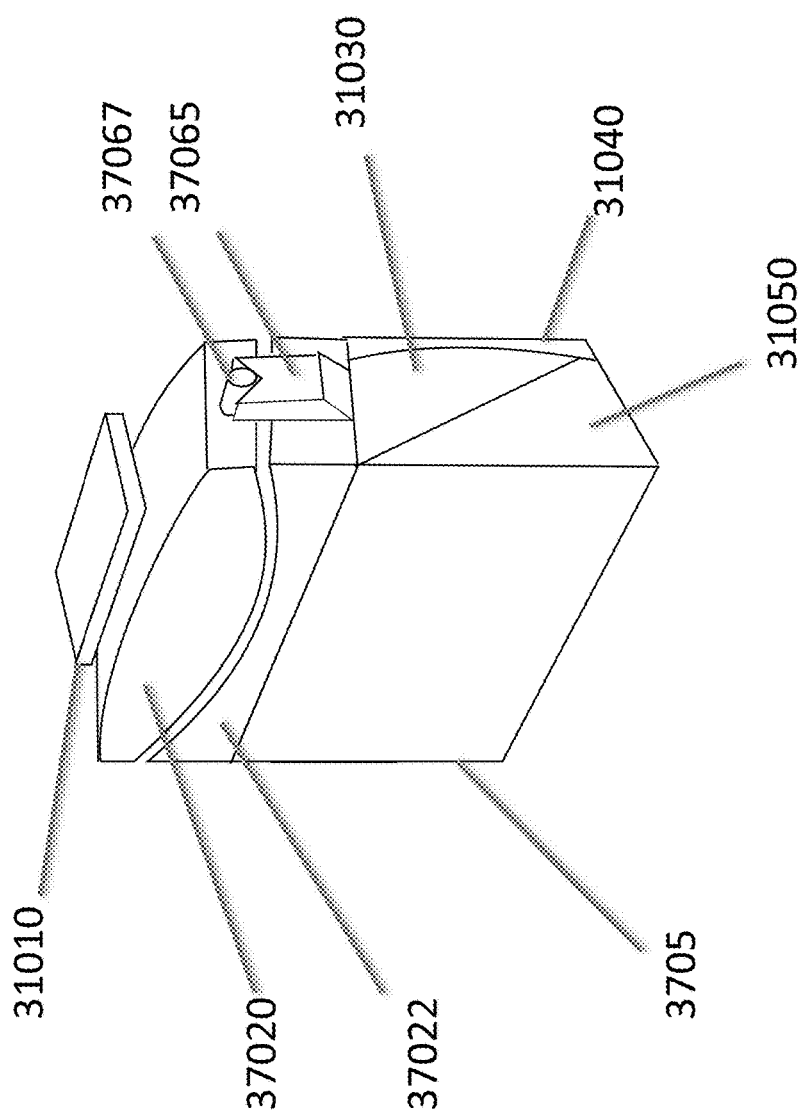
Figure 38:
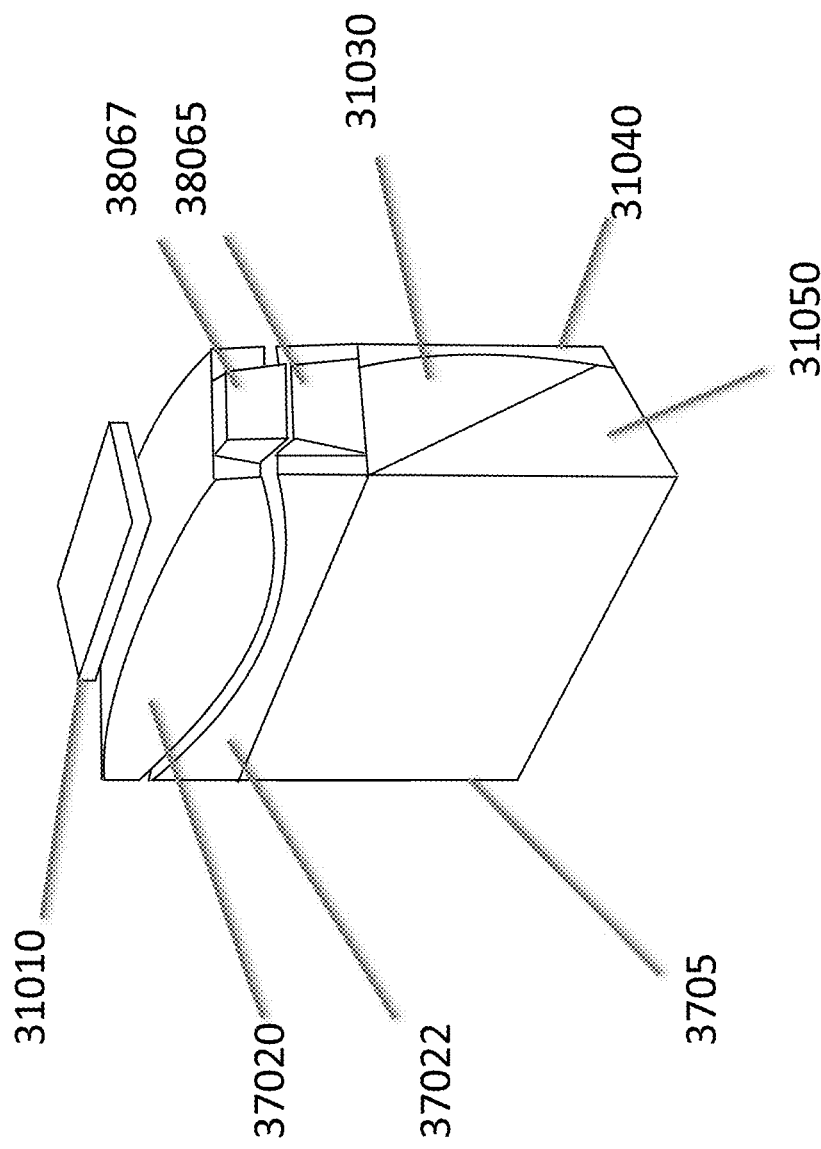
Figure 38A:
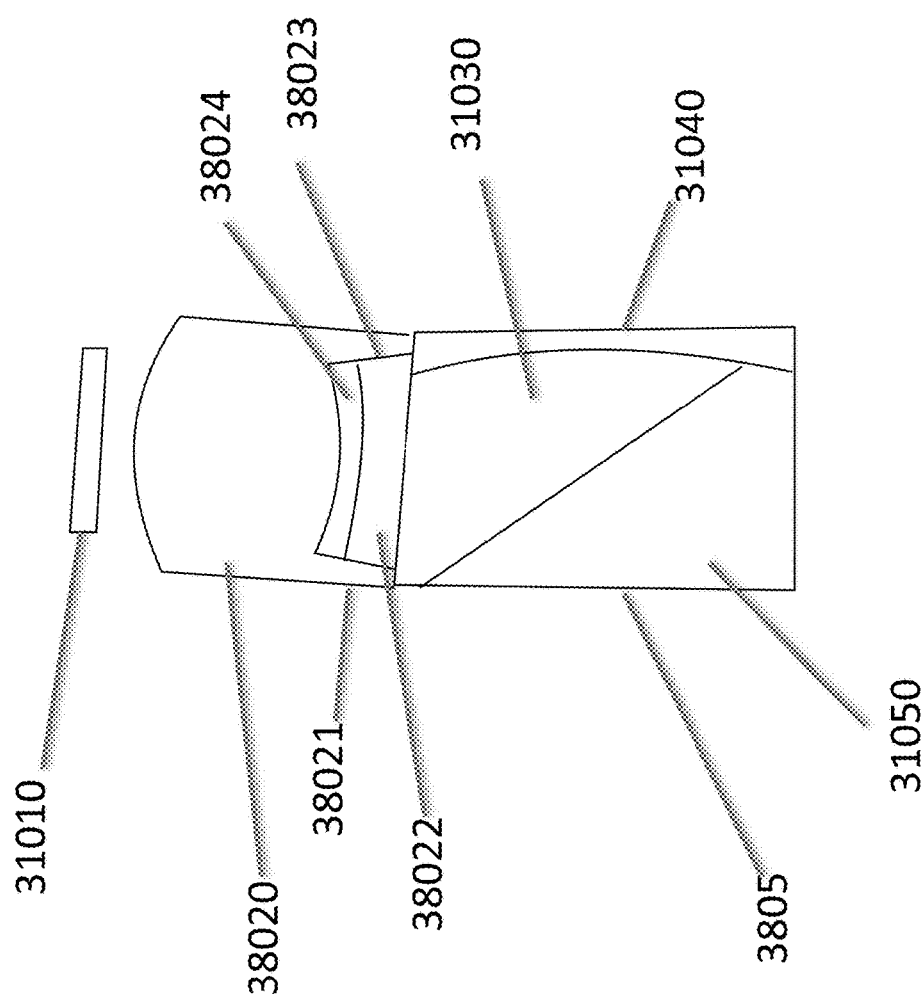

In embodiments, a solid optical assembly can be used with additional separate optical elements to provide an increased display field of view. FIG. 37 is an illustration of a solid optical assembly 3705 with an additional separate optical element 37020. In this embodiment, a prism 31050, a power lens 31030 and a front lens 31040 all made with materials that have the same or very similar refractive indices are cemented together as previously described herein. A middle element 37022 made from a material that has a different refractive index is cemented to the power lens 31030 to provide a solid optical assembly 3705 that is similar to what has been described previously herein with a see-thru view provided to the user wherein scene light from the surrounding environment can pass through all of the elements that are cemented together, thereby providing a greater vertical see-through field of view. A separate optical element 37020 (shown as a field lens in FIG. 37, but other optical elements and multiple optical elements are also possible) is then positioned between the middle element 37022 and the image source 31010. By adding another optical element, further control over the image light 31025 is enabled so that the performance of the head-worn display can be improved, such as increasing the display field of view (e.g. >35 degrees or 40 degrees or greater), or increasing the sharpness (MTF) in the displayed image seen by the user. An air gap can separate the separate optical element 37020 and the solid optical assembly 3705 to enable a greater refractive effect on the image light. To position the separate optical element 37020 in relation to the other elements of the solid optical assembly 3705, features can be attached or manufactured as part of adjacent elements to align the separate optical element 37020 relative to the solid optical assembly as they are being assembled. FIG. 37 shows an example of alignment features 37065 and 37067 wherein feature 37067 is a cylindrical pin that fits into feature 37065, which is a tapered slot. Feature 37065 can be molded as part of the middle element 37022 or accurately attached to the middle element 37022 using a jig. Similarly, feature 37067 can be molded as part of the separate optical element 37020 or accurately attached to the separate optical element 37020 using a jig. The features 37065 and 37067 align the separate optical element 37020 relative to the middle element 37022 by reducing the lateral tilt and rotation about the optical axis. Other features can be added to reduce other alignment inaccuracies. Different types of mating features are possible such as matching tapered surfaces or matching flanges between the separate optical element 37020 and the middle element 37022. FIG. 38 shows another example of features 38065 and 38067 that can be used to align the separate optical element 37020 relative to the other elements of the solid optical assembly 3705 and hold it in position during assembly. Features 38065 and 38067 are shown as being wider to aid in preventing tilt across the narrow dimension of the separate optical element 37020 and also to enable the surfaces to be adhesively bonded together during assembly in a way that preserves the air gap between the separate optical element 37020 and the middle element 37022. While the features 37065 and 38065 are shown as being associated with the middle element 37022, they can also be associated with the power lens 31030 or other elements. FIG. 38*a* shows a further illustration of a special flange 38021 associated with the separate optical element 38020 (alternatively the special flange can be associated with the middle element 37022 or the power lens 31030) where the flange 38021 positions the separate optical element 38020 relative to the middle element 38022 and the power lens 31030. The special flange 38021 supports the separate optical element 38020 across the ends or around the edges of the separate optical element 38020 to thereby accurately establish the air gap 38024 between the separate optical element 38020 and the middle element 38022. The special flange can be adhesively bonded into place after positioning the separate optical element 38020 in relation to the middle element 38022 and the power lens 31030. The special flange 38021 can seat onto the upper surface of the power lens 31030 (as shown in FIG. 38*a*) or onto a surface of the middle element 38022 (not shown). In addition, the special flange 38021 can include tapered features 38023 that mate with corresponding features at the edge of the middle element 3802 so that the separate optical element 38020 is physically aligned relative to the middle element 38022 as the lenses are assembled. In the case where the special flange extends all the way around the edge of the middle element 38022, the special flange 38021 can provide a further benefit of keeping dust out of the air gap 38024. By providing a special flange 38021 to the separate optical element 38020 and adhesively bonding the special flange 38021 to the middle element 38022 or the power lens 31030, an extended solid optical assembly 3805 is provided with improved control over the image light so that a wider field of view or improved image quality (e.g. increased sharpness) is possible. Where the extended solid optical assembly has three internal refractive surfaces: the surface between the bottom of the separate optical element 38020 and air in the airgap 38024; the surface between the air in the airgap 38024 and the upper surface of the middle element 38022; the surface between the bottom of the middle element 38022 and the top of the power lens 31030. Likewise, alignment features can be added to other elements to provide alignment with adjacent elements in the extended solid optical assembly 3805.

In embodiments, the front lens 31040 can be made from a material (e.g. glass) with a substantially different thermal expansion coefficient from the power lens 31030 (e.g. plastic) and to allow the two elements to expand differently the two elements can be physically held together without being cemented. As a result, there can be a tiny air gap (e.g. 10 microns or less) between the elements, or the gap can be filled with an index matched liquid such as an oil. To prevent spurious reflection artifacts from occurring at the interface, the front surface of the power lens 31030 is coated with an antireflection coating and the back surface of the front lens 31040 is coated with a partially reflective coating as previously described herein. Features can be added to the frame of the head-worn display to physically hold the front lens 31040 against the power lens 31030. Preferably the matched surface between the power lens 31030 and the front lens 31040 is spherical so that alignment between the two elements is not critical provided that contact is maintained between the surfaces of the two elements. Since the gap between the elements is tiny, light from the surrounding environment is essentially unaffected by the gap so that the user is provided with a see-thru view that is substantially limited by the first and second partially reflective surfaces alone.

Figure 39:
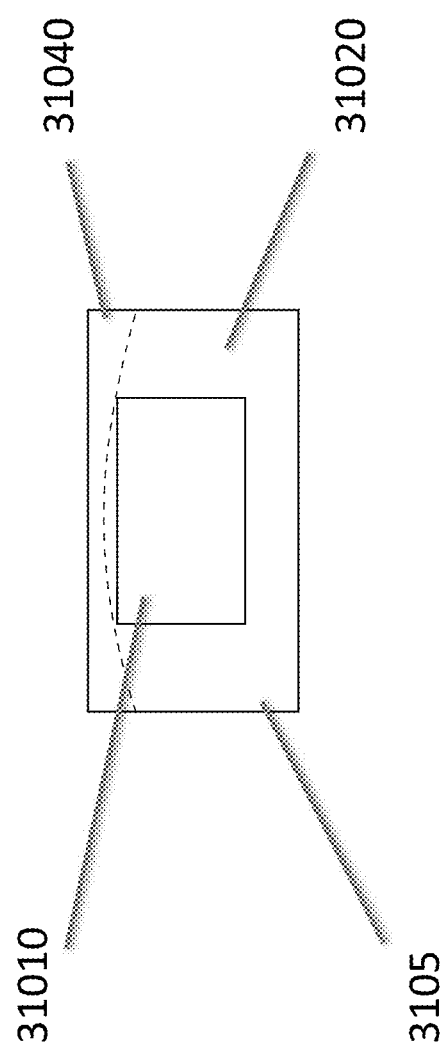
Figure 41:
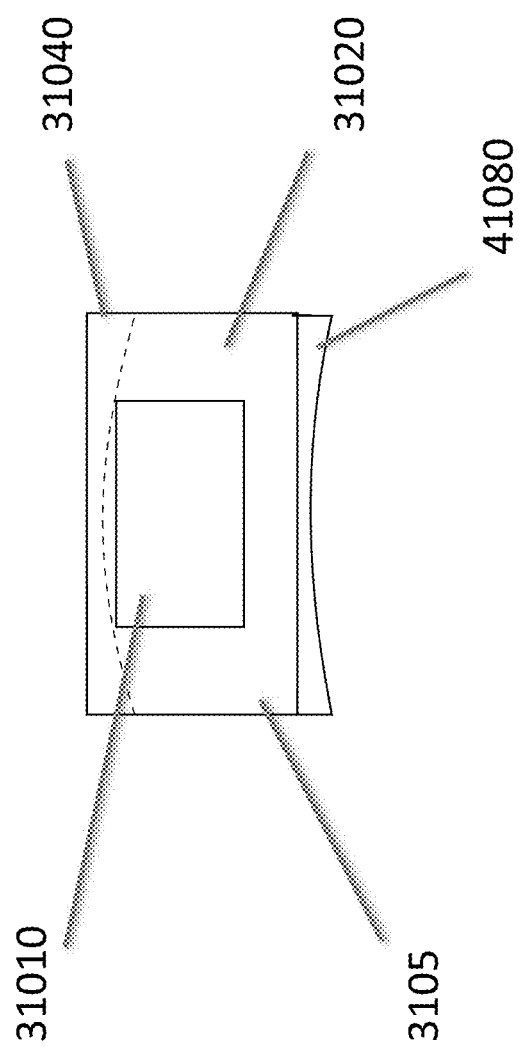

In embodiments, a corrective ophthalmic element can be attached to the back surface of the solid optical assembly. Wherein the corrective ophthalmic element is designed to provide the optical characteristics of the ophthalmic prescription of the user. FIG. 39 is an illustration of a solid optical assembly 3105 as seen from above. In this figure, the solid optical assembly 3105 can be seen to have flat front and back surfaces (the front surface of the front lens 31040 is shown at the top and the back surface is shown at the bottom) with a uniform combined thickness to provide an undistorted see-through view of the surrounding environment. FIG. 41 is an illustration of a solid optical assembly 3105 with a corrective ophthalmic element 41080 shown attached to the back surface of the solid optical assembly 3105. Wherein the corrective ophthalmic element 41080 can be physically held against the back of the solid optical assembly 3105 and aligned relative to the solid optical assembly 3105 by mechanical features (not shown) on the sides or associated with the frame, or the corrective ophthalmic element 41080 can be aligned relative to the solid optical assembly 3105 and then adhesively bonded to the back surface of the solid optical assembly 3105. Where the alignment of the corrective ophthalmic element 41080 relative to the solid optical assembly 3105 can be provided by interlocking features associated with the solid optical assembly 3105 and the corrective ophthalmic element 41080. By positioning the corrective ophthalmic element 41080 at the back surface of the solid optical assembly 3105 and aligned with the optics of the solid optical assembly 3105, the user's view of both the displayed image and the see-through view of the surrounding environment are improved by adding the optical characteristics (for example: diopter power, astigmatism, wedge) associated with the user's ophthalmic prescription. As such the corrective ophthalmic element 41080 can be provided with the specific ophthalmic prescription of the user or can be provided with a general ophthalmic prescription such as diopter power alone.

Figure 43:
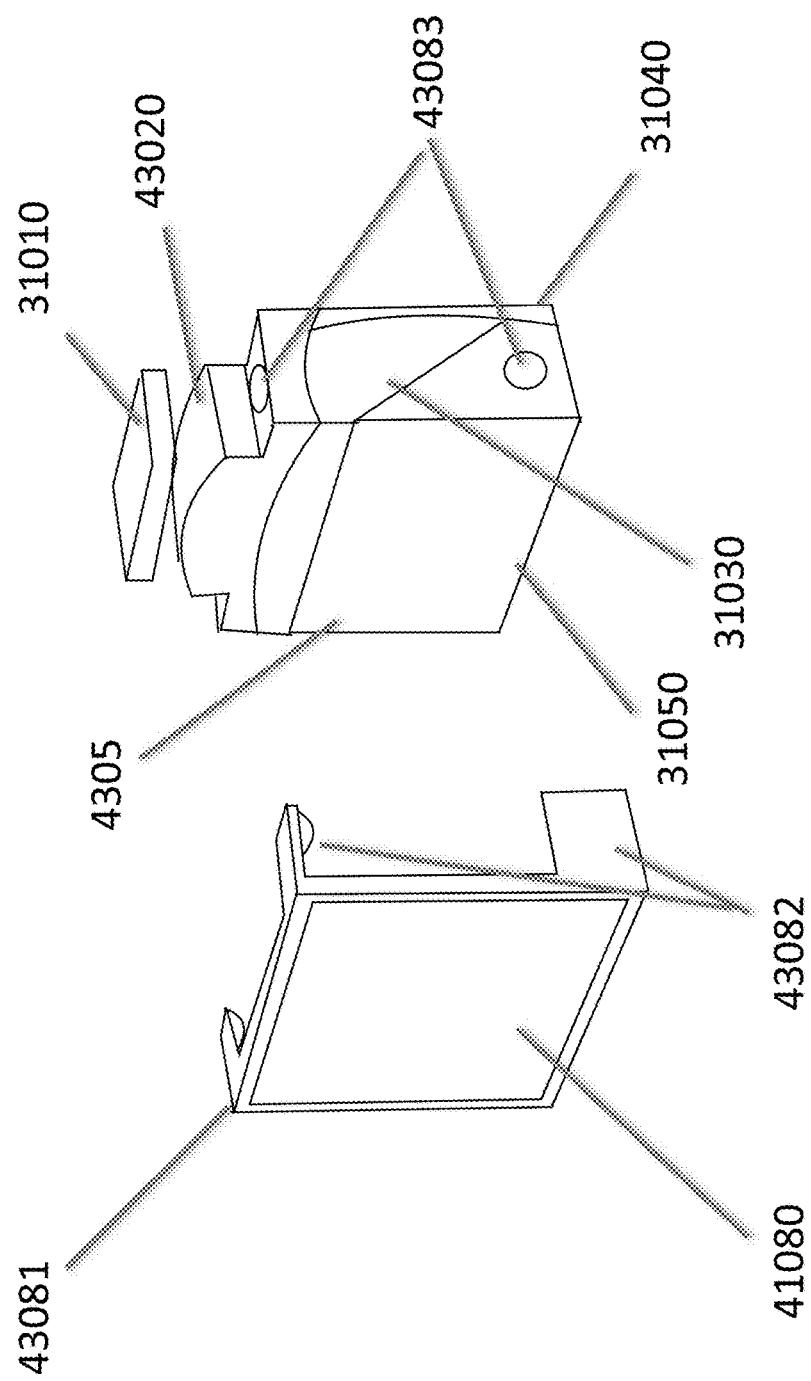
FIG. 43 illustrates a corrective optic and a see-through optical systems in accordance with the principles of the present disclosure.

In embodiments, the corrective ophthalmic element can be mechanically or magnetically held onto the back of the solid optical assembly by a holder with features that clip or snap onto the solid optical assembly. FIG. 43 is an illustration of a corrective ophthalmic element 41080 mounted in a holder 43081, wherein the holder 43081 includes mounting features 43082 that clip into corresponding mounting features 43083 in the solid optical assembly 4305. The field lens 43020 can be modified to include flat flanges at the edges of the field lens 43020 as shown for example in FIG. 43 where the mounting features 43083 are depressions in the solid optical assembly 4305 so the mounting features 43082 in the holder 43081 can clip in. When the holder 43081 is clipped into the features 43083 of the solid optical assembly 4305, the holder 43081 can be rigidly held into position and the corrective ophthalmic element 41080 can be rigidly held in alignment relative to the optics of the solid optical assembly 4305. The corrective ophthalmic element 41080 can be physically mounted into a pocket in the holder 43081 or it can be adhesively bonded into a pocket in the holder 43081. The features 43082 and 43083 can be located on the sides, top or bottom of the holder 43081 and the solid optical assembly 4305 as long as the features are located in corresponding locations so the features can clip into one another. By clipping onto the edges of the solid optical assembly 4305 so the corrective ophthalmic element 41080 is held against the back of the solid optical assembly 4305, the thickness of the corrective ophthalmic element 41080 can be reduced and the thickness of the head-worn display can also be reduced. In embodiments, magnets or mechanical features may be designed into the HWC frame that is holding the solid optic. For example, the optic may be mounted and secured in the frame of the HWC and a slot, magnet and/or other feature may be mounted in the frame such that when the corrective optic can be snapped or clipped in place by a user.

Figure 40:
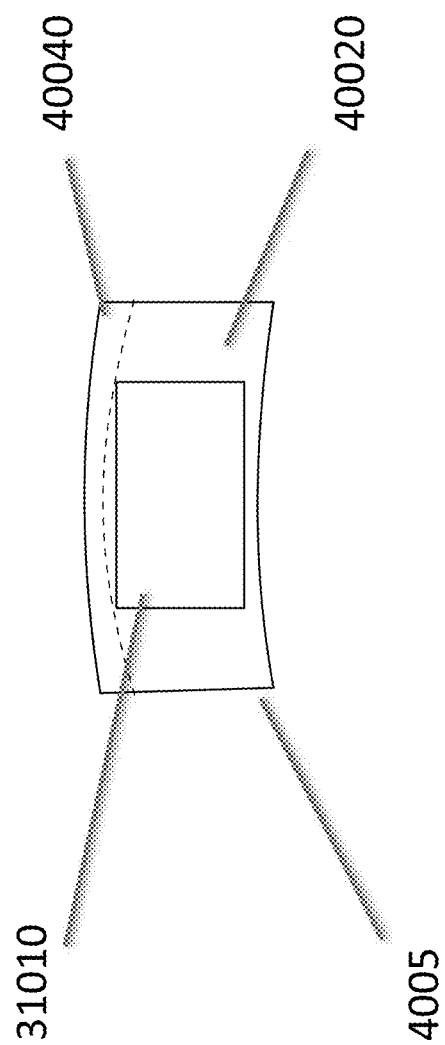

In embodiments, the solid optical assembly can be provided with curved front and back surfaces to improve the form factor. FIG. 40 is an illustration that shows a curved version of a solid optical assembly 4005 as seen from above wherein the front and back surfaces have concentric curves. As a result, the see-through thickness as measured along the line of sight from the user's eye, is uniform to provide an undistorted see-through view of the surrounding environment as the user's eye moves around in the see-through field of view. By providing a curved geometry of the solid optical assembly 4005, the solid optical assembly 4005 can be made to fit more compactly into a frame that has a curved geometry thereby enabling a thinner form factor of the head-worn display, such as for example a frame that wraps around the head of the user.

In embodiments, where elements in the solid optical assembly 3105 or 4005 are made of different materials that have different thermal expansion coefficients, an index matched optical gel can be used at the interface between the elements instead of an adhesive. Where the optical gel has characteristics of a solid and a liquid over the operating range of the head-worn display (e.g. −20 to 80 degrees C.) so that the optical gel stays at the interface with reduced migration, while also allowing some movement at the interface as the elements expand and contract as the temperature of the head-worn display changes. An example of an index matched optical gel is available from Thor Labs, Newton N.J. as product #G608N3 with a refractive index of 1.46. An example of different materials that would benefit from the optical gel is if the front lens 31040 is made of a glass such as Schott N-FK5 with refractive index of 1.487 and a thermal expansion coefficient of 9.2E-6/degree C and a power lens 31030 made of acrylic with a refractive index of 1.49 so the two materials are index matched and a thermal expansion coefficient of 9E-5/degree C so that the power lens 31030 has a substantially higher thermal expansion that the front lens 31040. By using a flexible optical gel at this interface instead a rigid optical adhesive, distortion of the elements caused by thermal stress is greatly reduced and the index matched bondline can be maintained and as a result image quality is improved over the operating range of the head-worn display.

Figure 42:
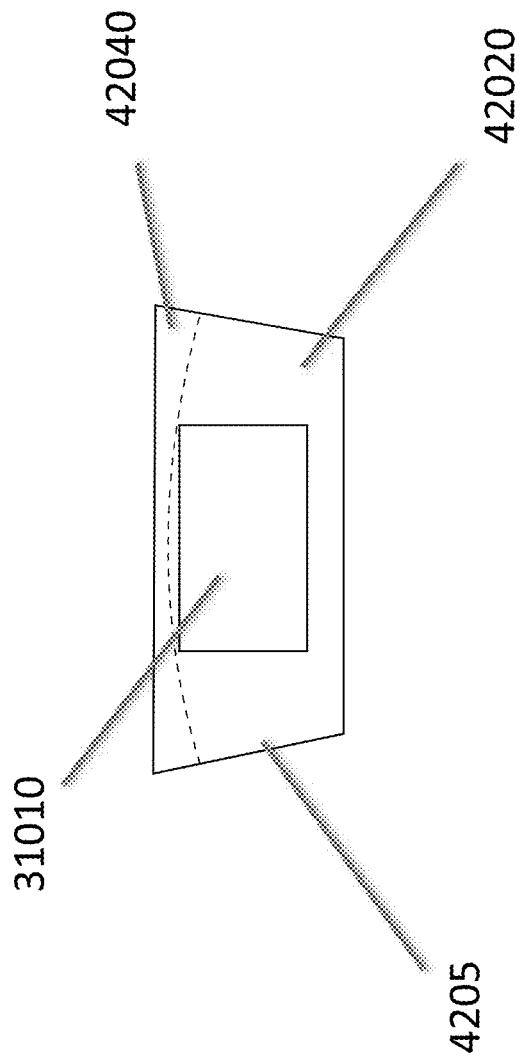

In embodiments, the sides and bottom of the solid optical assembly (3105 or 3705) can be flared to better match the see-through line of sight of the user and thereby reduce the interference of the see-through view of the surrounding environment caused by the sidewalls and bottom. As a result, the area of the front surface of the solid optical assembly (3105 or 3705) is larger than the area of the back surface. FIG. 42 is an illustration of a solid optical assembly 4205 shown from above wherein the front surface is shown on the top and the back surface is shown on the bottom. The front surface is larger than the back surface so that the sides of the soli optical assembly 4205 are flared outward toward the front surface. The sidewalls then more closely follow the user's line of sight so that the sidewalls are less noticeable to the user when viewing the see-through view of the surrounding environment.

In embodiments, the solid optical assembly of FIG. 36 can include a polarizing beam splitter layer. The image light 36025 can be polarized either by adding a polarizer at the image source 31010 if the image source 31010 is an emissive display or, if the image source 31010 is a reflective display, such as for example an LCOS, the illuminating light (e.g. from a frontlight, not shown) incident onto the image source 31010 can be polarized as supplied and then analyzed after reflection, as is known by those skilled in the art. The polarization state of the image light 36025 can be selected in conjunction with a polarizing beam splitter layer which is the first partially reflective surface 36045, so that the polarized image light is substantially transmitted by the polarizing beam splitter layer. The lower prism element 36030 is comprised of two pieces, an upper prism piece with plano surfaces and a lower plano/convex piece that together form the shape of the lower prism element 36030 shown in FIG. 36. A quarter wave film with it's fast axis oriented at 45 degrees to the polarization axis of the image light 36025, is positioned between the upper prism piece and the lower plano/convex piece and adhesively bonded into place. The polarized image light 36025 then has it's polarization state changed by 90 degrees as it passes through the quarter wave, is reflected by the second partially reflective surface 3605 and passes back through the quarter wave. Because the polarization state has been changed by 90 degrees, the image light 36025 is then reflected and redirected by the polarizing beam splitter layer so that it is exits from the back surface of the lower prism element 36030 on it's way to the eyebox 31015. The advantage of using a first partially reflective surface 36045 that is a polarizing beam splitter layer, is that the polarized image light 36025 from the image source 31010 is substantially transmitted by the polarizing beam splitter layer, while the polarized image light 36025 that has been reflected by the second partially reflective surface 36055 and altered by passing twice through the quarter wave is substantially reflected by the polarizing beam splitter layer. As a result, very little image light 36025 is lost during the transmission or reflection. Consequently, very little image light 36025 exits through the front surface of the upper prism element 36050 where it would be visible by other people in the surrounding environment as a miniature version of the displayed image, also know as eyeglow.

In embodiments, the upper lens 36020 of FIG. 36 is comprised of two or more refractive elements made from materials with at least two different refractive indices (e.g. >0.05 difference) so that refractive effects are provides to the image light 36025 as it passes between elements. The two or more refractive elements are adhesively bonded together by transparent index matched adhesive. As a result, the solid optical assembly 3605 includes at least two internal refractive surfaces and at least one internal partially reflective surface. By providing additional refractive elements in the solid optical assembly 3605, a wider display field of view can be provided (e.g. 40 degrees or greater). The various elements included in the solid optical assembly 3605 are designed to provide a uniform thickness to provide an undistorted see-through view of the surrounding environment. 051716 Narrow notch mirror combiner.

Another aspect of the present inventions relates to the optimization of image light transfer to the user's eye and scene light transmission to the user's eye. In embodiments, notch mirrors/filters are used to reflect the image light while transmitting much of the scene light.

In a head-worn computer or head-worn display that displays a projected image while also providing a user with a see-through view of the surrounding environment, it can be advantageous to include a combiner that has a notch mirror. Where the notch mirror has bands of high reflectivity separated by bands of low reflectivity and high transmission. The bands of high reflectivity are designed to be spectrally positioned to correspond with the emission bands provided by the image source and the associated image light, so that the image light is efficiently reflected by the combiner, to deliver the image light to the user's eye. At the same time, the bands of high transmission enable light from the environment to be efficiently transmitted by the combiner to the user's eye, to provide a see-through view of the surrounding environment. The user then sees a displayed image, comprised of image light, overlaid onto a see-through view of the surrounding environment, comprised of scene light. However, the see-through view of the environment can be degraded by the notch mirror, because certain colors in the environment are blocked by the bands of high reflectivity of the notch mirror. While the color blocking of the notch mirror typically does not substantially affect the viewing experience of broad band colors, such as are found in nature, color blocking can be an issue for narrow band lights in the environment such as LEDs that are used for different illumination applications. For example, it can be important to be able to see the red color associated with warning lights such as traffic lights and brake lights in the see-through view if the user is driving a car. As a result, the inventors appreciated that there is an opportunity to provide an improved notch mirror system in a head-worn computer that provides a bright displayed image while still providing a high quality see-through view of the surrounding environment, particularly if the surrounding environment includes lights such as LEDs or other lights spectrally similar to the image light.

Figure 44:
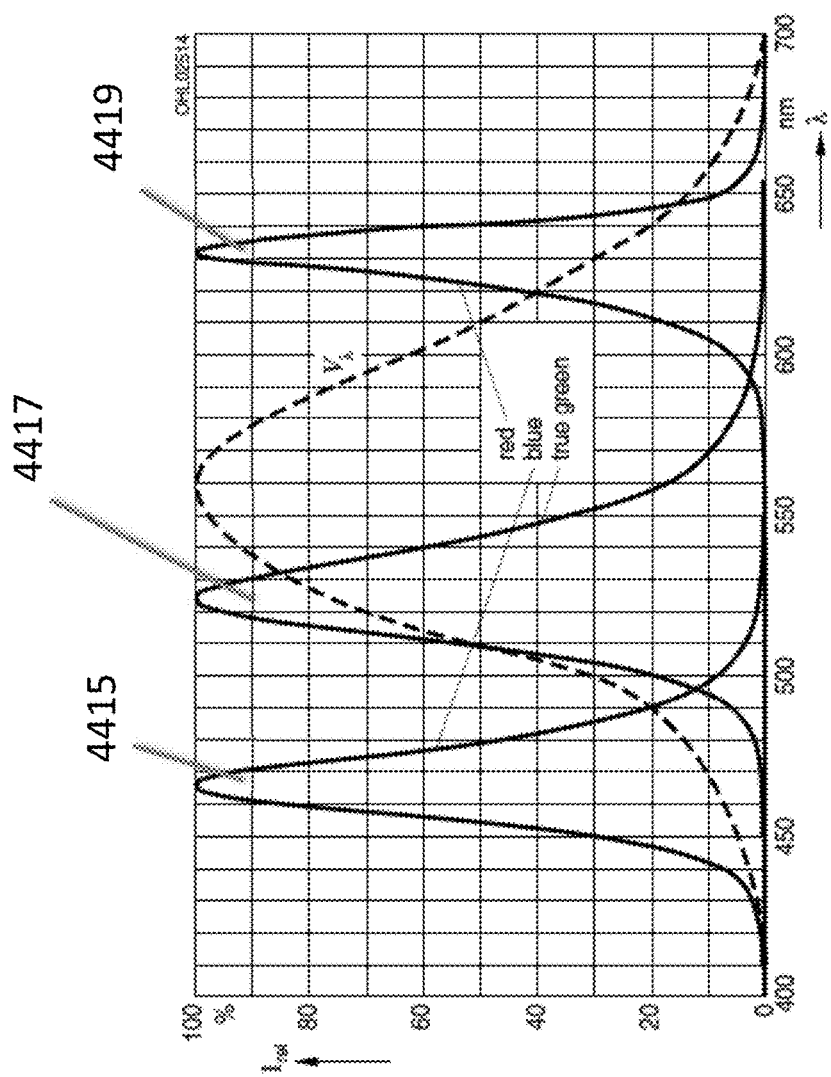
FIG. 44 illustrates LED emission spectra for a display system in accordance with the principles of the present disclosure.

FIG. 44 is a chart showing a typical emission spectrum, showing relative intensity vs wavelength, for an LED module that includes red, green and blue LEDs. The data is shown for a multi-LED module LRTB GFTG from OSRAM, Regensburg Germany. LED's such as this can be used to illuminate the image source in a head-worn display that includes a reflective display such as LCOS, FLCOS or DLP, or alternatively LED's can be used to illuminate a backlight for a transmissive display such as backlit LCD. As can be seen from the blue, green and red emission spectrum shown as 4415, 4417 and 4419 respectively, the full width half max (FWHM, which is the nm width of the emission curve taken at 50% of the peak relative intensity) bandwidth associated with the LEDs can be 42 nm for the blue LED, 64 nm for the green LED and 25 nm for the red LED. For image light that originates from LED illumination, the spectrum of the image light that comprises the image viewed by the user is the combined spectra of the blue, green and red LEDs that are shown in FIG. 44. Emissive displays can also be used as the image source in head-worn displays including OLED and micro-LED, where emissive displays such as OLED provide a spectrum that is similar to the combined spectra provided by blue green and red LEDs.

Figure 45:
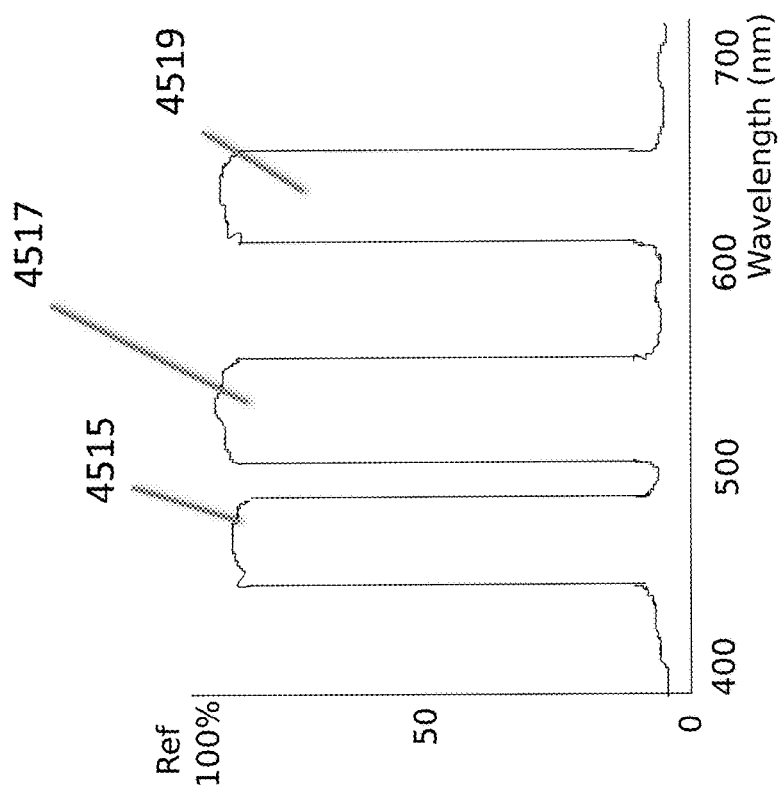
FIGS. 45, 46, 47 and 48 illustrate performance provided by a various notch mirrors in accordance with the principles of the present disclosure.

FIG. 45 shows an illustration of reflectivity provided by a notch mirror with three 90% reflectivity bands, with 10% transmission, for blue, green and red shown respectively as 4515, 4517 and 4519, that match the FWHM emission bands (42 nm+64 nm+25 nm=131 nm total reflectivity) of the LEDs 4415, 4417 and 4419 shown in FIG. 44. This type of notch mirror that has three high reflectivity bands is also known as a tristimulus notch mirror. Given that the FWHM bandwidths associated with each of the LEDs cover approximately 80% of the light energy emitted by the LEDs, a notch mirror that reflects 90% of the light over the same total bandwidth would reflect 90%×80%=72% of the light from the LED. At the same time, since the reflectivity of the notch mirror in the high transmission bands between the high reflectivity bands is approximately 5%, as shown in FIG. 45, the notch mirror transmits approximately 95% of scene light of wavelengths between the high reflectivity bands along with 10% transmission of scene light within the high reflectivity bands. The total transmission of scene light can then be approximately calculated by bandwidth weighting of the transmission: [(10%×131)+(95%×(680−420−131))]/(680−420)=52% of the total scene light in the visible range of 420 to 680 nm is transmitted. As such the notch mirror with reflectivity shown in FIG. 45 is simultaneously more efficient in both reflection of image light and transmission of scene light over a simple partial mirror that reflects 50% and transmits 50% of incident light across the entire visible range. However, light from the environment that originates from LED's in the environment would be blocked by the notch mirror as efficiently as the image light is reflected, which means that LED light would be transmitted at approximately (10%×80%)+(20%×95%)=27% within the see-through view. This level of transmission may not be sufficient to enable rapid observation of stop lights and other warning lights, which can be LED based, when the user of a head-worn display is operating a vehicle or other equipment.

Figure 46:
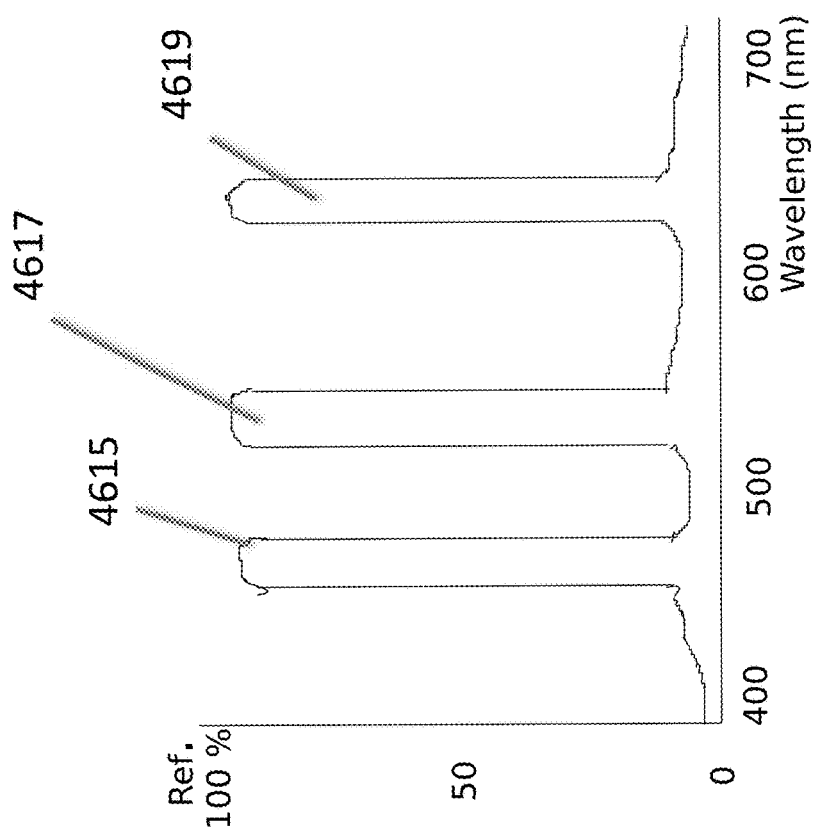

To make LED light from the environment more visible to the user, the notch mirror can be modified to enable more light to be transmitted by the combiner. FIG. 46 shows an illustration of a notch mirror designed with narrower 90% reflectivity bands separated by 95% transmission bands shown as 4615, 4617 and 4619 for blue, green and red respectively to provide a higher transmission of scene light from the environment. Where, the width of the high reflectivity bands is selected to be narrower than the FWHM of the light source associated with the image light. As a result the % of image light that is reflected by the combiner toward the user's eye is reduced and the % of scene light transmitted by the combiner to the user's eye is increased. Due to the peaked shape of emission spectra of typical light sources, such as the example emission spectra of LEDs 4415, aa17 and 4419 shown in FIG. 44, reducing the width of the high reflectivity bands, increases the % transmission of scene light faster than the % reflection of image light is reduced. As such, it is possible to design the notch mirror to reflect a majority (>50%) of the image light while simultaneously providing an even greater transmission of scene light. As shown in FIG. 46, the widths of the high reflectivity bands 4615, 4617 and 4619 have been chosen to match the full width 70% max (the nm width of the emission curve taken at 70% of the peak relative intensity) of the LEDs, which corresponds to reflective bands of approximately 26 nm for blue, 39 nm for true green and 23 nm for red (88 nm total), which provides a reflection of approximately 50% of the image light based on the area under the spectra curves. The scene light is then transmitted at ((10%×88)+(95%×(680−420−88)))/(680−420)=66% of the total scene light. At the same time, light from light sources such as LEDs in the environment will be transmitted at approximately 50% since the high reflectivity bands only block 50% of this light. This greatly improves the visibility of narrow band light sources such as LEDs that are in the environment by the user while preserving a reasonable level of efficiency of reflecting the image light to the user's eye and providing a relatively high level of see-through transmission of scene light from the surrounding environment. Similarly, the wavelengths of the high reflectivity bands can be selected to be offset from a specific light source in the environment that is important for the user to be able to see easily.

Figure 47:
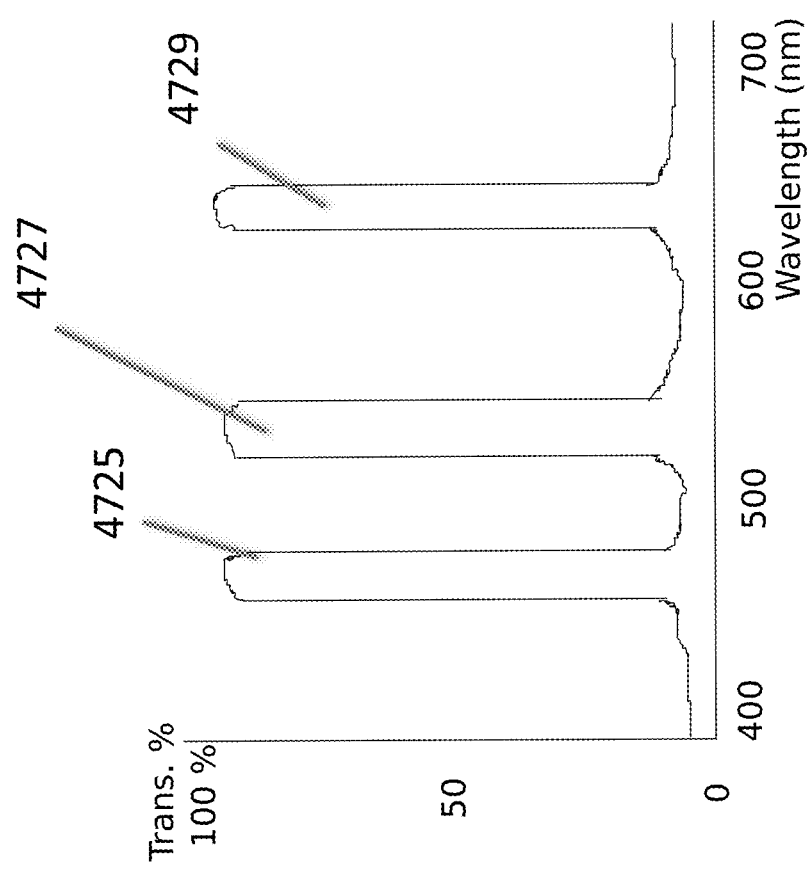
Figure 48:
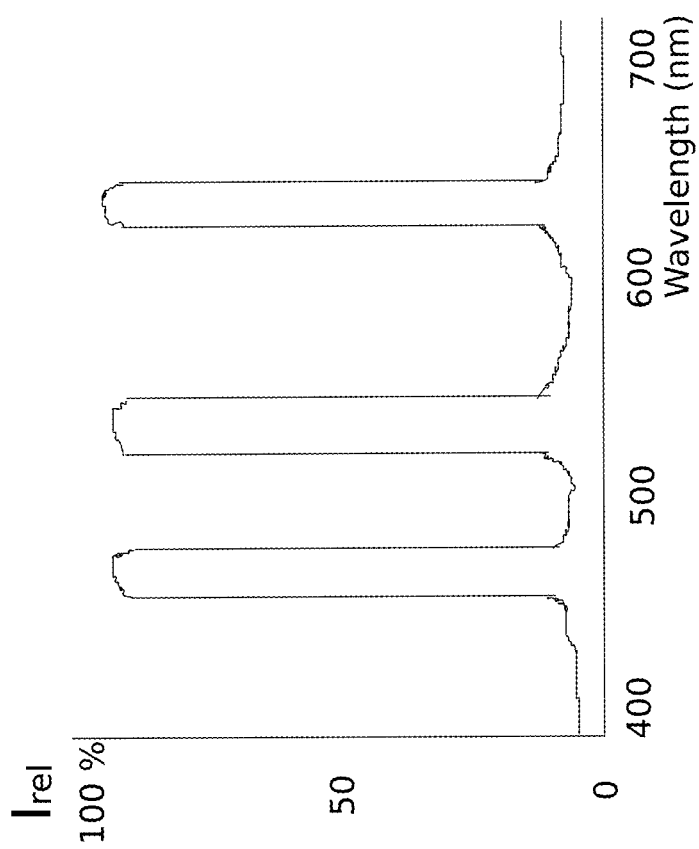

In embodiments, there may be a problem with using narrow reflectivity bands in the notch mirror on the combiner, in that a portion of the image light is then transmitted through the combiner, so that image light can be seen by adjacent people in the form of a miniature projected image. This effect is known as eyeglow. Eyeglow can be detrimental in that it reduces privacy for the user because other people adjacent to the user can determine what the user is viewing in the head-worn display. Eyeglow can also be distracting, in that the user's eyes are not visible and instead the user has an other-worldly look with glowing eyes. As such, it is advantageous to be able to reduce eyeglow. This can be done by filtering the image light to provide image light with narrow emission bands, into the optics of the head-worn display, wherein the narrow emission bands of the image light match the narrow high reflectivity bands of the notch mirror. FIG. 47 shows an illustration of a transmission spectrum for a notch filter with narrow transmission bands 4725, 4727 and 4729 respectively for blue, green and red light, where the narrow transmission bands 4725, 4727 and 4729 are matched to the narrow high reflectivity bands 4615, 4617 and 4619 of the combiner shown in FIG. 46. The notch filter can be positioned anyplace along the optical path between the image source and the combiner so long as it does not interfere with the user's see-through view of the surrounding environment, for example the notch filter can be associated with the image source. The notch filter can operate by absorbing or reflecting the non-transmitted portions of the emission spectrum provided by the image source. The notch filter can be a plate or film that is positioned adjacent to the image source and has a multilayer coating or a multilayer film that has the desired transmission spectrum to convert the image light from a broader band spectrum such as is shown in FIG. 44 to a narrow band spectrum such as is shown in FIG. 48. The narrow band spectrum of the image light is then reflected by the narrow reflectivity bands in the combiner (shown in FIG. 46) with high efficiency (e.g. >80% and preferably >90%) and as a result, little of the image light (e.g. <20%) is transmitted by the combiner so that eyeglow is greatly reduced.

In embodiments of the display optics of a head-worn display, the display optics include a reflective or emissive image source with an associated notch filter with narrow transmission bands spectrally aligned with the peak emissions of the image light from the image source to provide image light that has one or more narrow emission bands. The image light with narrow emission bands is then provided to display optics that include a combiner that has high reflectivity bands that are spectrally aligned in correspondence to the narrow emission bands of the image light and are spectrally wider than the narrow emission bands to reflect a majority of the image light toward the user's eyes for viewing a displayed image comprised of image light. The combiner simultaneously transmits a portion of scene light from the surrounding environment so the user views the displayed image overlaid onto a see-through view of the surrounding environment. In an example, the transmission bands of the notch filter are 15 nm wide and transmit more than 80% of the incident image light within the transmission bands and transmit less than 10% of the image light between bands. The high reflectivity bands of the notch mirror are then 18 nm wide and reflect greater than 80% of the incident image light within the reflection bands and reflect less than 10% while transmitting more than 80% of the image light between the reflection bands, while simultaneously transmitting greater than 60% of scene light (e.g. 80% between reflection bands and 10% in the reflection bands for visible light 420 to 670 nm, [(670–420–(3*18))*80+((3*18)*10)]/[670–420]=65%) including greater than 30% of LED light from the surrounding environment. In this way, LED lights in the environment, such as traffic lights or brake lights, can be readily seen by the user while eyeglow is prevented.

Figure 48A:
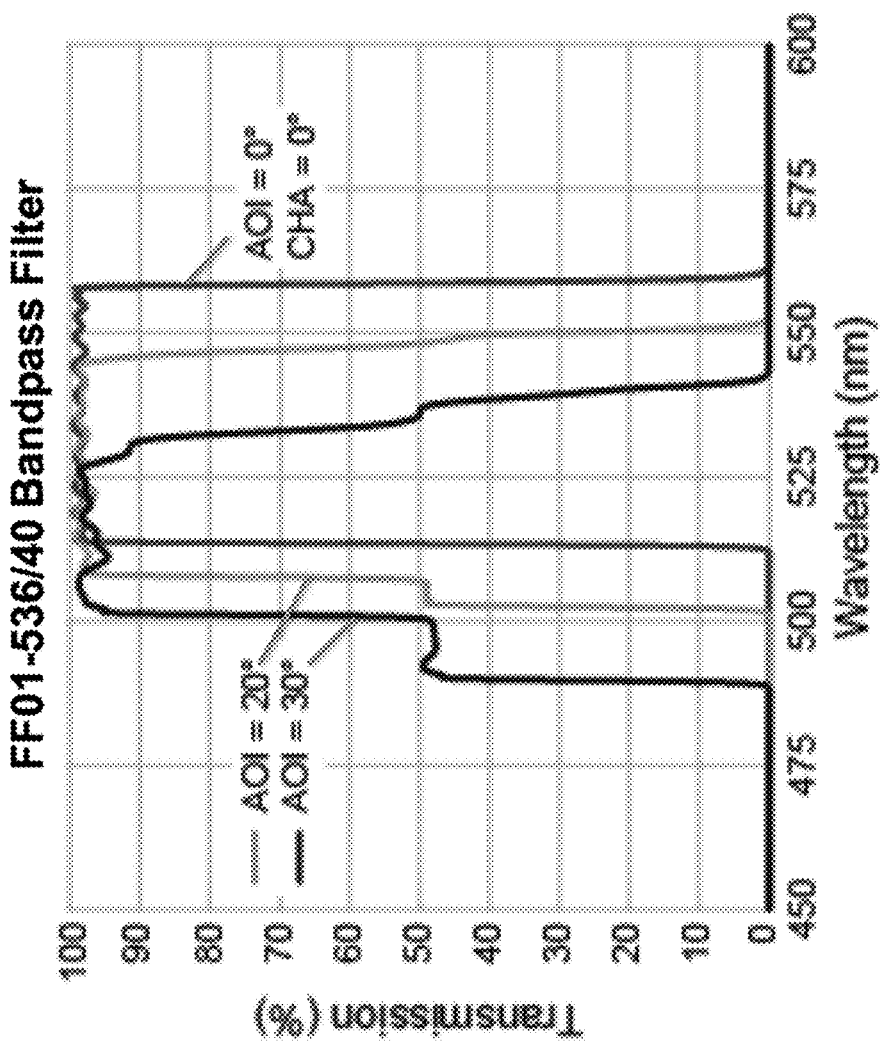
FIGS. 48a and 48b show how angles of incidence (AOI) and cone half angle (CFA) cause the performance of a bandpass filter to change.
Figure 48B:
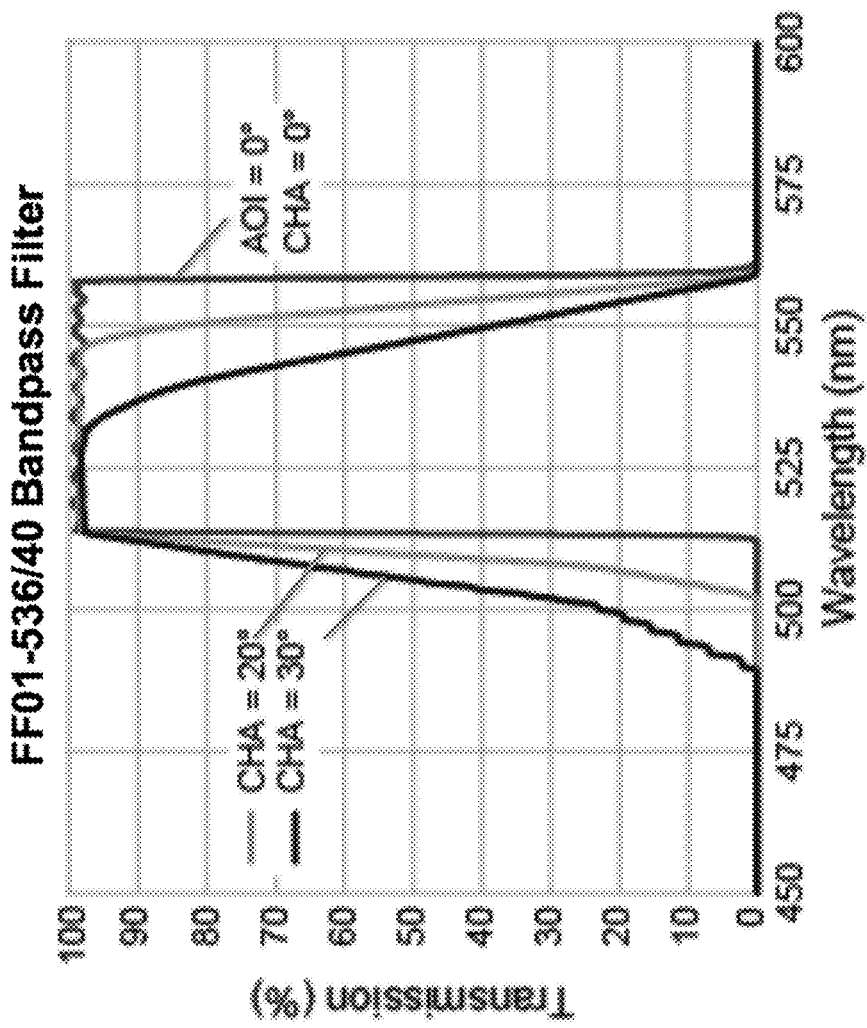
Figure 49:
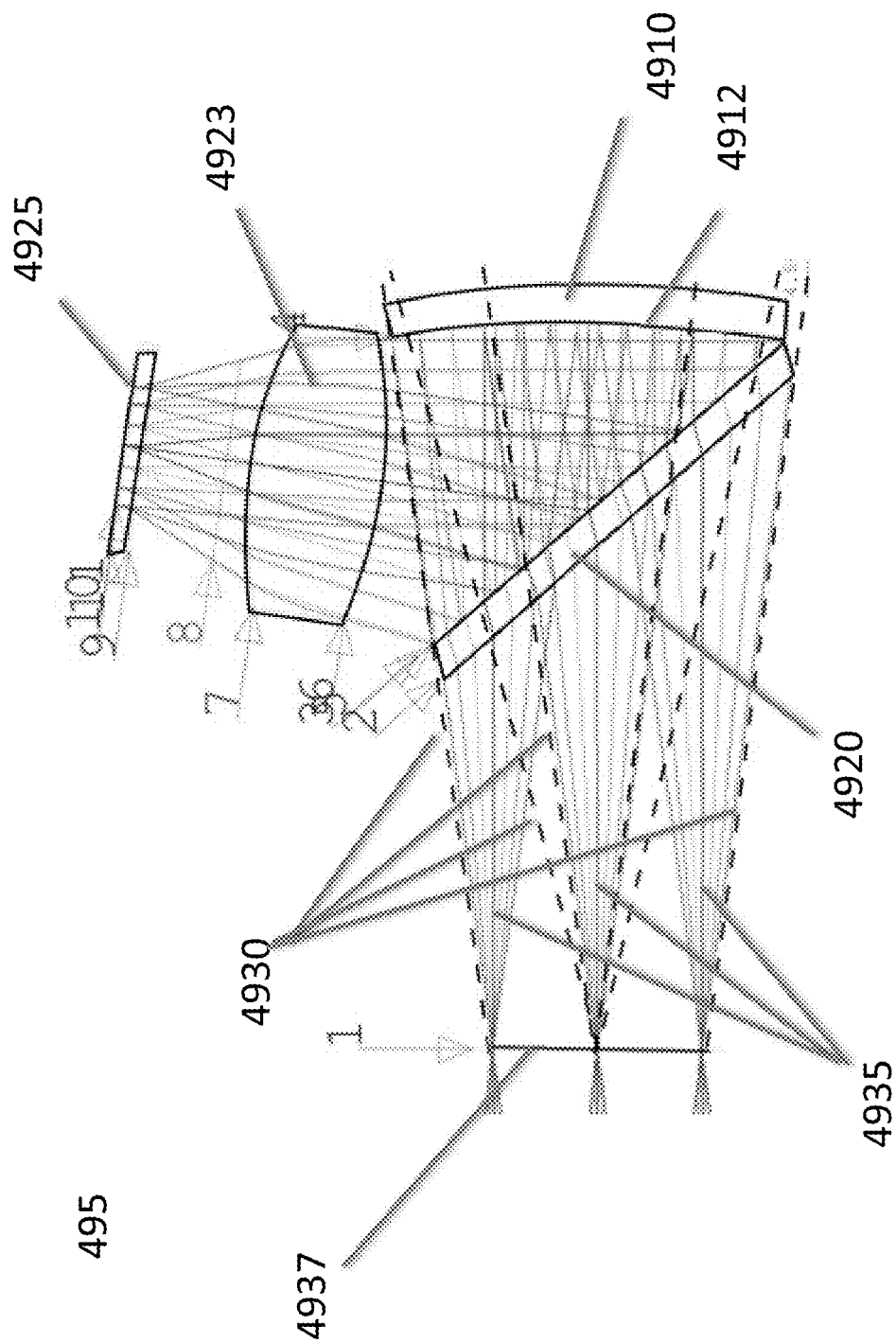
FIGS. 49, 49a, 49b and 50 illustrate various optical systems in accordance with the principles of the present disclosure.
Figure 49A:
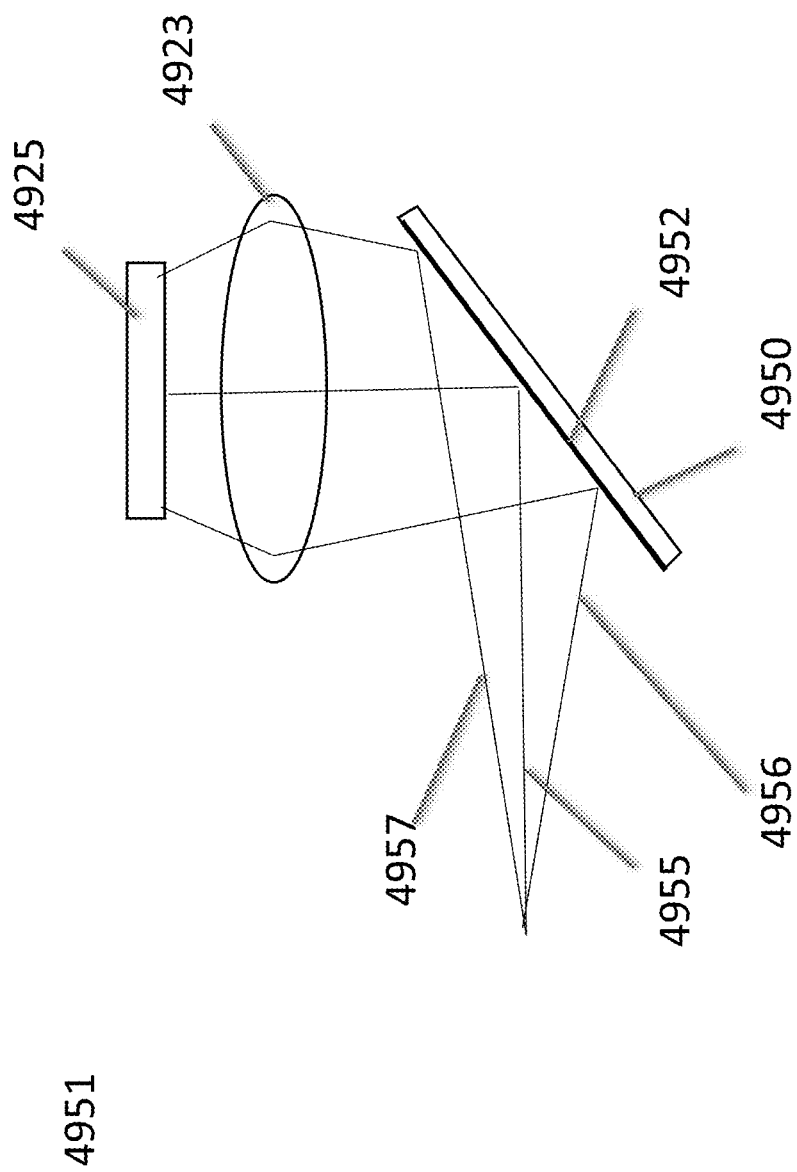
Figure 49B:
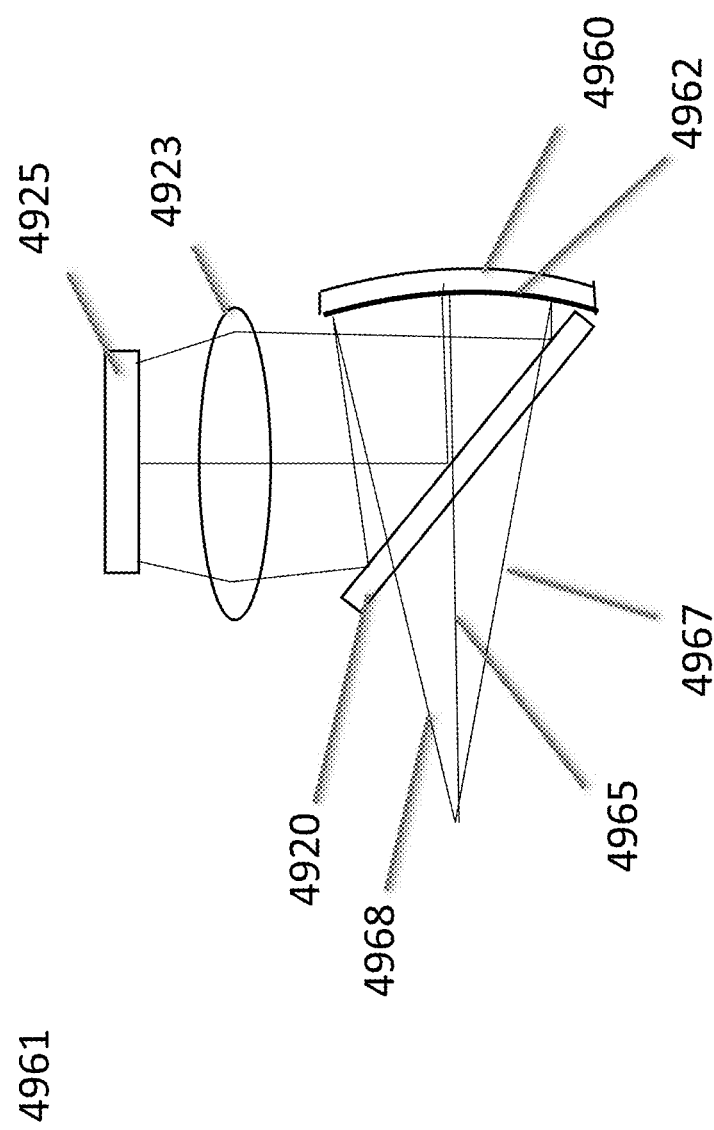

In embodiments, the notch mirror is applied as a layer to a combiner surface that is curved and positioned so that the user's eye is on the concave side of the combiner and the curved combiner is thereby between the user's eye and the surrounding environment. This positioning enables the curved shape of the combiner surface to substantially improve the uniformity of the incident angle of both the image light and the see-through light onto the notch mirror layer across the respective fields of view. Given that the wavelengths associated with the high reflectivity bands of the notch mirror of the combiner will shift lower and increase in bandwidth in correspondence with the incident angle of both the image light and the see-through light it is advantageous to reduce the range of variation of the incident angle and thereby reduce color shifts in the image or the see-through view of the surrounding environment, as seen by the user. FIGS. 48a and 48b (taken from SemRock Optical Filters at non-normal angles of incidence) show how angles of incidence (AOI) and cone half angle (CFA) cause the performance of a bandpass filter to change. This type of change in a notch mirror would cause the reflected image light to become more bluish and the transmitted see-through view to become more reddish. In embodiments, this type of issue may be avoided by designing the optics to use a narrow cone of image light. In other embodiments, it is advantageous to design the optics and position the notch mirror on a curved surface to make the angle of incidence of the image light and see-through light more nearly normal to the surface of the notch mirror. FIG. 49a shows an illustration of display optics 4951 that includes a flat combiner 4950 with a notch mirror layer 4952. For simplicity, only rays of image light 4955, 4956 and 4957 are shown from the center of the eyebox. The angle of incidence of the rays of image light 4955, 4956 and 4957 onto the surface of the combiner 4950 vary considerably, from 40 degrees for 4956 to 60 degrees for 4957. In contrast, FIG. 49b shows an illustration of display optics 4961 that includes a curved combiner 4960 with a notch mirror layer 4962 applied to the concave side of the curved combiner 4960. Again, for simplicity only rays of image light from the center of the eyebox are shown 4965, 4967 and 4968. As can be seen, the rays of image light 4965, 4967 and 4968 all have very similar angles of incidence relative to the surface of the curved combiner 4960. As such, the notch mirror layer 4962 shown in FIG. 49b can provide a higher level of performance than the notch mirror layer 4952 shown in FIG. 49a. FIG. 49 shows a more detailed illustration of display optics 495 (similar to display optics 4961) for a head-worn display comprised of an image source 4925, one or more lenses 4923, a flat partially reflective beam splitter 4920 and a curved combiner 4910. Wherein the combiner 4910 includes a notch mirror layer 4912 that can be a multilayer coating, a coextruded film or a nanostructure that provides high reflectivity bands separated by bands of high transmission as has been described previously herein. The display optics 495 provide image light 4935 to an eyebox 4937 for viewing by a user's eye while simultaneously providing the user with a see-through view of the surrounding environment. As can be seen in FIG. 49, having a curved combiner 4910 reduces the variation of angle of incidence of the rays of the image light 4935 relative to the surface of the curved combiner 4910 and the associated notch mirror layer 4912 within the ray bundles that comprise the display field of view. Where variations on incident angle of the image light 4935 relative to the surface of the curved combiner 4910 can come from variations in the position of the eye in the eyebox and in the cone angle associated with the display field of view. As a result, the incident angle of the image light 4935 rays is substantially uniform at the notch mirror layer 4912. Similarly FIG. 49 shows how the curved surface of the combiner 4910 and associated notch mirror layer 4912 at least partly compensates for changes in the angle of the rays of the see-through light 4930 (shown as dashed lines) at the notch mirror layer 4912. As such, the use of a curved combiner surface where the notch mirror layer is applied reduces color shifts across the display field of view and the see-through field of view, thereby enabling more compact designs of display optics with wider display field of view. In embodiments, the curved surface of the combiner 4910 where the notch mirror layer 4912 is provided, is a spherical curve with the radius of the sphere approximately equal to the distance between the notch mirror layer 4912 and the eyebox 4937 (e.g. the spherical radius is 75% to 120% of the distance), and the user's eye is positioned adjacent to the eyebox 4937, so that the incident angle of the see-through light at the notch mirror layer is essentially identical across the see-through field of view.

Figure 50:
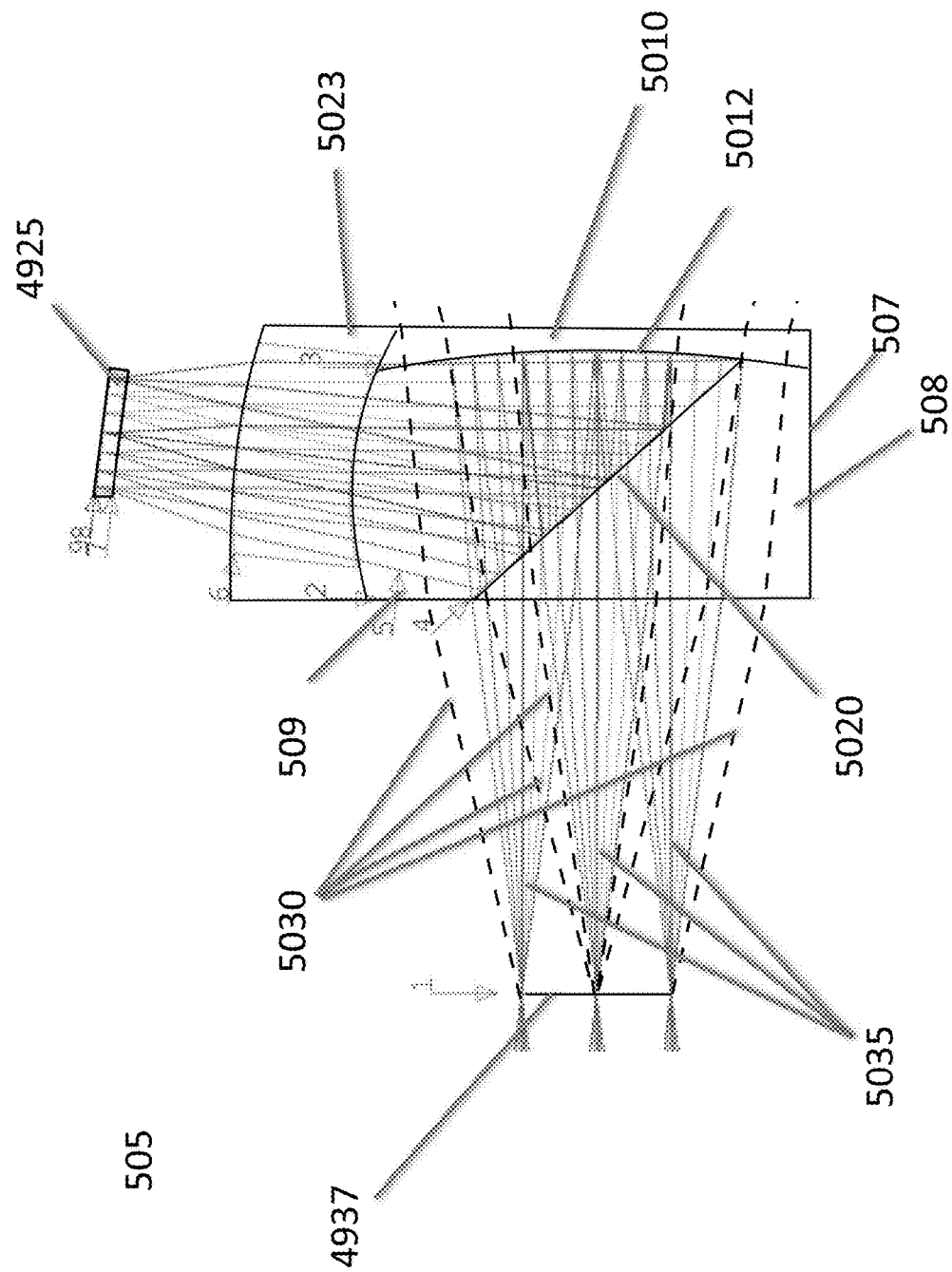

FIG. 50 is an illustration of another example of display optics 505 wherein multiple optical surfaces are internal to a solid block 507 that is comprised of multiple transparent pieces that are cemented together. As shown in FIG. 50, the curved surface of the combiner 5010 that is comprised of the notch mirror layer 5012 is internal to the solid block 507. The multiple transparent pieces can be of the same material, or different materials that have the same refractive index, so that only reflective surfaces (e.g. such as the beam splitter 5020 and the notch mirror layer 5012) affect the light passing through the solid block 507. Alternatively, one or more of the multiple transparent pieces located above the see-through region of the optics (such as field lens 5023) can be made from a different material with a different refractive index to provide a refractive effect on image light as the image light passes through. In FIG. 50, the top piece is a field lens 5023 that provides a refractive effect to the image light 5035 because it has a different refractive index from the other pieces included in the solid block 507 and because the surfaces of the field lens 5023 are curved. The beam splitter layer 5020 can be a partial mirror coating or partial mirror film that is positioned between two prismatic elements (508 and 509) that have the same refractive index. The combiner 5010 also has the same refractive index as the two prismatic elements (508 and 509) so that image light 5035 and see-through light 5030 pass through the lower portion of the solid block 507 without being exposed to refractive effects and only being affected by the partially reflective surfaces present including the beam splitter 5020 and the curved surface that is comprised of the notch mirror layer 5012. The front and back surfaces of the solid block 507 are parallel so that the see-through view of the surrounding environment is not distorted. An advantage of using display optics 505 that include a solid block 507 is that the cone angle (also known as the included angle and sometimes referred to in terms of ½ the cone angle or CHA as previously described herein)

included in the display field of view and the see-through field of view is reduced inside the solid block 507 due to refractive effects as the image light 5035 exits the solid block 507 and as the see-through light 5030 enters into the solid block 507. The cone angle reduction of the see-through light 5030 that occurs as the see-through light 5030 enters the solid block 507 at the front (right side as shown in FIG. 50) of the solid block 507 can be seen in FIG. 50. The cone angle of both the image light 5035 and the see-through light 5030 then increases due to refraction effects as the light exits the solid block 507 at the back (left side as shown in FIG. 50) to provide the display field of view and the see-through field of view. This reduction in the cone angle of the image light and see-through light at the notch mirror layer 5012 reduces the variation in the angle of incidence of both the image light 5035 and the see-through light 5030 at the notch mirror layer 5012 which improves the uniformity of the performance of the notch mirror layer 5012 over the display field of view and the see-through field of view. Reducing the cone angle of the image light in the display optics at the notch mirror can be important to providing uniform color across the displayed image in wide field of view display optics such as when the display field of view is greater than 35 degrees or greater than 40 degrees. Reducing the cone angle of the see-through light at the notch mirror can also be important to providing uniform see-through color when the see-through field of view is above 40 degrees. As such, using a notch mirror layer on a curved surface of a combiner in display optics where the curved surface is internal to a solid block represents a preferred embodiment of the invention.

While many of the embodiments herein describe see-through computer displays, the scope of the disclosure is not limited to see-through computer displays. In embodiments, the head-worn computer may have a display that is not see-through. For example, the head-worn computer may have a sensor system (e.g. camera, ultrasonic system, radar, etc.) that images the environment proximate the head-worn computer and then presents the images to the user such that the user can understand the local environment through the images as opposed to seeing the environment directly. In embodiments, the local environment images may be augmented with additional information and content such that an augmented image of the environment is presented to the user. In general, in this disclosure, such see-through and non-see through systems may be referred to as head-worn augmented reality systems, augmented reality displays, augmented reality computer displays, etc.

Although embodiments of HWC have been described in language specific to features, systems, computer processes and/or methods, the appended claims are not necessarily limited to the specific features, systems, computer processes and/or methods described. Rather, the specific features, systems, computer processes and/or and methods are disclosed as non-limited example implementations of HWC. All documents referenced herein are hereby incorporated by reference.

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable transitory and/or non-transitory media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, all the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable transitory and/or non-transitory media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, all the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable transitory and/or non-transitory media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable transitory and/or non-transitory media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

We claim:

1. A wearable device, comprising:
   a light source configured to generate image light comprising a first bandwidth of red light, a second bandwidth of green light, and a third bandwidth of blue light;
   a see-through display configured to present the image light to a user; and
   a notch mirror positioned to reflect the image light towards an eye of the user.

2. The wearable device of claim 1, wherein the see-through display comprises an emissive display.

3. The wearable device of claim 1, wherein the see-through display comprises a reflective display.

4. The wearable device of claim 1, wherein the notch mirror exhibits bands of high reflectivity separated by bands of low reflectivity and high transmission.

5. The wearable device of claim 4, wherein the bands of high reflectivity correspond with one or more of the first bandwidth, the second bandwidth, and the third bandwidth.

6. The wearable device of claim 5
   wherein a band of the bands of high reflectivity of the notch mirror matches a full width half max (FWHM) of a corresponding bandwidth of the one or more of the first bandwidth, the second bandwidth, and the third bandwidth.

7. The wearable device of claim 5,
   wherein a band of the bands of high reflectivity of the notch mirror is narrower than a full width half max (FWHM) of a corresponding bandwidth of the one or more of the first bandwidth, the second bandwidth, and the third bandwidth.

8. The wearable device of claim 1, wherein the see-through display is configured to pass light from a surrounding environment, the passed light comprising a wavelength of an LED.

9. The wearable device of claim 1, wherein the see-through display is configured to pass light from a surrounding environment, the passed light comprising a wavelength associated with a warning light.

10. The wearable device of claim 4, wherein the image light is filtered to provide filtered image light with emission bands that correspond to the bands of high reflectivity of the notch mirror.

11. The wearable device of claim 1, further comprising a notch filter configured to convert the image light from a first band spectrum to a seconder band spectrum narrower than the first band spectrum.

12. The wearable device of claim 11, wherein the notch filter comprises a multilayer coating or a multilayer film.

13. The wearable device of claim 1, wherein the notch mirror comprises a layer of a combiner surface, the combiner surface having a concave surface configured to face an eye of the user.

14. The wearable device of claim 13, wherein the combiner surface is configured to reduce a color shift in the image light reflected from the notch mirror.

15. The wearable device of claim 1, wherein the notch mirror is disposed on a curved surface such that an angle of incidence of rays of the image light is substantially normal to a surface of the notch mirror.

16. The wearable device of claim 13, wherein the combiner surface is internal to a solid member comprising a plurality of transparent pieces.

17. The wearable device of claim 16, wherein two or more of the plurality of transparent pieces have a same refractive index.

18. The wearable device of claim 16, wherein a transparent piece of the plurality of transparent pieces provides a refractive effect with respect to the image light.

19. The wearable device of claim 16, wherein the solid member further comprises a beam splitter layer.

20. The wearable device of claim 16, wherein the solid member further comprises a front surface and a back surface that is parallel to the front surface.

* * * * *